United States Patent
Tanabe et al.

(10) Patent No.: US 11,807,183 B2
(45) Date of Patent: Nov. 7, 2023

(54) OCCUPANT PROTECTION APPARATUS

(71) Applicant: TS TECH CO., LTD., Saitama (JP)

(72) Inventors: Jinichi Tanabe, Tochigi (JP); Tatsuki Nonaka, Tochigi (JP); Shoji Endo, Tochigi (JP); Takayoshi Ito, Tochigi (JP); Takahiro Shimizu, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 224 days.

(21) Appl. No.: 17/287,808

(22) PCT Filed: Oct. 21, 2019

(86) PCT No.: PCT/JP2019/041315
§ 371 (c)(1),
(2) Date: Apr. 22, 2021

(87) PCT Pub. No.: WO2020/085304
PCT Pub. Date: Apr. 30, 2020

(65) Prior Publication Data
US 2021/0394698 A1   Dec. 23, 2021

(30) Foreign Application Priority Data

Oct. 23, 2018 (JP) ................................ 2018-198966
Oct. 23, 2018 (JP) ................................ 2018-198967
(Continued)

(51) Int. Cl.
*B60R 21/207* (2006.01)
*B60R 21/015* (2006.01)
(Continued)

(52) U.S. Cl.
CPC ............ *B60R 21/207* (2013.01); *B60N 2/763* (2018.02); *B60R 21/0132* (2013.01);
(Continued)

(58) Field of Classification Search
None
See application file for complete search history.

(56) References Cited

U.S. PATENT DOCUMENTS

| 5,328,234 | A | 7/1994 | Daniel et al. |
| 11,505,097 | B2 * | 11/2022 | Tanaka ............... B60R 21/207 |
| 2012/0299346 | A1 | 11/2012 | Kneller et al. |

FOREIGN PATENT DOCUMENTS

| DE | 102005003546 | 8/2006 |
| JP | S58224818 | 12/1983 |

(Continued)

OTHER PUBLICATIONS

Japanese Office Action with English Translation for corresponding Application No. JP 2018-198967, dated Sep. 20, 2022, 8 pages.
(Continued)

*Primary Examiner* — Faye M Fleming
(74) *Attorney, Agent, or Firm* — Dority & Manning, PA

(57) ABSTRACT

An occupant protection apparatus includes: a vehicle seat arranged in an inner space of a side wall of a vehicle; a side airbag device provided in the side wall or the vehicle seat and including a side airbag to be inflated and deployed between the side wall and the vehicle seat. The vehicle seat includes: a pressure-receiving portion to receive a load from an occupant seated on the vehicle seat; and a frame to support the pressure-receiving portion. The occupant protection apparatus further comprising an electronic control circuit configured to perform moving the pressure-receiving portion so that the occupant is pushed away from the side wall before the occupant comes into contact with the side airbag at an activation time when the side airbag device is activated by an impact acting on the side wall from an outside of the vehicle and the side airbag is inflated and deployed.

19 Claims, 52 Drawing Sheets

(30) Foreign Application Priority Data

Nov. 30, 2018 (JP) ................................ 2018-224657
Nov. 30, 2018 (JP) ................................ 2018-224658

(51) Int. Cl.
    *B60R 21/231*     (2011.01)
    *B60N 2/75*     (2018.01)
    *B60R 21/0132*     (2006.01)
    *B60W 30/095*     (2012.01)

(52) U.S. Cl.
    CPC .. *B60R 21/01512* (2014.10); *B60R 21/23138* (2013.01); *B60W 30/0956* (2013.01); *B60R 2021/23146* (2013.01)

(56) References Cited

FOREIGN PATENT DOCUMENTS

| | | |
|---|---|---|
| JP | H11334436 | 12/1999 |
| JP | 2003261000 | 9/2003 |
| JP | 2005143887 | 6/2005 |
| JP | 2005170180 | 6/2005 |
| JP | 2008087631 | 4/2008 |
| JP | 2010070080 | 4/2010 |
| JP | 2010155540 | 7/2010 |
| JP | 2011037305 A | 2/2011 |
| JP | 2012179938 | 9/2012 |
| JP | 2013216209 | 10/2013 |
| JP | 2015027824 | 2/2015 |
| JP | 2015051735 | 3/2015 |
| JP | 2015083454 | 4/2015 |
| JP | 2016038607 A | 3/2016 |
| JP | 2016124382 A | 7/2016 |
| JP | 2016175436 A | 10/2016 |
| JP | 2016199068 A | 12/2016 |
| JP | 2017132384 | 8/2017 |
| JP | 2017136994 A | 8/2017 |
| JP | 2018083554 | 5/2018 |
| JP | 2018171990 | 11/2018 |
| JP | 2020066288 A * | 4/2020 |

OTHER PUBLICATIONS

Japanese Office Action with English Translation for corresponding Application No. JP 2018-198966, dated Sep. 27, 2022, 12 pages.
Japanese Office Action (w/ English translation) for corresponding Japanese Application No. 2018-198966, dated Mar. 14, 2023, 12 pages.
International Search Report and Written Opinion Corresponding to Application No. PCT/JP2019/041315 dated Dec. 24, 2019 (4 pages).
Japanese Office Action (w/ English translation) for corresponding Japanese Application No. 2018-224658, dated Dec. 27, 2022, 8 pages.
Japanese Office Action (w/ English translation) for corresponding Japanese Application No. 2018-224657, dated Jan. 10, 2023, 8 pages.

* cited by examiner

OCCUPANT PROTECTION APPARATUS

CROSS-REFERENCE TO RELATED APPLICATION

This application is a National Stage of PCT international application Ser. No. PCT/JP2019/041315 filed on Oct. 21, 2019 which designates the United States, incorporated herein by reference, and which is based upon and claims the benefit of priority from Japanese Patent Application No. 2018-198966, filed on Oct. 23, 2018, Japanese Patent Application No. 2018-198967, filed on Oct. 23, 2018, Japanese Patent Application No. 2018-224657, filed on Nov. 30, 2018, and Japanese Patent Application No. 2018-224658, filed on Nov. 30, 2018, the entire contents of which are incorporated herein by reference.

TECHNICAL FIELD

The present invention relates to an occupant protection apparatus for protecting an occupant by acting a side airbag.

BACKGROUND ART

Conventionally, an automobile seat device is known to include a seat body connected to a vehicle body floor in a displaceable manner in a vehicle width direction, and a side airbag device installed at the side portion outside of a seat back of a seat body in the vehicle width direction to inflate and deploy a side airbag between an occupant and the vehicle body side (for example, see Patent Literature 1).

In the automobile seat device described in Patent Literature 1, in order to secure the deployment space of the side airbag, a driving device to displace the seat body inward in the vehicle width direction and the side airbag device when a side collision of the vehicle is detected or predicted.

CITATION LIST

Patent Literature

Patent Literature 1: Japanese Unexamined Patent publication No. 2013-216209

DISCLOSURE OF INVENTION

Problems to be Solved by the Invention

However, in the technique described in Patent Literature 1, since the entire seat body is displaced inward in the vehicle width direction, the driving device for generating a driving force for driving the entire seat body, and a mechanism to transmit the driving force generated by the driving device to the entire seat body become larger, there is a possibility that the entire seat including the driving device is enlarged.

Means for Solving Problem

An aspect of the present invention is an occupant protection apparatus includes: a vehicle seat arranged in an inner space of a side wall of a vehicle; a side airbag device provided in the side wall or the vehicle seat and including a side airbag to be inflated and deployed between the side wall and the vehicle seat; wherein the vehicle seat includes; a pressure-receiving portion configured to receive a load from an occupant seated on the vehicle seat, a frame configured to support the pressure-receiving portion, and a moving part configured to move the pressure-receiving portion so that the occupant is pushed away from the side wall before the occupant comes into contact with the side airbag at an activation time when the side airbag device is activated by an impact acting on the side wall from an outside of the vehicle and the side airbag is inflated and deployed.

Effect of the Invention

According to the present invention, it becomes possible to secure a sufficient deployment space for the side airbag without enlarging the size of the entire seat.

DESCRIPTION OF EMBODIMENT

First Embodiment

Hereinafter, a first embodiment of the present invention will be described with reference to the drawings. An occupant protection device according to the first embodiment protects an occupant seated on a vehicle seat and can be applied to various vehicle seats. In the following, an example of application to a vehicle seat used for a car will be described.

Figure 1:
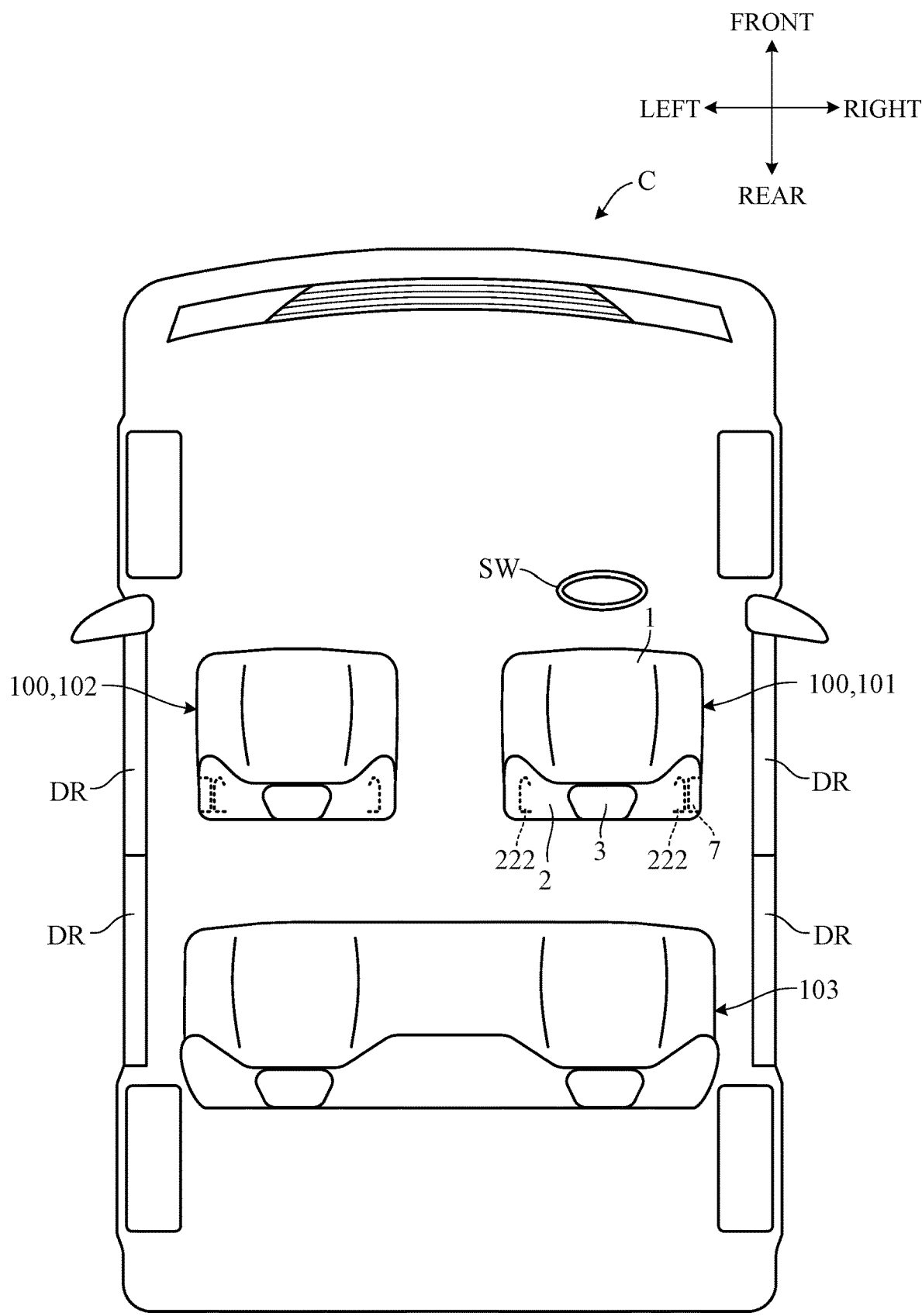
FIG. 1 is a plan view illustrating a configuration of a car to which a vehicle seat according to the first embodiment of the present invention is installed.

FIG. 1 is a plan view illustrating a configuration of a vehicle (car C) in which a vehicle seat S according to the first embodiment of the present invention is installed. In FIG. 1, the front-rear direction, the lateral direction, and the up-down direction of the car C are defined as illustrated in the drawing. The front-rear direction corresponds to the length direction of the car C, the up-down direction corresponds to the height direction of the car C, and the lateral direction corresponds to the car width direction.

As illustrated in FIG. 1, the car C includes a steering wheel SW operated by a driver, a driver's seat 101 arranged facing the steering wheel SW, a passenger seat 102 arranged on the side of the driver's seat 101, a rear seat 103 arranged behind the driver's seat 101 and the passenger seat 102, and a door DR that can be opened and closed with respect to the car body. By opening the door DR, the occupant gets on and off the car C from the doorway of the car C.

The driver's seat 101 and the passenger seat 102 are provided separately on the left and right sides independently of each other, and these are referred to as vehicle seat 100, respectively. Note that, in FIG. 1, the steering wheel SW is arranged on the right side of the car C, but it can also be arranged on the left side. The driver's seat 101 and the passenger seat 102 are symmetrically configured. In the following description, the driver's seat 101 represents the vehicle seat 100.

Figure 2:
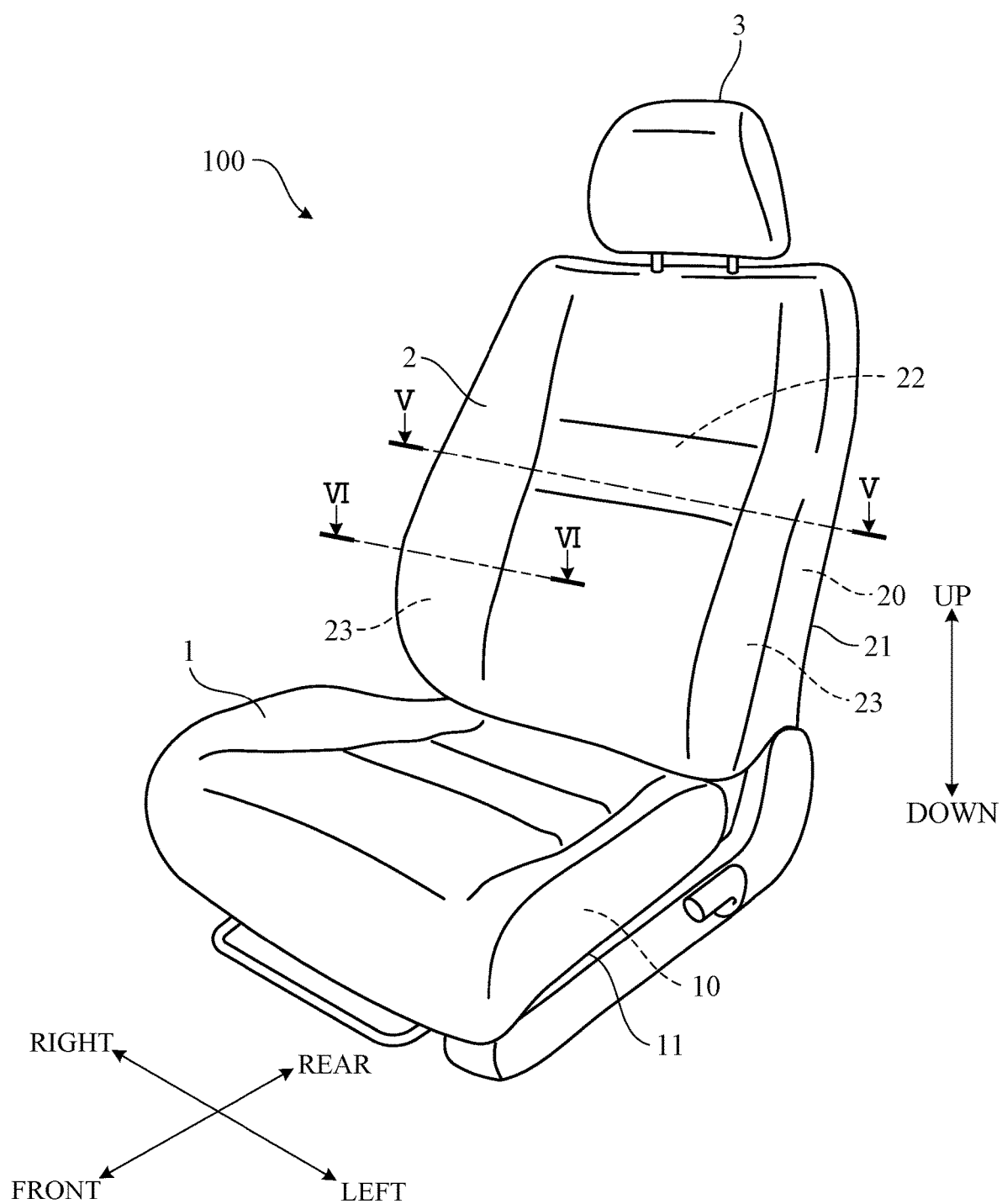
FIG. 2 is a perspective view of the vehicle seat according to the first embodiment.

FIG. 2 is a perspective view (viewed from diagonally forward) of the vehicle seat 100 (driver's seat 101). The front-rear direction, lateral direction, and up-down direction in the drawing correspond to the front-rear direction, lateral direction, and up-down direction in FIG. 1. In other words, the front of the front-rear direction is the direction in which the occupant in the riding posture faces, the lateral direction is the seat width direction, and the up-down direction is the seat height direction.

As illustrated in FIG. 2, the vehicle seat 100 includes a seat cushion 1 that supports the hip of the occupant, a seat back 2 that supports the back of the occupant, and a headrest 3 that is provided on the upper part of the seat back 2 and supports the head of the occupant. The seat cushion 1 extends in the front-rear direction and the lateral direction and has a substantially rectangular shape as a whole. The seat back 2 extends in the up-down direction and the lateral direction and has a substantially rectangular shape as a whole. The seat back 2 is supported by the rear end portion of the seat cushion 1 so as to be tiltable in the front-rear direction.

Figure 3:
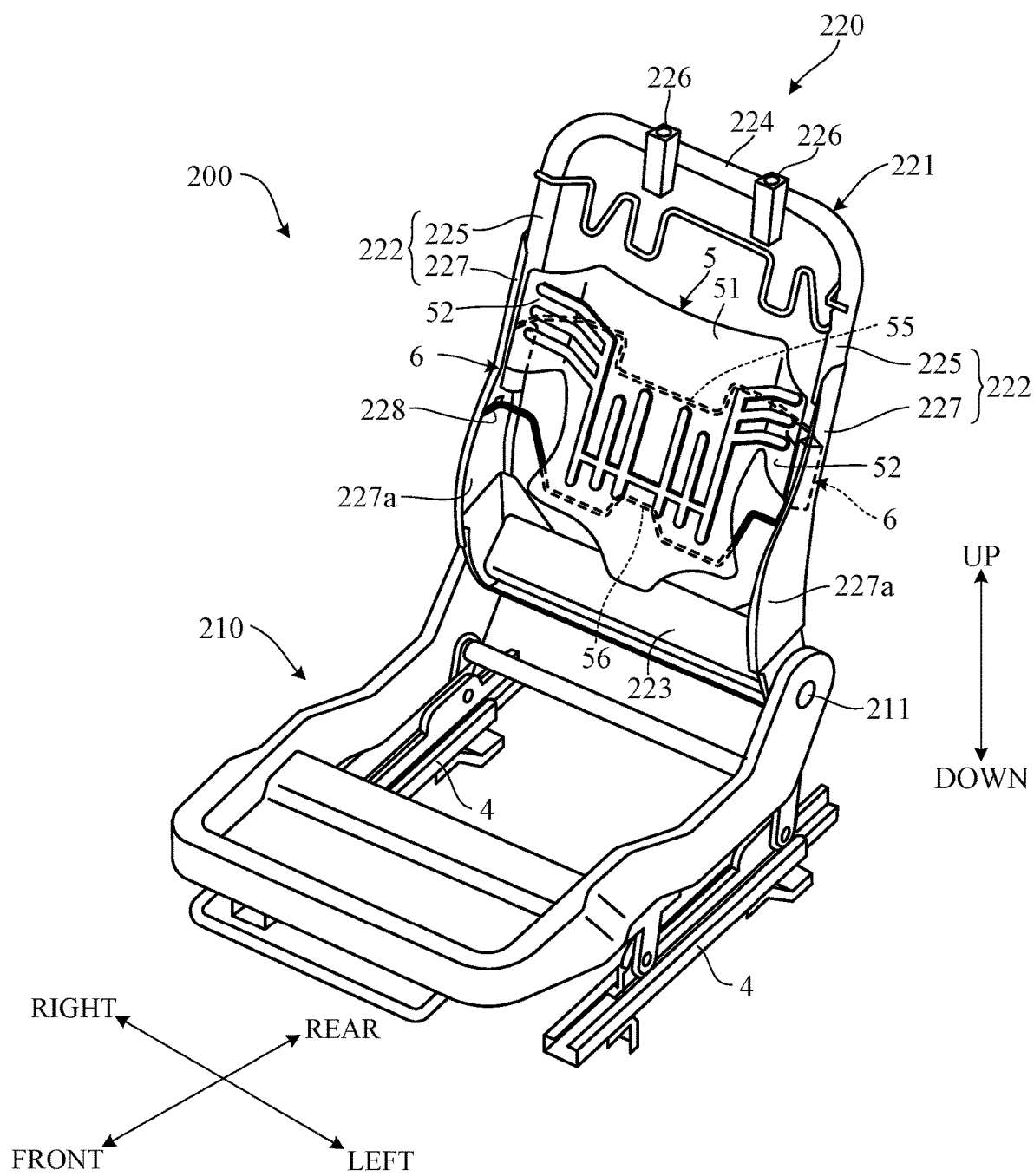
FIG. 3 is a perspective view of a seat frame built into the vehicle seat according to the first embodiment.

FIG. 3 is a perspective view illustrating a configuration of a seat frame inside the vehicle seat 100. As illustrated in FIG. 3, a seat frame 200 includes a seat cushion frame 210, which is a frame corresponding to the seat cushion 1, and a seat back frame 220, which is a frame corresponding to the seat back 2. The seat cushion frame 210 and the seat back frame 220 are formed along the outer shapes of the seat cushion 1 and the seat back 2, respectively.

As illustrated in FIGS. 2 and 3, the seat cushion 1 is composed by mounting a seat cushion pad 10 made of a cushion material such as urethane foam or the like on the seat cushion frame 210 and covering the outside thereof with a skin material 11 made of synthetic leather, fabric, or the like. The seat cushion pad 10 is supported by the seat cushion frame 210 and functions as a pressure-receiving portion that receives a load from the hip of the occupant. Slide rails 4 are extended along the front-rear direction on the floor (vehicle body floor) below the vehicle seat 100. The seat cushion frame 210 is slidably engaged with the slide rails 4, whereby the seat cushion 1 can move in the front-rear direction along the slide rails 4 with respect to the vehicle body.

The seat back 2 is composed by mounting a seat back pad 20 made of a cushion material on a seat back frame 220 and further covering the outside thereof with a skin material 21 made of synthetic leather, cloth, or the like. The seat back pad 20 is supported by the seat back frame 220 and functions as a pressure-receiving portion that receives a load from the back of the occupant. More specifically, the seat back pad 20 has a central portion 22 in the lateral direction and side portions 23 on both the left and right sides thereof, and the central portion 22 receives a backward load and the side portion 23 receives a lateral load. As illustrated in FIG. 3, the lower portion of the seat back frame 220 is rotatably connected to the rear of the seat cushion frame 210 via a reclining mechanism 211, whereby the seat back 2 is rotatably provided with respect to the seat cushion 1 in the front-rear direction.

The seat back frame 220 extends in the lateral direction and includes an upper frame 221 that constitutes the upper part of the seat back frame 220, a pair of left and side frames 222 that are erected in the up-down direction and constitute the left and right side portions of the seat back frame 220, and a lower frame 223 that extends in the lateral direction and constitutes the lower part of the seat back frame 220. The upper frame 221, the pair of left and right side frames 222, and the lower frame 223 are integrally connected by welding or the like, and the seat back frame 220 is formed in a frame shape as a whole.

More specifically, on the upper part of the seat back frame 220, a pipe material having a lateral pipe portion 224 formed by bending a metal pipe material into a substantially U-shape and extending in the lateral direction and a pair of left and right vertical pipe portions 225 extending downward from the left and right end portions of the lateral pipe portion 224 are provided, and the upper frame 221 is constituted by the lateral pipe portion 224. A support bracket 226 for mounting the headrest 3 is fixedly attached to the lateral pipe portion 224.

The lower portions of the pair of left and right vertical pipe portions 225 are joined to the upper portions of a pair of left and right side frame main body portions 227, respectively. The side frame main body portions 227 are plate-shaped members formed by pressing a metal plate or the like and extend in the up-down direction and the lateral direction. The vertical pipe portions 225 and the side frame main body portions 227 form the side frames 222. At the lower portions of the side frame main body portions 227, bulging portions 227a jutting frontward farther than their upper portions are provided. By providing the bulging portions 227a, a bank portion 27 (FIG. 6) can be easily formed on the side portions 23 of the seat back pad 20 illustrated in FIG. 2.

Inside the frame-shaped seat back frame 220, a pressure-receiving plate 5 and a pair of left and right posture changing mechanisms 6 that change the orientation of the pressure-receiving plate 5 in the lateral direction are arranged. The pressure-receiving plate 5 is an elastically deformable plate-shaped member extending in the up-down direction and the lateral direction and is made of resin or the like. The pressure-receiving plate 5 functions as a pressure-receiving portion that receives a load from the back of the occupant. The pressure-receiving plate 5 is arranged in the center of the seat back frame 220 in the up-down direction and the lateral direction, and the pair of left and right posture changing mechanisms 6 are located near the pair of left and right side frames 222 and inside the side frames 222 in the lateral direction respectively.

More specifically, the pressure-receiving plate 5 includes a back support portion 51 that supports the back of the occupant via a seat back pad 20 (FIG. 2) arranged in front thereof and lateral side support portions 52 that extend diagonally outward in the lateral direction and forward from the left and right end portions of the upper portion of the back support portion 51 and support the upper body of the occupant from left and right sides. The back support portion 51 is located behind the central portion 22 of the seat back pad 20 illustrated in FIG. 2, and the lateral side support portions 52 are located behind the side portions 23 of the seat back pad 20.

Behind the pressure-receiving plate 5, an upper connecting wire 55 and a lower connecting wire 56 extending each in the lateral direction are arranged. The left and right end portions of the upper connecting wire 55 engage with the left and right posture changing mechanisms 6 respectively, and the left and right end portions of the lower connecting wire 56 engage with wire mounting portions 228 provided on the left and right inside of the side frame main body portions 227. That is, the upper connecting wire 55 and the lower connecting wire 56 are arranged so as to be bridged between the left and right side frames 222 respectively. The pressure-receiving plate 5 engages with the upper connecting wire 55 and the lower connecting wire 56 and is supported by the left and right side frames 222 via the upper connecting wire 55 and the lower connecting wire 56.

Figure 4:
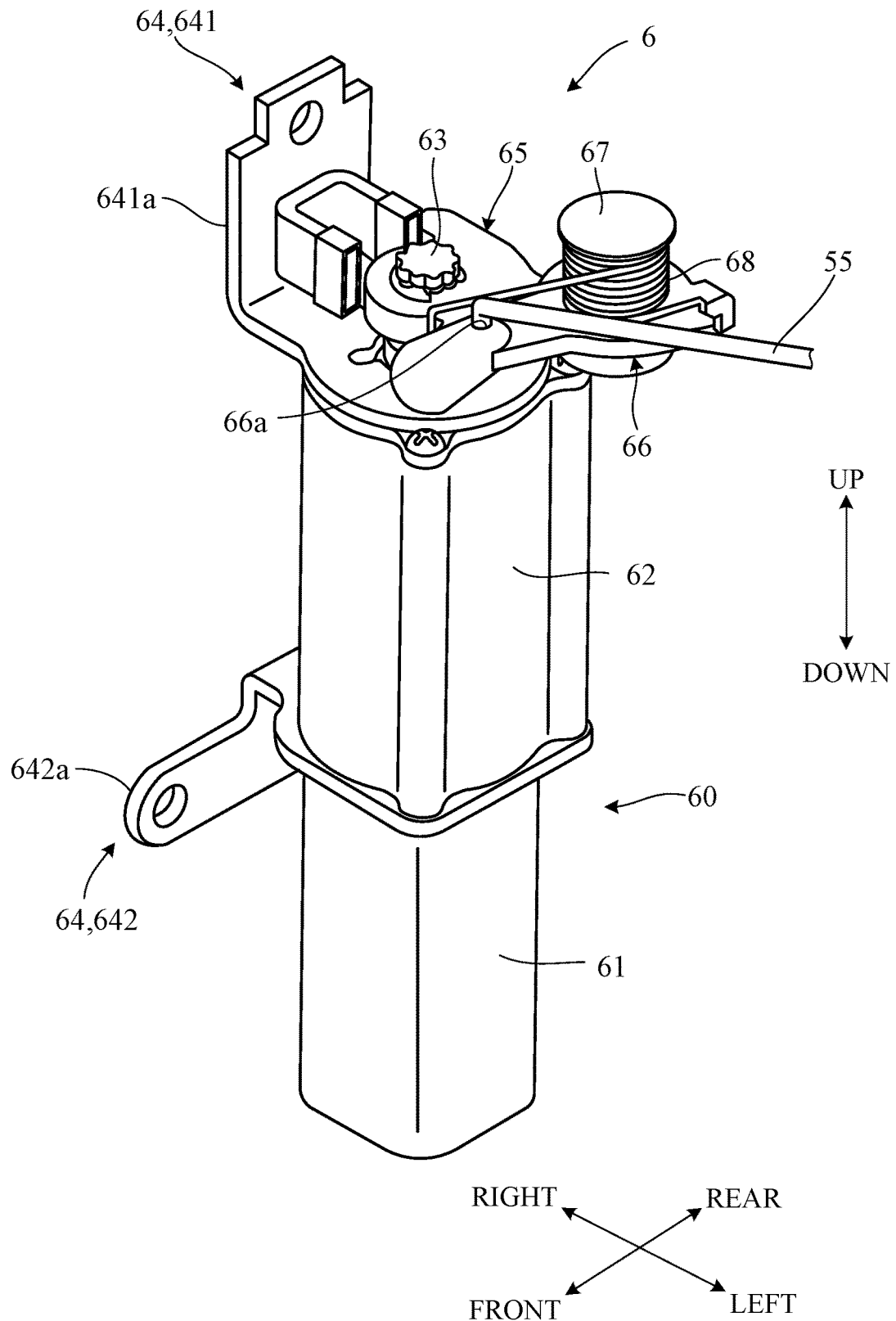
FIG. 4 is a perspective view of a posture changing mechanism provided on the seat frame of FIG. 3.

The posture changing mechanism 6 is arranged on the left and right sides of the pressure-receiving plate 5. The pressure-receiving plate 5 is tilted in the lateral direction by the posture changing mechanism 6, and the orientation of the seat back 2 in the lateral direction is changed. FIG. 4 is a perspective view illustrating the overall configuration of the posture changing mechanism 6 on the right side. Although not illustrated in the drawings, the posture changing mechanism 6 on the left side is configured to be symmetrical with respect to the posture changing mechanism 6 on the right side.

As illustrated in FIG. 4, the posture changing mechanism 6 has an actuator unit 60. The actuator unit 60 includes an actuator 61 and a gear box 62 located above the actuator 61. The housings of the actuator 61 and the gear box 62 each have a substantially rectangular parallelepiped shape, and the actuator 61 and the gear box 62 are arranged coaxially with each other. An output shaft 63 of the gear box 62 projects upward from the upper end surface of the housing of the gear box 62. The actuator 61 is composed of, for example, a stepping motor that can run in forward and reverse directions. The driving power of the actuator 61 is input to the gear box 62, reduced by the gear box 62 at a predetermined reduction ratio, and transmitted to the output shaft 63. The actuator unit 60 is supported by the side frames 222 via the retaining bracket 64.

The retaining bracket 64 includes an upper retaining bracket 641 fixed to the upper end surface of the gear box 62 and a lower retaining bracket 642 fixed to the boundary between the actuator 61 and the gear box 62. Mounting surfaces 641a and 642a are formed on the right end surfaces of the retaining brackets 641 and 642 respectively, and the retaining brackets 641 and 642 are attached to the left and right inner side surfaces of the right side frame 222 by bolts or the like via the mounting surfaces 641a and 642a.

A first link member 65 is arranged above the portion of the upper retaining bracket 641 extending in a horizontal plane. The first link member 65 is a plate-shaped member extending in the horizontal direction facing the upper surface of the upper retaining bracket 641. The base end portion of the first link member 65 is fixed to the output shaft 63, and the tip end portion can swing in the front-rear direction around the output shaft 63. The second link member 66 is arranged above the first link member 65. The second link member 66 is a plate-shaped member extending in the horizontal direction facing the upper surface of the first link member 65. The base end portion of the second link member 66 is rotatably connected to the tip end portion of the first link member 65 via a pin 67. A connecting hole 66a that the right end portion of the upper connecting wire 55 rotatably engages is formed at the tip end portion of the second link member 66.

A torsion spring 68 is provided on the upper surface of the base end portion of the second link member 66. One end portion of the torsion spring 68 engages with the first link member 65, and the other end portion engages with the second link member 66. By the torsion spring 68, the second link member 66 is urged in a clockwise direction as viewed from above against the first link member 65.

Figure 5A:
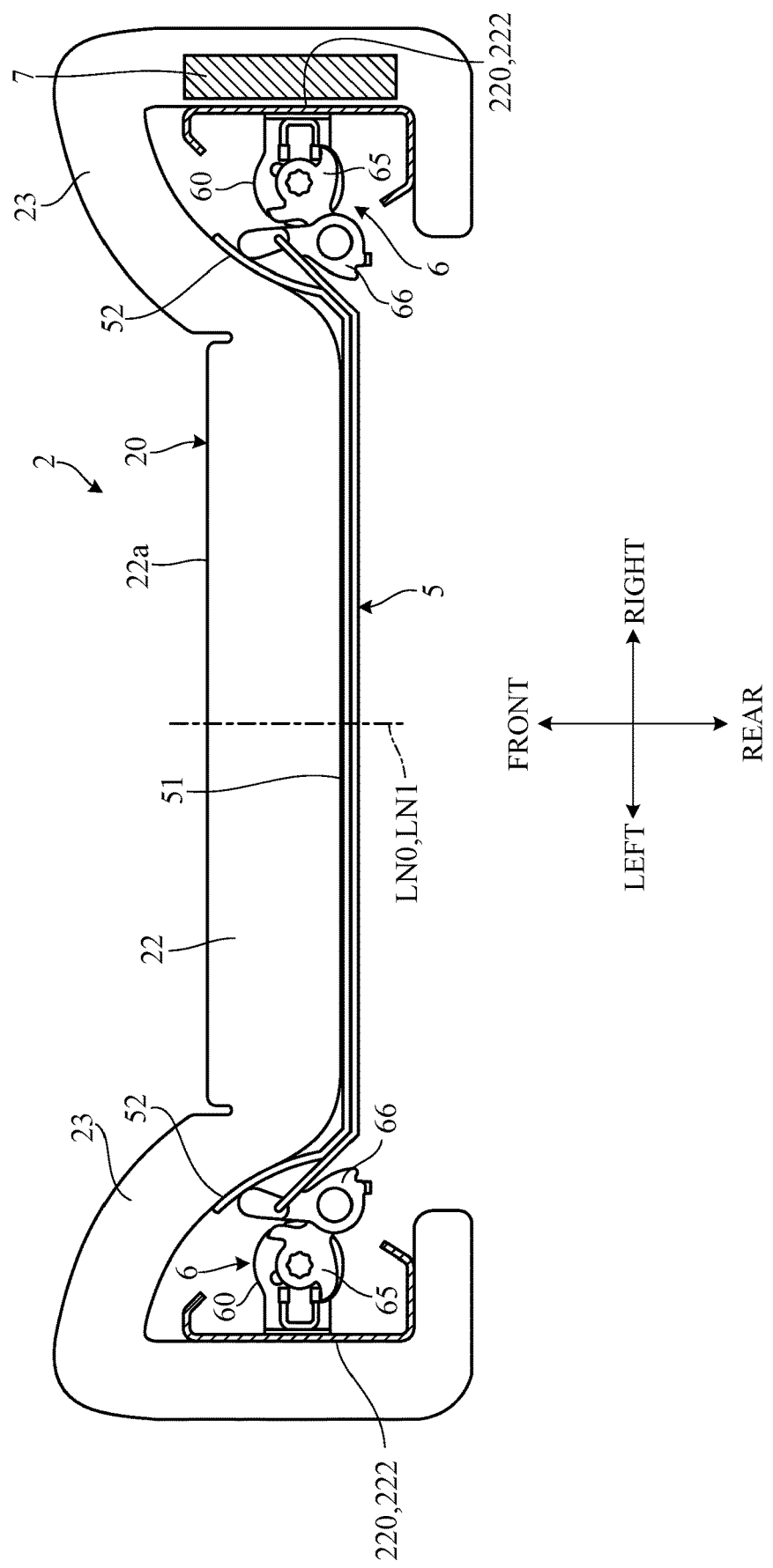
FIG. 5A is a cross-sectional view of a seat back along line V-V of FIG. 2, with a pressure-receiving plate in an initial position.
Figure 5B:
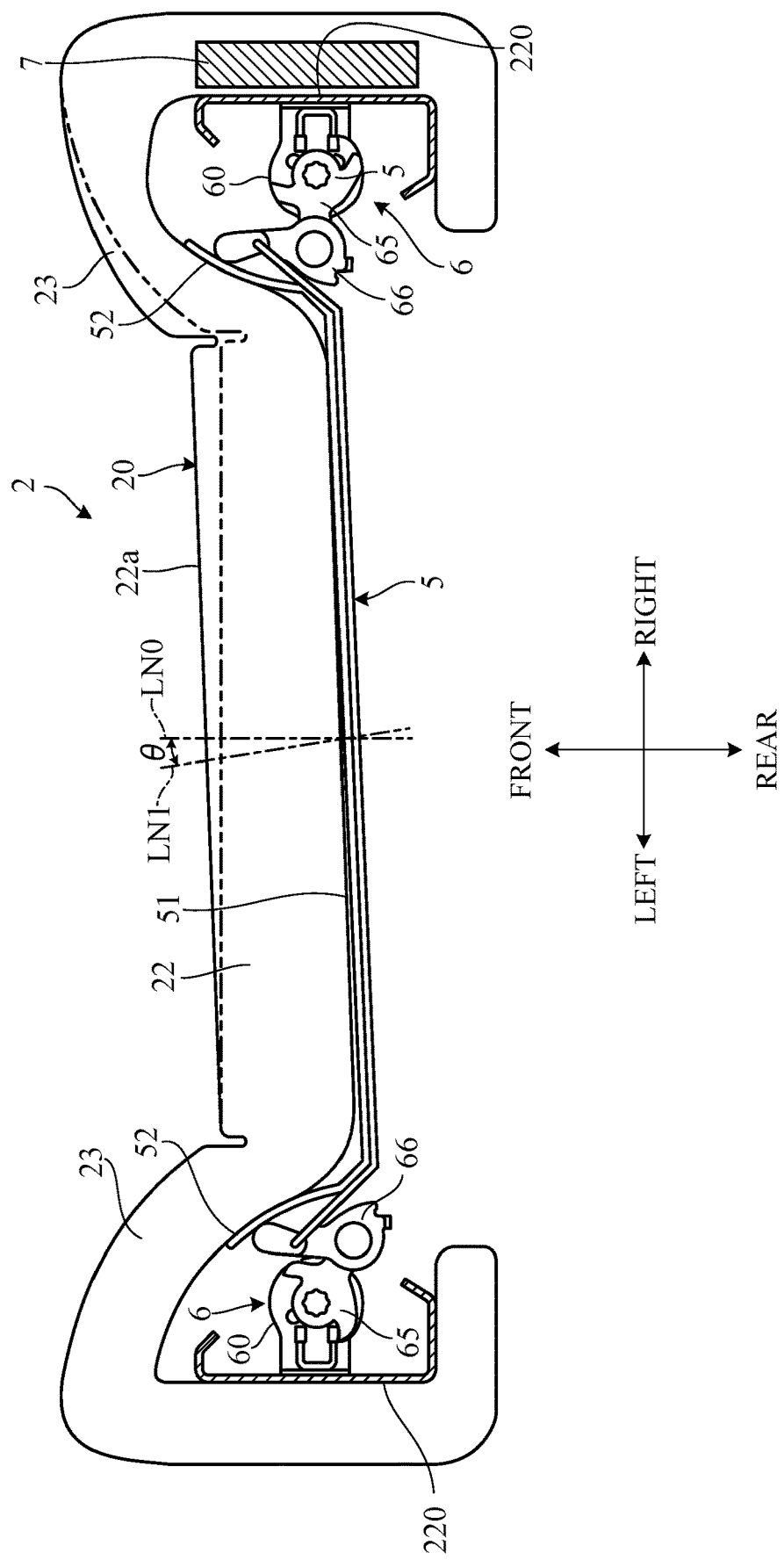
FIG. 5B is a cross-sectional view of the seat back along line V-V of FIG. 2, illustrating a state in which the pressure-receiving plate is in a first advanced position.
Figure 5C:
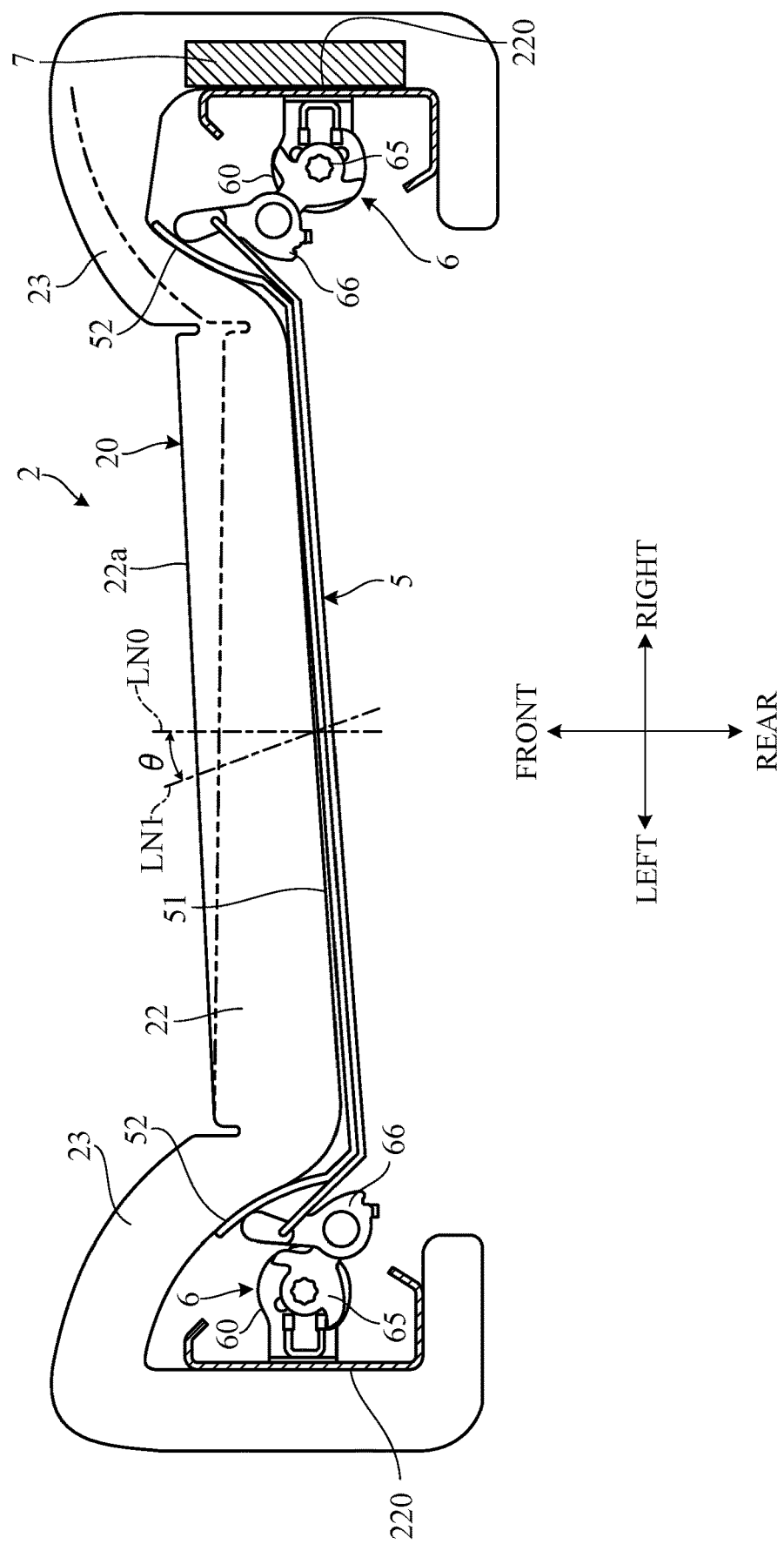
FIG. 5C is a cross-sectional view of the seat back along line V-V of FIG. 2, illustrating a state in which the pressure-receiving plate is in a second advanced position.
Figure 5D:
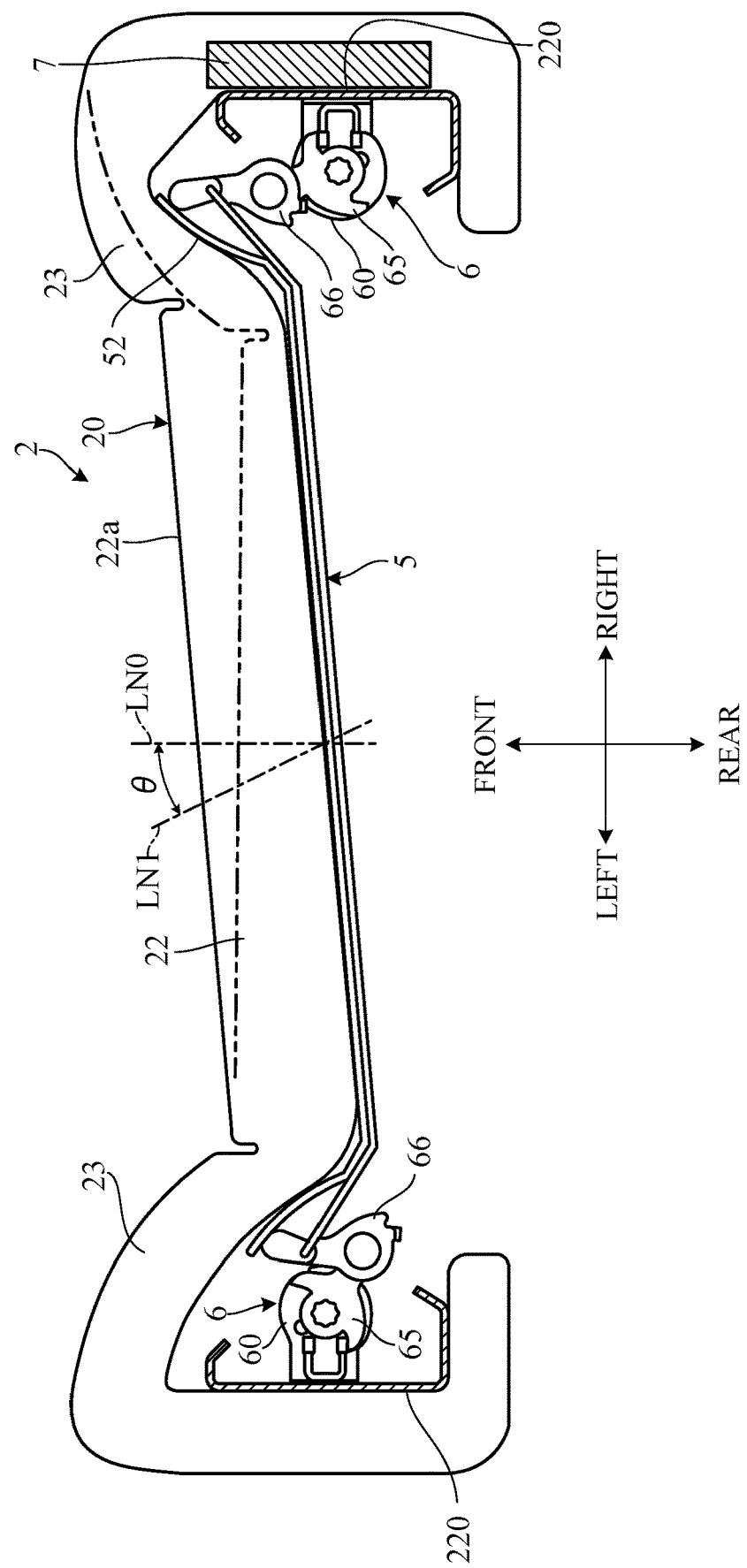
FIG. 5D is a cross-sectional view of the seat back along line V-V of FIG. 2, illustrating a state in which the pressure-receiving plate is in a third advanced position.

FIGS. 5A to 5D are views illustrating an example of the operation by the posture changing mechanism 6, and correspond to the cross-sectional views of the seat back 2 taken along line V-V of FIG. 2, respectively. That is, FIG. 5A illustrates the state in which the pressure-receiving plate 5 is in the initial position, FIG. 5B illustrates the state in which it is in the first advanced position, FIG. 5C illustrates the state in which it is in the second advanced position, and FIG. 5D illustrates the state it is in the third advanced position. Note that, in FIGS. 5A to 5D, the illustration of the skin material 21 on the surface of the seat back pad 20 is omitted.

Straight line LN0 in the drawing is a reference line extending in the front-rear direction through the center of the pressure-receiving plate 5 in the lateral direction, and straight line LN1 is a direction line orthogonal to the pressure-receiving plate 5 through the center of the pressure-receiving plate 5 in the lateral direction. The direction of the pressure-receiving plate 5 (the direction that the back support portion 51 faces) is represented by the angle (inclination angle θ) formed by reference line LN0 and direction line LN1. That is, when the inclination angle θ is 0°, the pressure-receiving plate 5 faces forward, and the larger the inclination angle θ to the left, the greater the degree toward the left of the pressure-receiving plate 5.

In the normal state before an object collides with the car, the pressure-receiving plate 5 is in the initial position as illustrated in FIG. 5A. At this time, direction line LN1 coincides with reference line LN0, and the inclination angle θ is 0°. Therefore, the front surface of the seat back 2, more specifically, the front surface 22a of the central portion 22 of the seat back pad 20 faces forward, and the occupant seated on the vehicle seat S faces forward.

In this state, when an object (for example, another car) collides with the door DR on the right side of the car, the actuator 61 (stepping motor) of the posture changing mechanism 6 on the right side is driven in the forward direction by a command from the controller 90 (FIG. 8) described later. Note that the actuator 61 of the posture changing mechanism 6 on the left side remains stopped.

As a result, the tip end portion of the first link member 65 of the posture changing mechanism 6 on the right side moves forward, the second link member 66 rotates while moving forward, and the right end portion of the pressure-receiving plate 5 gradually moves forward as the amount of rotation of the stepping motor increases. As a result, the pressure-receiving plate 5 sequentially moves from an initial position of FIG. 5A to a first advanced position of FIG. 5B, a second advanced position of FIG. 5C, and a third advanced position of FIG. 5D. Therefore, the inclination angle θ to the right gradually increases, and the pressure-receiving plate 5 faces the left side, which is the opposite direction to the collision side (right side) as a whole.

When the right end portion of the pressure-receiving plate 5 moves forward in this way, the right end portion of the seat back pad 20 is pushed forward by the right end portion of the pressure-receiving plate 5. Therefore, in the seat back 2, the right end portion, which is the end portion of the car C on the collision side, moves forward with respect to the left end portion, which is the end portion opposite to the collision side of the car, and the front surface 22a of the seat back pad 20 faces diagonally forward to the left as a whole. As a result, the occupant seated on the vehicle seat 100 is pushed diagonally forward to the left, which is a direction away from the door DR on the collision side.

The occupant protection device according to the first embodiment includes the vehicle seat 100 and a side airbag module 7 (side airbag device) that is inflated and deployed when an object collides with a side surface of the car C. As illustrated in FIGS. 1 and 5A, the side airbag module 7 is provided between the door DR of the car C and the side frame 222 on the door DR side of the left and right side frames 222. That is, the side airbag module 7 is provided at the side end portion of the vehicle seat 100 on the door DR side. The side airbag module 7 can also be installed on the door DR instead of the vehicle seat 100.

Figure 6:
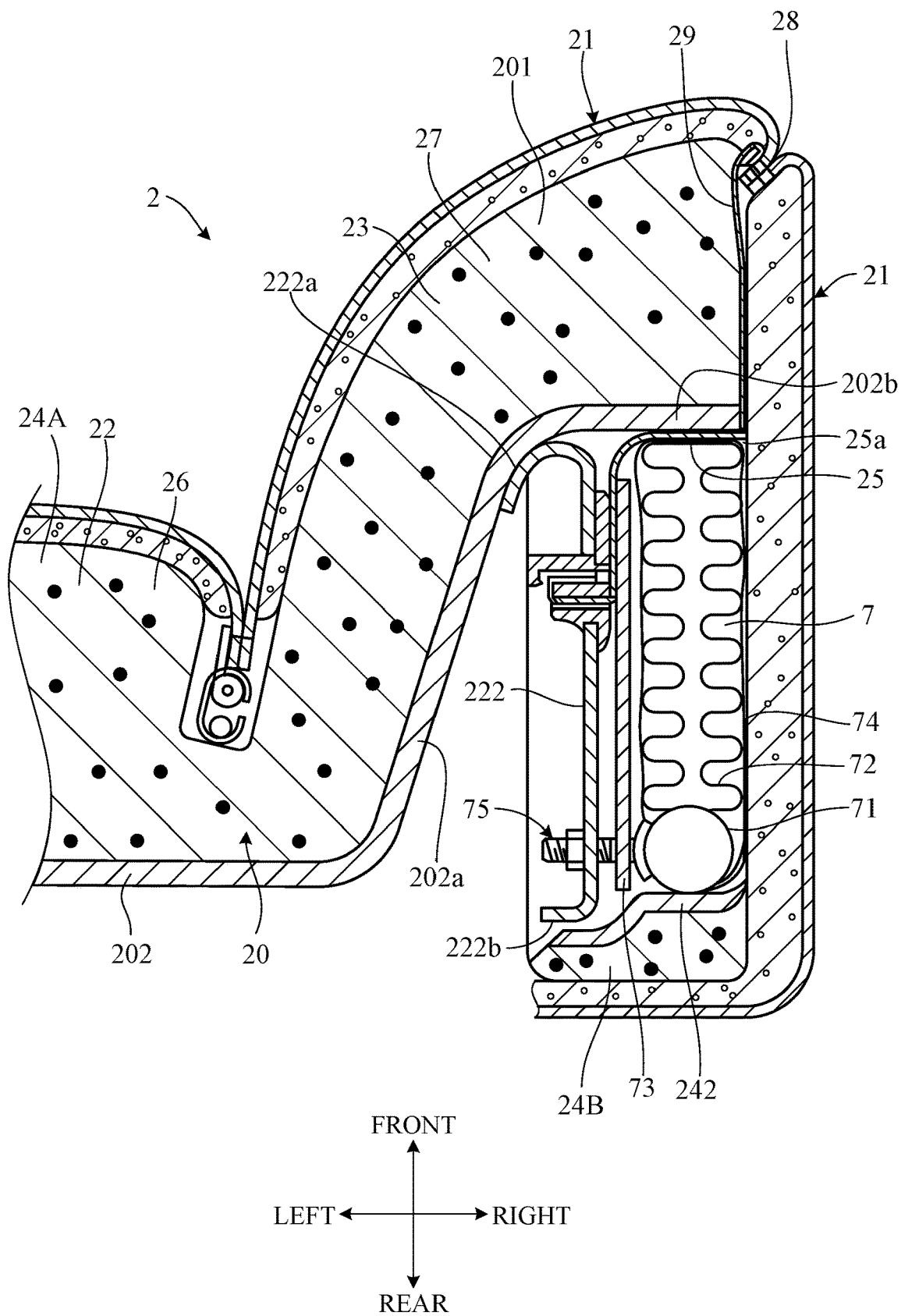
FIG. 6 is a cross-sectional view of the seat back along line VI-VI of FIG. 2.
Figure 7:
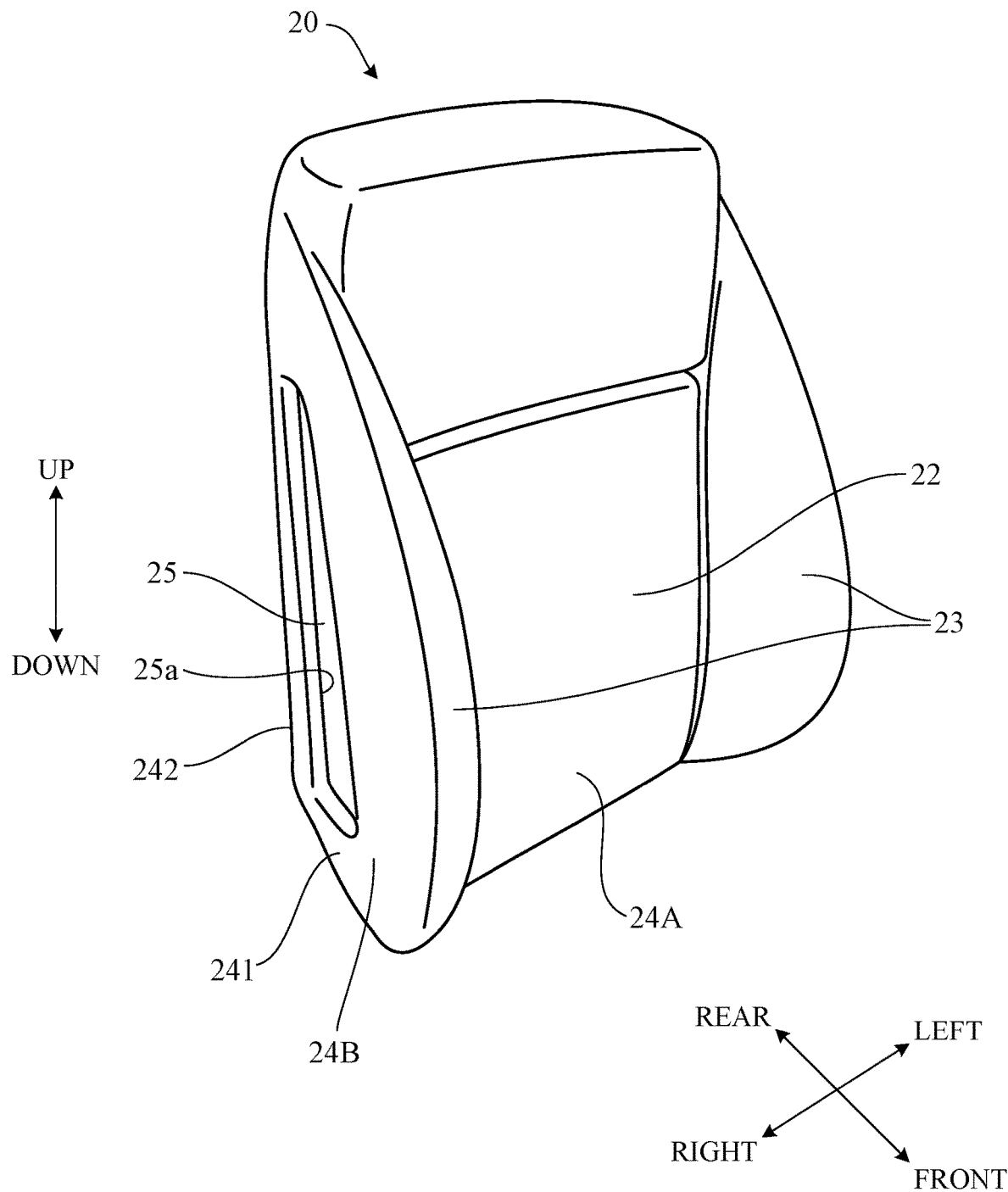
FIG. 7 is an external perspective view of a seat back pad according to the first embodiment.

FIG. 6 is a cross-sectional view of the right end portion of the seat back 2 taken along line VI-VI of FIG. 2, and FIG. 7 is a perspective view of the seat back pad 20 (FIG. 2). The seat back pad 20 is a member that can elastically support the occupant, and as illustrated in FIG. 6, is configured by adhering a flat planar member 202 formed of a non-woven fabric or the like to the back surface of a foamed molded product 201 of foamed resin.

As illustrated in FIGS. 6 and 7, side surface pad portions 24B constituting the left and right side surfaces of the seat back pad 20 are formed at the left and right side end portions of the seat back pad 20, and a front surface pad portion 24A forming the front surface of the seat back pad 20 is formed by the central portion 22 and the side portions 23 of the seat back pad 20 between the left and right side surface pad portions 24B. Note that the front surface pad portion 24A and the side surface pad portion 24B may be continuously integrally formed with each other, or may be formed separately.

The central portion 22 of the seat back pad 20 constitutes a back surface support portion 26 that supports the back of the upper body of the occupant, and the side portions 23 constitute bank portions 27 that support the side portions of the upper body of the occupant. The bank portions 27 protrude forward on both sides of the vehicle seat 100 in the lateral direction and retain the occupant seated on the vehicle seat 100 from the left and right. That is, the bank portions 27 project forward than the back surface support portion 26 and function as pressure-receiving portions that receive the load of the occupant. As illustrated in FIG. 6, the planar member 202 on the rear surface of the seat back pad 20 includes a front inclined portion 202a that inclines forward and outward in the lateral direction along the rear surface of the bank portion 27, and a lateral extending portion 202b extending outward in the lateral direction from a front end portion of the front inclined portion 202a.

As illustrated in FIG. 7, the side surface pad portion 24B includes a side portion 241 forming a side surface of the vehicle seat 100 and a back portion 242 extending inward in the lateral direction from the rear end of the side portion 241. As illustrated in FIGS. 6 and 7, a substantially rectangular parallelepiped through-hole 25a that penetrates the side portion 241 in the lateral direction is opened in the side portion 241 along the outer shape of the side airbag module 7, and a substantially rectangular parallelepiped space 25 is formed by the through-hole 25a.

As illustrated in FIG. 6, in the space 25, the right side frame 222 extending in the front-rear direction is arranged, and the side airbag module 7 is housed. A front end portion 222a of the side frame 222 is bent in an arc shape so as to face diagonally rearward to the left, and a rear end portion 222b is bent to the left. A bent-shaped boundary portion between the front inclined portion 202a and the lateral extending portion 202b of the planar member 202 contacts the front end portion 222a of the side frame 222.

In the space 25, the side frame 222 is arranged on the left side (seat center side), and the side airbag module 7 is arranged on the right side (seat end portion side) of the side frame 222. The side airbag module 7 is attached to the right side of the side frame 222. The side airbag module 7 is configured as, for example, a caseless side airbag module including no module case. Note that the side airbag module 7 may be configured to include a module case.

The side airbag module 7 includes an inflator 71 arranged at the rear end portion of the space 25, a side airbag 72 folded and arranged in front of the inflator 71, a retainer 73 that is arranged between the side frame 222 and the inflator 71 and retains the inflator 71, and a wrapping material 74 that wraps the side airbag 72. The back portion 242 of the side surface pad portion 24B contact the inflator 71. The inflator 71 is fixed to the side frame 222 via the retainer 73 by a fixing member 75 including bolts and nuts. Note that the method of attaching the inflator 6a is not limited to the method described above.

The inflator 71 is connected to the side airbag 72, and the side airbag 72 can be inflated and deployed in front of the vehicle seat 100 by a gas ejected from the inflator 71. The side airbag 72 is retained in a folded state by a wrapping material 74 made of a cloth bag or the like. The wrapping material 74 can be easily ruptured when the side airbag 6b is deployed.

A fracture portion 28 extending in the up-down direction is formed on the skin material 21 at the right end portion of the bank portion 27. The fracture portion 28 is expanded and ruptured when the side airbag 72 is inflated and deployed. A reinforcing cloth 29 is co-sewn to the fracture portion 28. The reinforcing cloth 29 is made of a cloth-like material having low elasticity and transmits the tensile force due to the inflation of the side airbag 72 to the fracture portion 28. In this way, the space 25 is used not only as a housing space for the side airbag module 7 but also as a passage for pulling the reinforcing cloth 29 from the fracture portion 28 of the skin material 21 toward the side frame 222 side.

Figure 8:
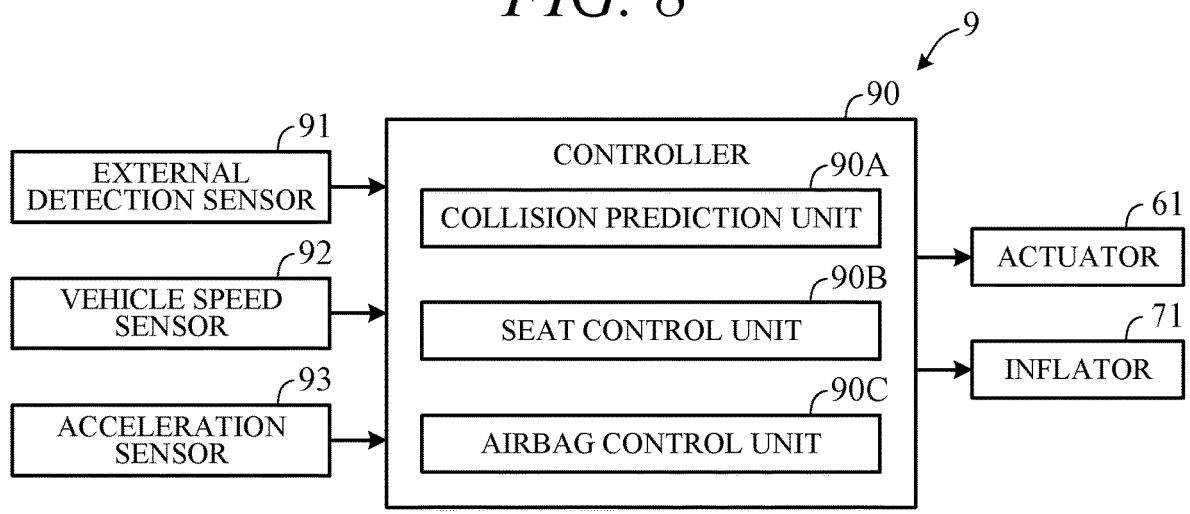
FIG. 8 is a block diagram illustrating a schematic configuration of a vehicle control device according to the first embodiment.

Next, a configuration of a vehicle control device that controls the operation of the posture changing mechanism 6 and the side airbag module 7 will be described. FIG. 8 is a block diagram illustrating a schematic configuration of a vehicle control device 9 mounted on the car C. As illustrated in FIG. 8, the vehicle control device 9 is configured so as to include a controller 90 as a key component. An external detection sensor 91, a vehicle speed sensor 92, an acceleration sensor 93, an actuator 61, and an inflator 71 are connected to the controller 90 via an in-vehicle network such as a controller area network (CAN).

The external detection sensor 91 detects an external situation which is peripheral information of the car C. As the external detection sensor 91, a rider that measures scattered light with respect to omnidirectional irradiation light of the car C to measure the distance from the car C to surrounding obstacles, a radar that detects other cars and obstacles around the car C by irradiating electromagnetic waves and detecting reflected waves, a camera that is mounted on the car C and includes an image sensor such as a charge-coupled device (CCD), a complementary metal-oxide-semiconductor (CMOS), or the like to image the periphery (front, rear, and sides) of the car C, and the like are included.

The vehicle speed sensor 92 detects the vehicle speed of the car C. The acceleration sensor 93 detects acceleration generated by acceleration, deceleration, turning, collision, or the like of the car. The acceleration sensor 93 includes, for example, a front-rear acceleration sensor that detects acceleration in the front-rear direction of the car, a lateral acceleration sensor that detects lateral acceleration in the lateral direction (vehicle width direction) of the car, and an up-down acceleration sensor that detects acceleration in the up-down direction of the car.

The controller 90 is an electronic control circuit (electronic control unit (ECU)) and is composed of a microcomputer including a central processing unit (CPU) as an operating circuit, storage units such as a read-only memory (ROM), a random access memory (RAM), and the like, and other peripheral circuits such as an input/output interface (I/O interface) and the like. The controller 90 reads a program stored in advance in the storage unit and executes a predetermined process.

The controller 90 includes a collision prediction unit 90A, a seat control unit 90B, and an airbag control unit 90C as functional configurations. Note that, although FIG. 8 illustrates a single controller (ECU) for convenience, a plurality of ECUs may be used instead of a single ECU to carry out the functions of each unit. That is, the controller 90 may also be configured by a plurality of microcomputers communicable via an in-vehicle network such as a CAN or the like.

The collision prediction unit 90A detects an object around the car (own car) C based on the signal input from the external detection sensor 91 and determines the type of the object (pedestrian, car, or the like) based on the characteristics of the detected object. The collision prediction unit 90A monitors the detected object and calculates the collision probability α with the own car C for each monitored object. Further, when the monitored object collides with the own car, the speed at the time of collision (collision speed v) is estimated. The collision speed v is the relative speed of the object with respect to the own car C, and the collision prediction unit 90A calculates the collision speed v based on the signals from the external detection sensor 91 and the vehicle speed sensor 92. When detecting a monitored object having a collision probability α with the own car C of a predetermined value α1 or more, the collision prediction unit 90A predicts that the own car C and the monitored object will collide and outputs a collision prediction signal. The collision prediction signal also includes information indicating a collision mode (frontal collision, left-right side collision, and rear collision) between the own car C and the collision prediction object and the collision speed.

When the collision prediction signal is output from the collision prediction unit 90A, the seat control unit 90B outputs a control signal to the actuator 61 to move the pressure-receiving plate 5 and performs seat posture control to direct the orientation of the seat back 2 to the orientation opposite to the collision side. For example, when the collision mode is a right side collision, the seat control unit 90B outputs a control signal to the actuator 61 in the posture changing mechanism 6 on the right side of the vehicle seat 100 to execute the seat posture control to move the pressure-receiving plate 5 from the initial position (FIG. 5A) to the advanced positions (FIGS. 5B, 5C, and 5D) by rotating the actuator 61 (stepping motor) in the forward direction.

The seat control unit 90B is configured to change the operating amount of the actuator 61 according to the collision speed (estimated value) v included in the collision prediction signal when executing the seat posture control. For example, the larger the collision speed v, the larger the driving amount of the actuator 61 (amount of rotation in the forward direction of the stepping motor). Specifically, when the collision speed v is less than a first threshold value v1, the seat control unit 90B sets the driving amount of the actuator 61 to the small level, and the pressure-receiving plate 5 is moved from the initial position of FIG. 5A to the first advanced position of FIG. 5B.

When the collision speed v is equal to or higher than the first threshold value v1 and less than a second threshold value v2 larger than the first threshold value v1, the seat control unit 90B sets the driving amount of the actuator 61 to the middle level, and the pressure-receiving plate 5 is moved from the initial position of FIG. 5A to the second advanced position in FIG. 5C. When the collision speed v is equal to or higher than the second threshold value v2, the seat control unit 90B sets the driving amount of the actuator 61 to the large level, and the pressure-receiving plate 5 is moved from the initial position in FIG. 5A to the third advanced position in FIG. 5D. Note that the first threshold value v1 and the second threshold value v2 are stored in advance in the storage unit of the controller 90.

When the collision mode predicted by the collision prediction unit 90A is the right side collision and the acceleration A detected by the acceleration sensor 93 is equal to or higher than a predetermined threshold value A1, the airbag control unit 90C outputs a control signal to the inflator 71 to cause to deploy the side airbag 72. Instead of outputting the control signal to the inflator 71, the control signal may be output to the device that controls the inflator 71, and the side airbag 72 may be deployed by the operation of the inflator 71. When the collision prediction signal is output from the collision prediction unit 90A, the airbag control unit 90C may change the acceleration threshold value A1 described above according to the collision speed v. The threshold value A1 is a threshold value for detecting the side collision. For example, when the collision speed v included in the collision prediction signal is high, the airbag control unit 90C changes the threshold value A1 to a low value.

Figure 9:
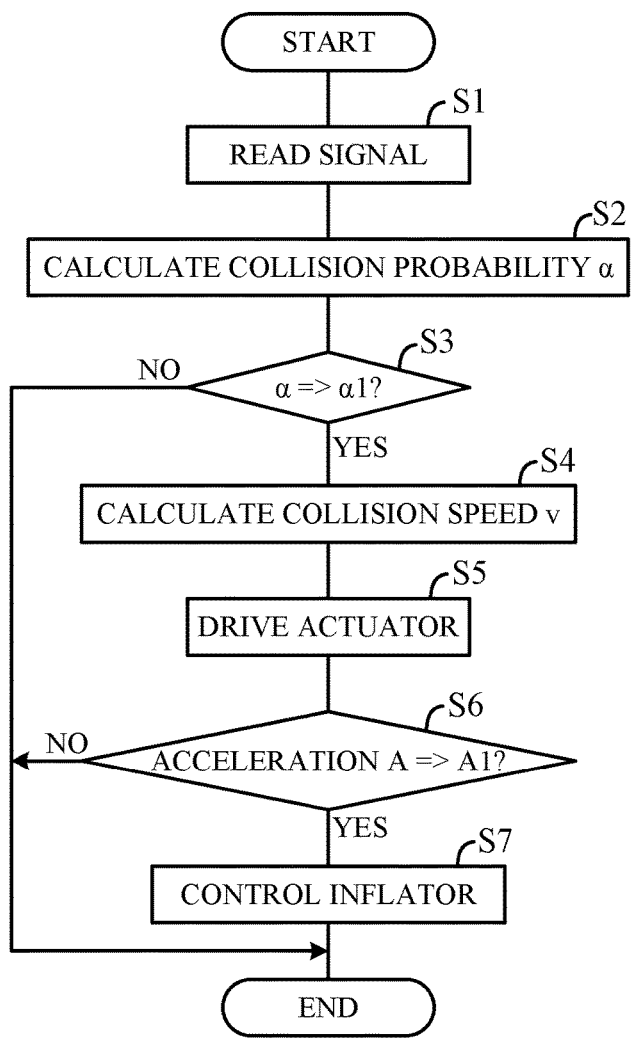
FIG. 9 is a flowchart illustrating an example of processing executed by the controller of FIG. 8.

FIG. 9 is a flowchart illustrating an example of processing executed by the CPU of the controller 90 according to a program stored in advance. The processing represented in this flowchart is started by, for example, turning on the engine key switch, and is repeated at a predetermined cycle.

First, in step S1, signals from the external detection sensor 91, the vehicle speed sensor 92, and the acceleration sensor 93 are read. Next, in step S2, an object around the car C is detected based on the signal input from the external detection sensor 91, and a collision probability α in which the detected object collides with the side surface (for example, the right side surface) of the car C is calculated. Next, in step S3, it is determined whether or not the collision probability α is equal to or higher than the predetermined value α1. If affirmed in step S3, the collision prediction signal is output and the process proceeds to step S4. On the other hand, if it is denied in step S3, the process ends without outputting the collision prediction signal.

In step S4, the collision speed v is calculated based on signals from the external detection sensor 91 and the vehicle speed sensor 92. Next, in step S5, the control signal is output to the actuator 61 in response to the collision prediction signal. In this case, magnitudes of the collision speed v and the threshold values v1 and v2 are compared, and the actuator 61 is driven by a predetermined target driving amount according to the comparison result. As a result, the seat back 2 is directed inward in the vehicle width direction.

Next, in step S6, a threshold value A1 is set according to the collision prediction signal, and it is determined whether or not the acceleration A detected by the acceleration sensor 93 is equal to or higher than the threshold value A1. If affirmed in step S6, the process proceeds to step S7, and if denied, the process ends. In step S7, a control signal is output to the inflator 71 to deploy the side airbag 72. Note that the process of step S7 may be performed after the actuator 61 has been driven by a predetermined amount or after the seat back 2 has moved to a predetermined position.

The operation of the first embodiment is summarized as follows. When the own car C is stopped or running, if an object such as another car or the like approaches the right side surface of the own car C and the collision probability α becomes a predetermined value α1 or more before the object collides, the collision prediction signal is output to drive the actuator 61 (step S5). At this time, the larger the estimated collision speed v, the larger the driving amount of the actuator 61 (stepping motor). When the actuator 61 is driven, the right end portion of the pressure-receiving plate 5 moves forward according to the driving amount (FIGS. 5A to 5D).

As a result, the pressure-receiving plate 5 tilts diagonally forward to the left as a whole, and the right bank portion 27 of the left and right bank portions 27 is pushed forward. Therefore, the occupant (driver) is pressed on the right side portion and the right shoulder portion of the back diagonally forward to the left by the pressure-receiving portion (seat back pad 20, pressure-receiving plate 5, bank portion 27, and the like) to be shifted from a front-facing posture to a slightly left-facing posture. As a result, sufficient space can be secured between the occupant and the door DR for inflating and deploying the side airbag 72. After that, when the lateral acceleration A detected by the acceleration sensor 93 becomes equal to or higher than the threshold value A1, that is, when a side collision is detected, the side airbag 72 is inflated and deployed by the inflator 71 (step S7).

As described above, in the first embodiment, when an object is predicted to collide with the car C, the occupant is pushed in the direction away from the door DR (door DR that is predicted to collide) by the pressure-receiving portion (seat back pad 20, pressure-receiving plate 5, bank portion 27, and the like). Then, when it is detected that the object collides with the car C, the side airbag 72 is inflated and deployed. Therefore, when the car C collides with the object, the occupant has been pushed in a direction away from the door DR before the occupant comes into contact with the side airbag 72 that is inflated and deployed, so that the sufficient space can be secured between the occupant and the door DR to inflate and deploy the side airbag 72 even when the door DR is deformed to be dented inward by the collision of the object. As a result, the occupant can be effectively protected by the side airbag 72 that is inflated and deployed.

According to the first embodiment, the following effects can be obtained.

(1) An occupant protection device according to the first embodiment includes a vehicle seat 100 arranged in an inner space of a door DR of a vehicle and a side airbag module 7 that is provided in the vehicle seat 100 and including a side airbag 72 that is inflated and deployed between the door DR and the vehicle seat 100 (FIG. 1). The vehicle seat 100 includes a pressure-receiving portion such as a seat back pad 20, a pressure-receiving plate 5, a bank portion 27, and the like that receives a load from a seated occupant, a seat frame 200 that supports the pressure-receiving portion, and a controller 90, a posture changing mechanism 6 (actuator 61), and the like that move the pressure-receiving portion so that the occupant is pushed away from the door DR before the occupant comes into contact with the side airbag 72 when the side airbag is activated that the side airbag module 7 is activated and the side airbag 72 is inflated and deployed due to an impact from the outside acting on the door DR (FIGS. 2, 3, and 8).

With this configuration, it is possible to secure a sufficient deployment space for the side airbag 72. Also, when a collision is detected (predicted), the pressure-receiving portion that is a part of the vehicle seat 100 is moved instead of the entire vehicle seat 100, so that the actuator 61 can be prevented from becoming large. Therefore, it is possible to reduce the size of the vehicle seat 100 while ensuring a sufficient deployment space for the side airbag 72.

(2) The pressure-receiving portion is composed of a pressure-receiving plate 5 extending in the seat width direction of the vehicle seat 100 (FIG. 3). The end portion of the pressure-receiving plate 5 in the seat width direction, for example, the right end portion of the pressure-receiving plate 5 provided on the driver's seat 101 is configured to be movable to the front of the car C (FIGS. 5A to 5D). As a result, the posture of the occupant can be changed toward the inside in the vehicle width direction when a collision to the car C is predicted by a simple configuration in which the end portion in the lateral direction of the pressure-receiving plate 5 is simply moved forward.

(3) The posture changing mechanism 6 includes an actuator 61 (actuator unit 60) attached to the end portion in the seat width direction of the seat frame 200, that is, the side frame 222 (FIGS. 3 and 4). The controller 90 moves the end portion in the lateral direction of the pressure-receiving plate 5 forward by the power of the actuator 61 when activating the side airbag that the collision of an object with the car C is predicted (FIGS. 5A to 5D). By using the power of the actuator 61 in this way, the pressure-receiving plate 5 can be easily moved in the desired direction, and it is possible to secure sufficient space for the side airbag 72 to be inflated and deployed at the optimum timing before the side airbag 72 contacts the occupant.

(4) The controller 90 moves only the right end portion of the pressure-receiving plate 5 of the vehicle seat 100 (for example, the driver's seat 101) forward by the power of the actuator 61 when the side airbag is activated (FIGS. 5A to 5D). Therefore, it is not required to increase the size of the actuator 61, and the entire vehicle seat including the actuator 61 can be compactly configured.

(5) The vehicle seat 100 includes a seat back 2 (FIG. 2). The pressure-receiving portion is the pressure-receiving plate 5 that supports the back of the occupant via the seat back pad 20 of the seat back 2 and further a bank portion 27 that protrudes on both sides of the seat back 2 in the seat width direction (FIGS. 2 and 6). Therefore, when the side seat back is activated, the occupant is pushed by the movement of the pressure-receiving portion that receives the load of the occupant during normal driving, it is possible to reduce the discomfort of the occupant compared to a configuration that pushes the occupant by a dedicated member that does not receive the load of the occupant during normal driving.

(6) The controller 90 controls the actuator 61 so that the amount of movement of the pressure-receiving plate 5 and the seat back 2 increases as the estimated collision speed v increases. As a result, the larger collision speed v is, it is possible to make the amount of movement of the occupant larger, so that the deployment space for the side airbag 72 can be secured more appropriately. That is, according to the first embodiment, the side airbag 72 can be sufficiently inflated and deployed even when the collision speed v is high, and the occupant can be appropriately protected.

The first embodiment can be modified into various forms. Hereinafter, modified examples of the first embodiment will be described.

First Modification

In the first embodiment described above, at the time of activating the side airbag when the object collides with the side wall (door DR) of the car C and the side airbag module 7 as the side airbag device is activated, the orientation of the seat back 2 is changed by driving the actuator 61 of the posture changing mechanism 6 by the controller 90 to move the pressure-receiving plate 5. However, the actuator 61 may be driven to change the orientation of the seat back 2 even when the side airbag is not activated. For example, when the car C turns in normal driving, the actuator 61 may be driven to change the orientation of the seat back 2.

In this case, for example, a steering angle sensor for detecting the steering angle of the steering wheel SW is provided, the turning direction of the car C is detected based on the signal from the steering angle sensor, and when the car C turns to the left, the controller 90 may rotate the actuator 61 (stepping motor) of the posture changing mechanism 6 on the right side in the forward direction, and the right end portion of the pressure-receiving plate 5 may be moved forward. As a result, the pressure-receiving plate 5 gets to face the turning direction (leftward) as a whole. According to this configuration, when turning the car C, it is possible to support the driver's driving operation by supporting the driver's shoulders from behind or pushing the arms forward, so that the driver can be well supported. Note that, when returning the seat back 2 to its original orientation, the controller 90 may reverse the actuator 61 (stepping motor) of the posture changing mechanism 6 on the right side.

When the collision prediction signal is input, it is preferable that the controller 90 drives the actuator 61 at a higher speed than when turning the car C as described above. As a result, when the object collides with the car C, the posture of the occupant can be changed faster than when turning, and a sufficient deployment space for the side airbag 72 can be secured.

Second Modification

In the first embodiment described above, the example in which the position of the side airbag module 7 is not changed when the right end portion (door DR side end portion) of the pressure-receiving portion (seat back pad 20, pressure-receiving plate 5, bank portion 27, and the like) of the driver's seat 101 moves forward has been described, but the side airbag module 7 may be moved together with the pressure-receiving portion. However, as in the first embodiment described above, it is configured that the position of the side airbag module 7 does not change when the right end portion (door DR side end portion) of the pressure-receiving portion moves forward so that the side airbag 72 can be stably inflated and deployed.

Third Modification

In the first embodiment described above, the right end portion (door DR side end portion) of the pressure-receiving portion (seat back pad 20, pressure-receiving plate 5, bank portion 27, and the like) is moved forward when the side seat back is activated, but the form of movement of the pressure-receiving portion is not limited to this. That is, the pressure-receiving portion may be moved in any way as long as at least one of the left and right end portions is configured to move in at least one of the front-rear direction, the lateral direction, and the up-down direction. For example, the left end portion of the pressure-receiving portion (the end portion opposite to the door DR side) may be moved rearward. As a result, the same as described above, the posture of the occupant in the driver's seat (right seat) is changed from a front-facing posture to a slightly left-facing posture. As a result, the sufficient space can be secured between the occupant and the door DR to inflate and deploy the side airbag 72.

Fourth Modification

In the first embodiment described above, one actuator 61 as a power source is provided at each of both the left and right end portions of the vehicle seat 100, but the arrangement of the power source is not limited to this. For example, the power source may be provided only at the end portion of the vehicle seat 100 on the door DR side. As a result, the power source at the end portion opposite to the door DR side can be omitted, so that the number of parts of the vehicle seat 100 can be reduced, the weight of the vehicle seat 100 can be reduced, and the power consumption can be suppressed. Note that, when moving the end portion on the side opposite to the door DR side to the rear as in the third modification described above, the power source may be provided only on the side opposite to the door DR side, and the power source on the door DR side may also be omitted.

Fifth Modification

In the first embodiment described above, a single actuator 61 is provided at each of both the left and right end portions of the seat back 2 as the power source for the posture changing mechanism 6, but a plurality of actuators as power sources may be provided at the end portion on the door DR side or the end portion opposite to the door DR side of the vehicle seat 100. With a plurality of power sources, it is possible to move a plurality of locations on one of the left and right end portions of the pressure-receiving portion. For example, the occupant's shoulders and waist can be pushed to change the posture. As a result, it is possible to further expand the deployment space of the side airbag 72. The orientation of the seat back 2 can be finely adjusted by configuring the power source to move at least one of the left and right end portions of the pressure-receiving portion.

Sixth Modification

Figure 10:
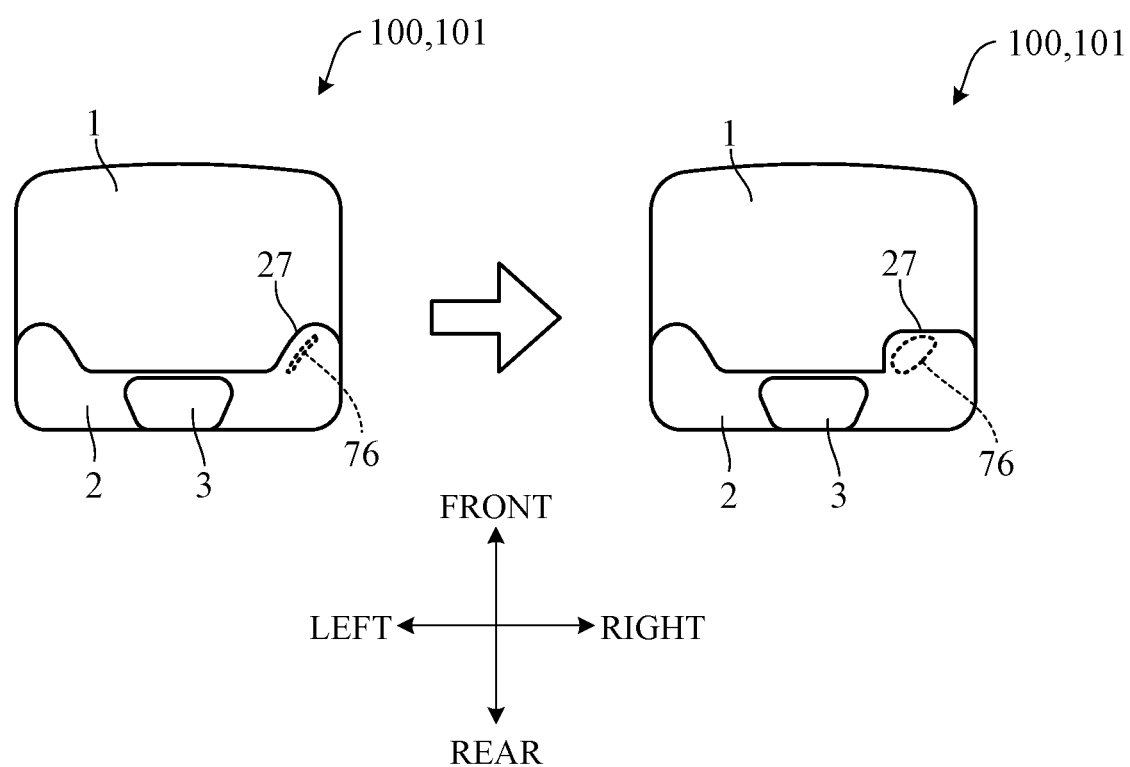
FIG. 10 is a plan view schematically illustrating a configuration of a vehicle seat according to a sixth modification of the first embodiment and is a diagram illustrating states before and after a movement of a pressure-receiving portion.

In the first embodiment described above, the pressure-receiving portion is moved by an actuator 61 such as a stepping motor and the like, but the power source is not limited to this. FIG. 10 is a plan view of the vehicle seat 100 (for example, the driver's seat 101) when an air cell (airbag) is used as another example of the power source, illustrating states before and after a movement of the pressure-receiving portion. As illustrated on the left side of FIG. 10, an air cell 76 is normally stored inside the bank portion 27 in a contracted state. When it is predicted that an object will collide with the car C, a compressor (not illustrated in the drawings) is controlled by a command from the controller 90 to send air from the compressor to the air cell 76. As a result, as illustrated on the right side of FIG. 10, the air cell 76 is inflated, and the inflation force can deform the bank portion 27 to the front or to the left opposite to the door DR, and the occupant can be separated away from the door DR.

Seventh Modification

Figure 11:
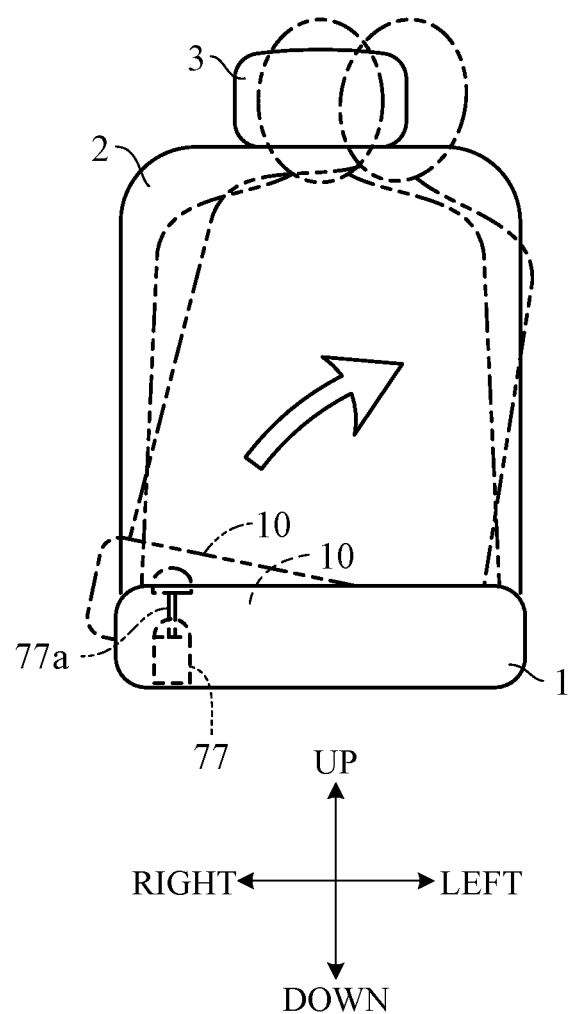
FIG. 11 is a front view schematically illustrating a configuration of a vehicle seat according to a seventh modification of the first embodiment.

In the first embodiment described above, in order to secure the space for inflating and deploying the side airbag 72, the seat back 2 is moved by driving the actuator 61 as a moving part, but it is also possible to move the seat cushion 1. FIG. 11 is a front view of the vehicle seat 100 (driver's seat 101) illustrating an example thereof. As illustrated in FIG. 11, an actuator 77 that includes an electric motor and a ball screw mechanism or a rack and pinion mechanism as a motion conversion mechanism that converts the rotational motion of the electric motor into a linear motion of the rod 77a is attached to the seat cushion frame 210 (not illustrated in FIG. 11). The actuator 77 is provided so as to be able to press upward the right end portion (end portion on the door DR side) of the seat cushion pad 10 as the pressure-receiving portion.

When it is predicted that an object will collide with the car C, the controller 90 drives the actuator 77 as a moving part to extend the rod 77a vertically upward and push the right end portion of the seat cushion pad 10 upward. As a result, it is possible to change the posture of the occupant toward the inside in the seat width direction and secure the sufficient deployment space for the side airbag 72. Note that, instead of moving the right end portion of the seat cushion pad 10 upward, the left end portion of the seat cushion pad 10 may be moved downward, or the right end portion of the seat cushion pad 10 may be moved upward and the left end portion of the seat cushion pad 10 may be moved downward.

Eighth Modification

Figure 12:
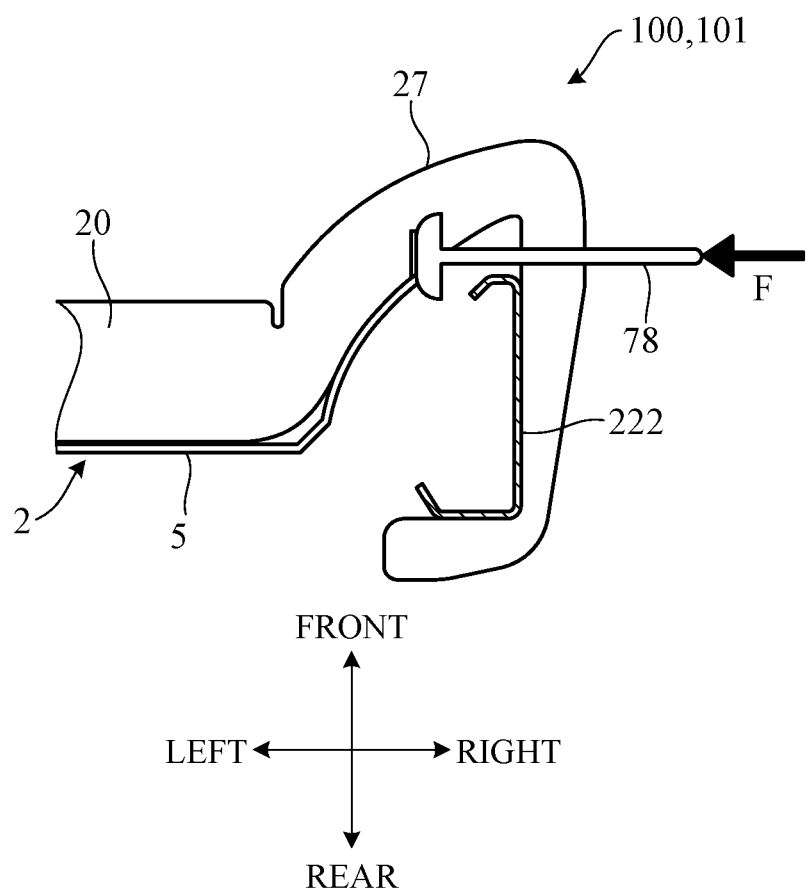
FIG. 12 is a cross-sectional view schematically illustrating a configuration of a main part of a seat back pad of a vehicle seat according to an eighth modification of the first embodiment.

In the first embodiment described above, the bank portion 27 as the pressure-receiving portion is moved in the front-rear direction, but it may be moved in the lateral direction. FIG. 12 is a cross-sectional view of a main part of the seat back 2 of the vehicle seat 100 (driver's seat 101) illustrating an example thereof. As illustrated in FIG. 12, a rod-shaped protruding portion 78 extending in the lateral direction is provided at the right end portion of the seat back 2. The left end portion of the protruding portion 78 is fixed to the right end portion of the pressure-receiving plate 5, and the right end portion of the protruding portion 78 penetrates the side portion 23 of the seat back pad 20 and projects to the right from the right surface of the seat back 2. With this configuration, when an object collides with the door DR on the right side of the car C and the door DR is deformed so as to be recessed inward, the protruding portion 78 is moved to the left, that is, pushed inward in the lateral direction the car C by the impact force F from the deformed door DR. As a result, the bank portion 27 on the right side of the driver's seat 101 is pressed to the left.

As a result, the protruding portion 78 displaces the bank portion 27 to the left, and the occupant is pushed in the direction away from the door DR on the right side (leftward). Therefore, sufficient space can be secured between the occupant and the door DR for inflating and deploying the side airbag 72. In this way, by displacing the bank portion 27 of the vehicle seat 100 by utilizing the deformation of the door DR, the occupant can be separated from the door DR without using the power source including the electric motor and the like (for example, the actuator 61 of the first embodiment). Therefore, the weight and cost of the vehicle seat 100 can be reduced. Note that the protruding portion may be configured so as not to come into contact with the pressure-receiving plate 5 during normal driving, and as long as the door DR can press the pressure-receiving plate 5 through the protruding portion when an object collides with the door DR, the protruding portion may be configured in any way.

Ninth Modification

Figure 13:
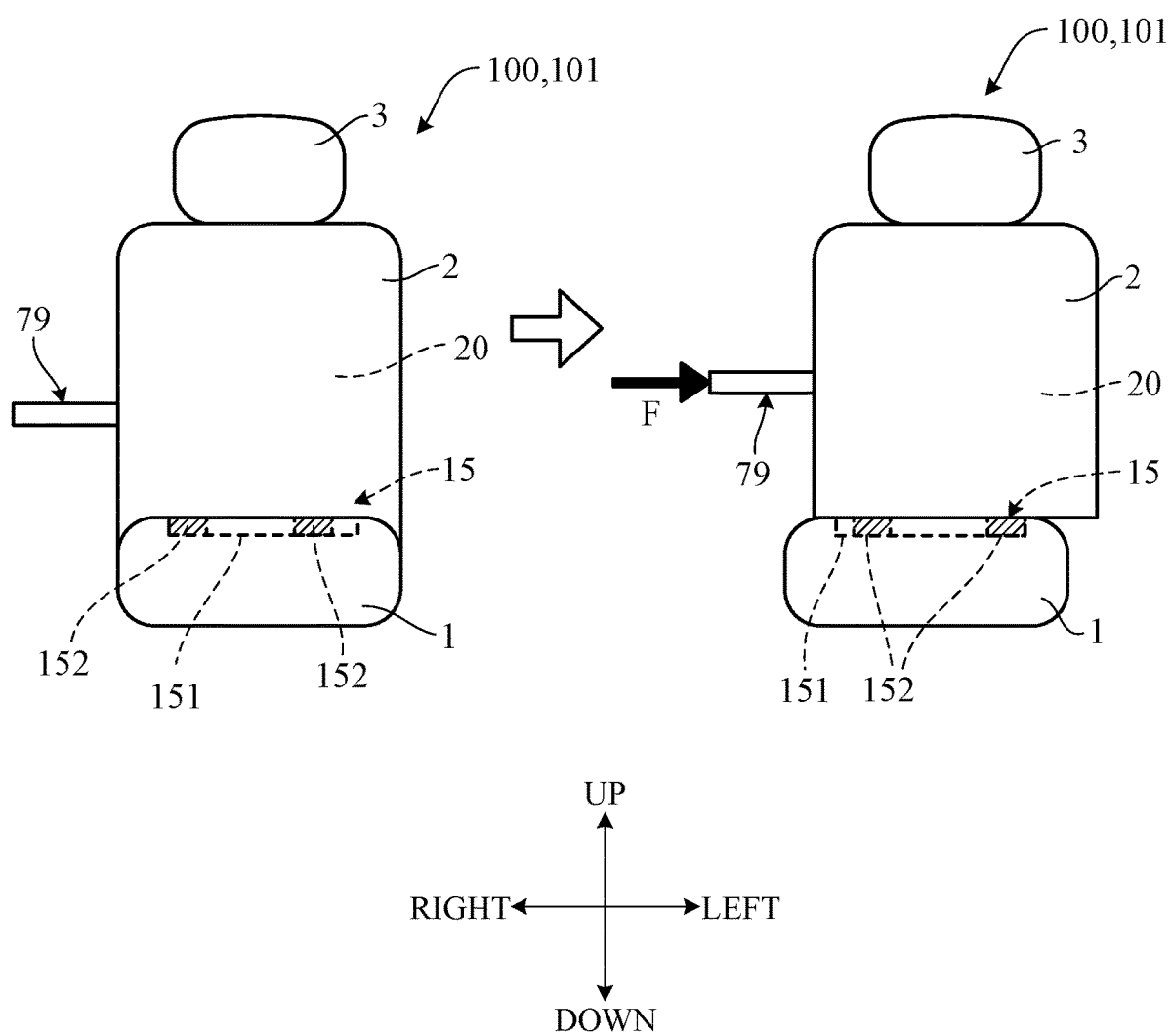
FIG. 13 is a front view schematically illustrating a configuration of a vehicle seat according to a ninth modification of the first embodiment and is a diagram illustrating states before and after a collision.

In the first embodiment described above, the seat back 2 is provided at the rear end portion of the seat cushion 1 so as to be tiltable in the front-rear direction, but the seat back 2 may be provided so as to be slidable in the lateral direction. FIG. 13 is a front view of the vehicle seat 100 (driver's seat 101) illustrating an example thereof, and illustrating each of the states before (before the collision) and after (after the collision) the impact from the door DR acts on the vehicle seat 100. As illustrated in FIG. 13, at the connecting portion between the seat cushion frame 210 (not illustrated in FIG. 13) and the seat back frame 220 (not illustrated in FIG. 13), a slide moving mechanism 15 that can slide and move the seat back frame 220 in the lateral direction with respect to the seat cushion frame 210 is provided.

The slide moving mechanism 15 includes a rail 151 extending in the lateral direction on the seat cushion frame 210 and a pair of engaging portions 152 that are fixed to the seat back frame 220 and engages with the rail 151 (schematically illustrated by hatching). The slide moving mechanism 15 includes a locking portion that is released from a locked state when a load of a predetermined value or more is applied from the right side. The locking portion can be formed of, for example, a shaft member penetrating the engaging portion 152 and the rail 151. This shaft member is destroyed when a predetermined load is applied, whereby the lock is released. A protruding portion 79 is fixed to the seat back frame 220. The protruding portion 79 is provided so as to extend to the right from the seat back frame 220 of the right seat toward the door DR. The protruding portion 78 of FIG. 12 can also be used as the protruding portion 79.

According to this configuration, when an object collides with the door DR on the right side of the vehicle and the door DR is deformed so as to be recessed inward, the protruding portion 79 is pressed to the left by an impact force F from the door DR as illustrated on the right side of FIG. 13. As a result, the locking portion of the slide moving mechanism 15 is released, and the seat back 2 (seat back frame 220) moves to the left on the rail 151. As a result, the occupant can be moved in the direction away from the door DR on the right side, and the sufficient space can be secured between the occupant and the door DR to inflate and deploy the side airbag 72. In this way, the pressure-receiving portion (pressure-receiving plate 5, bank portion 27, and seat back pad 20) of the vehicle seat 100 can be slidably moved by utilizing the deformation of the door DR, so that the power source including the electric motor and the like (for example, the actuator 61 of the first embodiment) is not required. As a result, the weight and cost of the vehicle seat 100 can be reduced.

Tenth Modification

Figure 14:
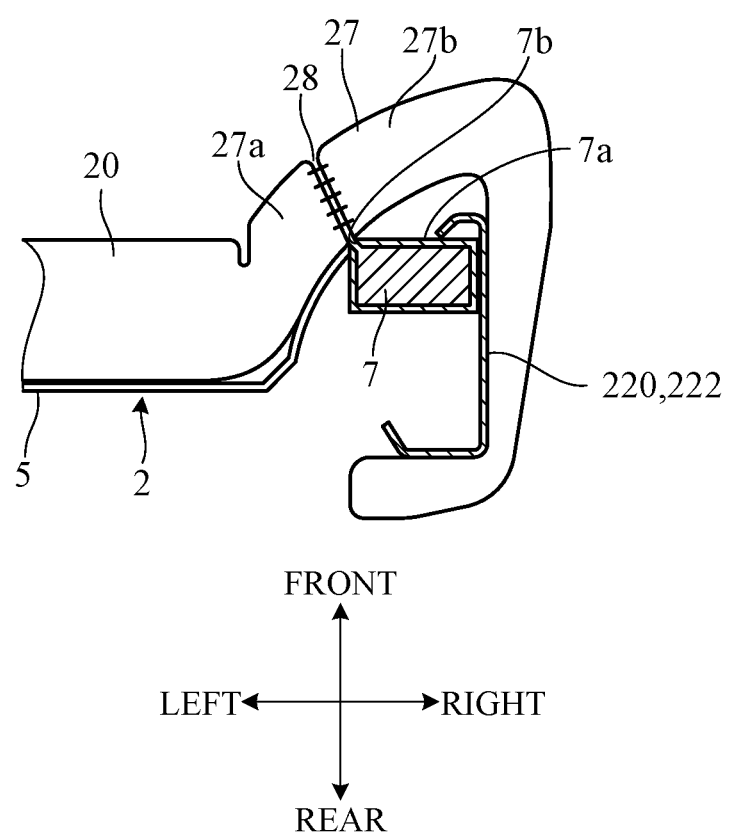
FIG. 14 is a cross-sectional view schematically illustrating a configuration of a main part of a seat back of a vehicle seat according to a tenth modification of the first embodiment.

In the first embodiment described above, the side airbag module 7 is provided on the outside in the lateral direction of the side frame 222, but it may be provided on the inside in the lateral direction. FIG. 14 is a cross-sectional view of a main part of the seat back 2 illustrating an example thereof. As illustrated in FIG. 14, the side airbag module 7 is attached to the inner side surface of the side frame 222 in the lateral direction by fastening members (not illustrated in the drawings) such as a bolt, nut, and the like.

The side airbag module 7 (illustrated by hatching for convenience) is housed in a substantially rectangular parallelepiped side airbag housing portion 7a. A fracture portion 7b is formed so as to extend in the up-down direction at a corner portion located at the front end portion on the inner side in the lateral direction of the side airbag housing portion 7a. The fracture portion 7b is a portion that breaks when the side airbag 72 of the side airbag module 7 housed in the side airbag housing portion 7a is inflated and serves as an outlet of the side airbag 72 that is deployed. The bank portion 27 of the seat back pad 20 is provided with a fracture portion 28 at a position facing the fracture portion 7b of the side airbag housing portion 7a. The fracture portion 28 is formed from the rear surface to the front surface of the seat back pad 20. The fracture portion 28 extends along the up-down direction and is broken when the side airbag 72 is inflated and deployed.

According to this configuration, the bank portion 27 as the pressure-receiving portion is separated into the inner bank portion 27a and the outer bank portion 27b by breaking the fracture portion 28 when the side airbag 72 is inflated and deployed. Therefore, in the process of inflating and deploying the side airbag 72, the inner bank portion 27a as the pressure-receiving portion is pushed diagonally forward to the left by being pressed by the side airbag 72, and the occupant is pressed so as to be faced to the left by the inner bank portion 27a. That is, according to this modification, the occupant can be pressed in the direction away from the door-DR through the pressure-receiving portion (inner bank portion 27a) before the occupant comes into contact with the side airbag 72 by utilizing the force that the side airbag 72 is inflated and deployed. With such a configuration, a power source including an electric motor or the like (for example, the actuator 61 of the first embodiment) becomes not required. As a result, the weight and cost of the vehicle seat 100 can be reduced.

In the first embodiment described above, the pressure-receiving portion is pushed inward in the lateral direction of the vehicle by driving the actuator 61, and in the eighth and ninth modifications described above, the pressure-receiving portion is pushed inward in the lateral direction of the vehicle by deforming the door DR without using the actuator 61, and further in the tenth modification described above, the pressure-receiving portion is pushed inward in the lateral direction of the vehicle by the pushing pressure of the side airbag 72, but the configuration of the moving part is not limited to those described above. That is, at the time of activating the side airbag when the side airbag device (side airbag module 7) is activated by the impact acting on the side wall of the door DR or the like from the outside to inflate and deploy the side airbag, as long as the pressure-receiving portion is moved in the direction that the occupant moves away from the side wall before the occupant contacts the side airbag, the moving part may be configured in any way.

In the first embodiment described above, the side airbag module 7 is provided at the lateral end portion of the vehicle seat 100, but it may be provided on a side wall such as the door DR or the like, or it may be provided on a side wall other than the door DR. That is, the side airbag device may be provided on either the side wall or the vehicle seat as long as it is inflated and deployed between the side wall and the vehicle seat. In the first embodiment described above, the seat back pad 20, the pressure-receiving plate 5, and the bank portion 27 are used as the pressure-receiving portion, but the configuration of the pressure-receiving portion that receives the load from the seated occupant is not limited to that described above, and the structure of the frame that supports the pressure-receiving portion is not also limited to that described above.

Second Embodiment

Hereinafter, a second embodiment of the present invention will be described with reference to the drawings. A vehicle seat according to the second embodiment of the present invention can be suitably used as a vehicle seat. Hereinafter, an embodiment of a vehicle seat as a vehicle seat will be described.

Figure 15:
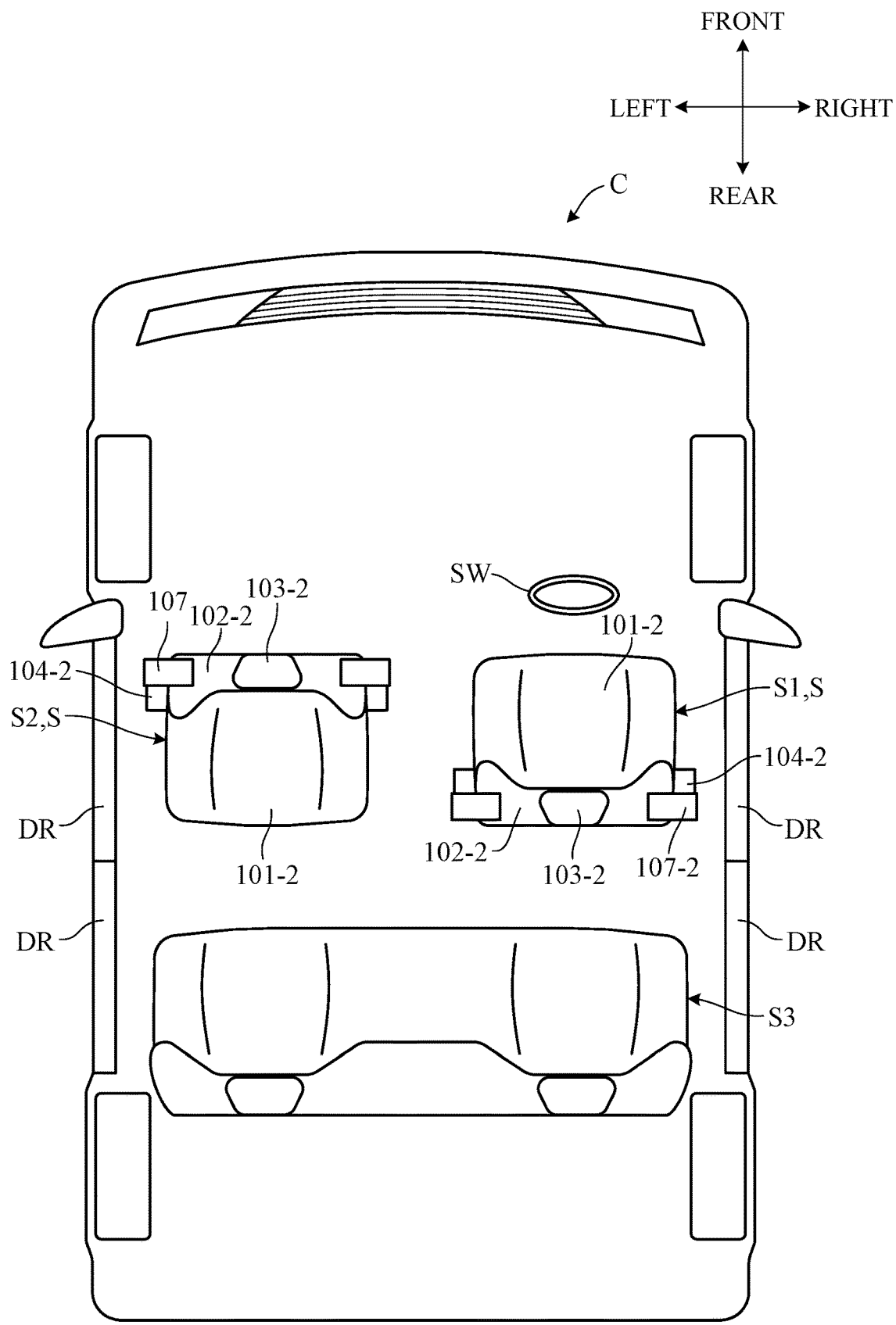
FIG. 15 is a plan view illustrating a configuration of a car in which a vehicle seat according to a second embodiment of the present invention is installed.

FIG. 15 is a plan view illustrating a configuration of a vehicle in which a vehicle seat S according to the second embodiment of the present invention is installed. In FIG. 15, the front-rear direction, the lateral direction, and the up-down direction of the vehicle are defined as illustrated in the drawing. The front-rear direction corresponds to the length direction of the car, the up-down direction corresponds to the height direction of the car, and the lateral direction corresponds to the vehicle width direction.

As illustrated in FIG. 15, the vehicle includes a steering wheel SW operated by a driver, a driver's seat S1 arranged facing the steering wheel SW, a passenger seat S2 arranged on the side of the driver's seat S1, a rear seat S3 arranged behind the driver's seat S1 and the passenger seat S2, and a door DR that can be opened and closed with respect to the vehicle body. By opening the door DR, the occupant gets on and off the vehicle from the doorway of the car. The driver's seat S1 and the passenger seat S2 are provided separately on the left and right sides independently of each other, and these are referred to as vehicle seat S, respectively.

The vehicle seat S is configured so that the orientation can be changed, and in FIG. 15, the driver's seat S1 faces forward, while the passenger seat S2 faces rearward. When the vehicle seat S is facing forward, the occupant is in a riding posture facing forward, and when the vehicle seat S is facing backward, the occupant is in a riding posture facing backward. Note that, in FIG. 15, the steering wheel SW is arranged on the right side of the car, but it can also be arranged on the left side.

Figure 16:
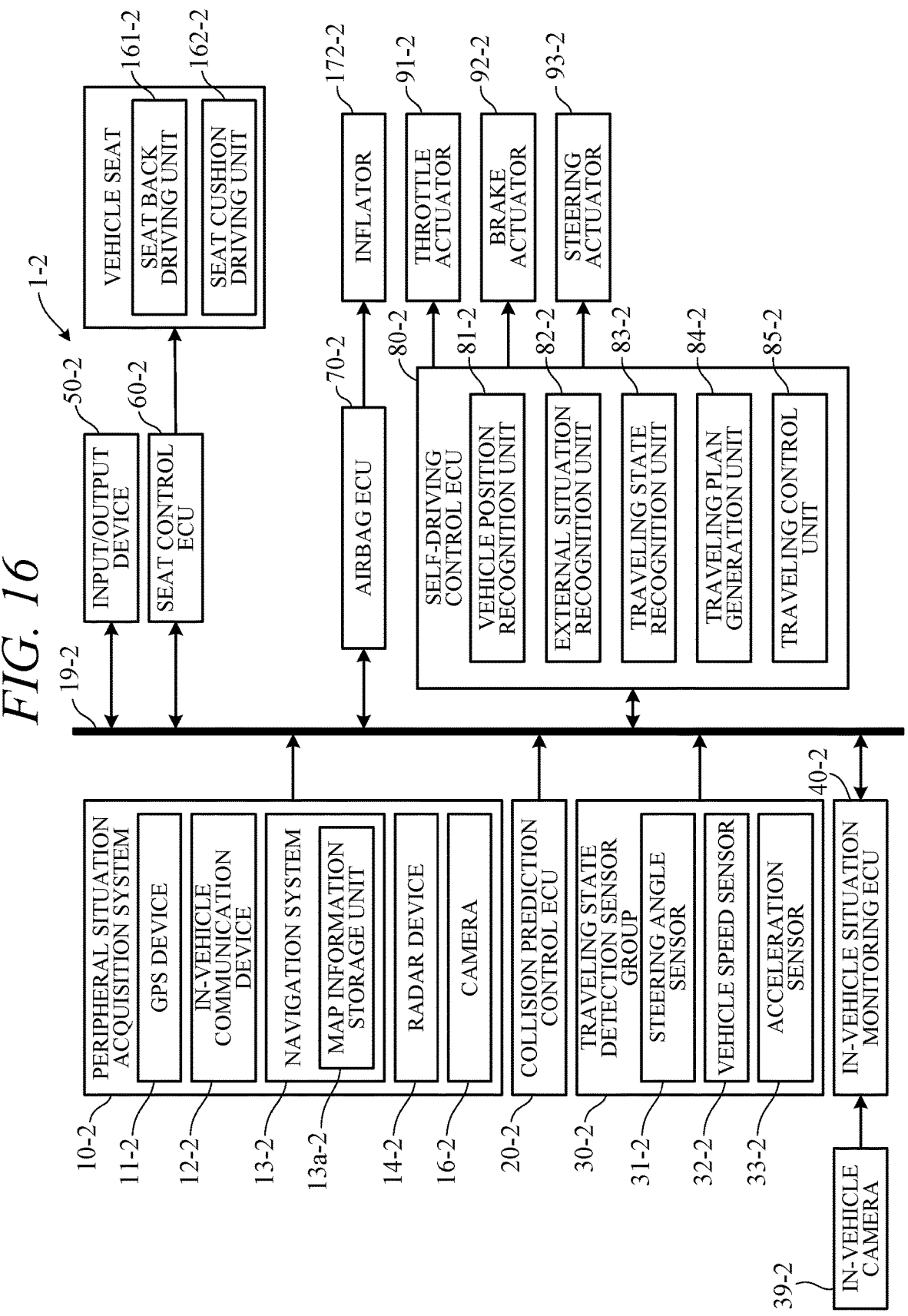
FIG. 16 is a diagram illustrating a configuration of an in-vehicle system installed in the car of FIG. 15.

FIG. 16 is a diagram illustrating a configuration of an in-vehicle system 1-2 installed in the vehicle of FIG. 15. As illustrated in FIG. 16, the in-vehicle system 1-2 includes an in-vehicle network 19-2 such as a CAN. The in-vehicle network 19-2 is connected to each of a peripheral situation acquisition system 10-2, a traveling state detection sensor group 30-2, and a plurality of electronic control units that perform different controls, that is, ECUs.

More specifically, the in-vehicle system 1-2 includes the peripheral situation acquisition system 10-2, a collision prediction control ECU 20-2, the traveling state detection sensor group 30-2, an in-vehicle camera 39-2, an in-vehicle situation monitoring ECU 40-2, an input/output device 50-2, a seat control ECU 60-2, an airbag ECU 70-2, and a self-driving control ECU 80-2. Each of these is connected by the in-vehicle network 19-2 to exchange various information.

Each of the ECUs 20-2, 40-2, 60-2, 70-2, and 80-2 is composed of a microcomputer including a CPU as an operating circuit, a storage unit such as a ROM, a RAM, and the like, and other peripheral circuits such as an input/output interface (I/O interface) and the like. Each of the ECUs 20-2, 40-2, 60-2, 70-2, and 80-2 can be composed of a plurality of microcomputers.

The peripheral situation acquisition system 10-2 includes a global positioning system (GPS) device 11-2, an in-vehicle communication device 12-2, a navigation system 13-2, a radar device 14-2, and a camera 16-2 and acquires and outputs information and the like that represents the peripheral situation of the own car.

The GPS device 11-2 determines the position of the own vehicle (for example, the latitude and longitude of the own vehicle) by receiving signals from three or more GPS satellites. The in-vehicle communication device 12-2 is a communication device that performs vehicle-to-vehicle communication with other cars and road-to-vehicle communication with a roadside device. The in-vehicle communication device 12-2 communicates with, for example, a roadside device, and acquires and outputs peripheral information including traffic information such as traffic jams, accidents, and the like on the route of the own car.

The navigation system 13-2 includes a map information storage unit 13a-2 that stores map information. The navigation system 13-2 displays the position of the own vehicle on the map based on the position information acquired from the GPS device 11 and the map information stored in the map information storage unit 13a-2 and guides a route to the destination. The navigation system 13-2, for example, sets a route from the position of the own vehicle to the destination and notifies the occupant of the target route by the display on the display and the voice output of the speaker.

The radar device 14-2 detects objects such as pedestrians, other cars, and the like that exist around the own car, such as the front, rear, left, right, and the like of the own car, and acquires and outputs the relative position and the relative velocity between the detected object and the own car. The radar device 14-2 transmits radio waves (for example, millimeter waves) around the vehicle and detects an object by receiving radio waves reflected by obstacles. Note that, in addition to the radar device 14-2, a rider device that measures the scattered light with respect to the irradiation light in all directions of the own vehicle and measures the distance from the own vehicle to the surrounding obstacles can also be used. The camera 16-2 is provided, for example, on the indoor side of the upper portion of the windshield of the car. The camera 16-2 acquires and outputs image information around the own vehicle by imaging the external situation of the car.

The traveling state detection sensor group 30-2 includes a steering angle sensor 31-2 that detects the steering angle of the steering wheel SW, a vehicle speed sensor 32-2 that detects the running speed of the own car, and an acceleration sensor 33-2 that detects the acceleration applied to the own car, as a plurality of sensors that acquire the traveling state of the car. The vehicle speed sensor 32-2 detects the vehicle speed by detecting, for example, the rotational speed of the wheels of the own vehicle and outputs the detected vehicle speed information. The acceleration sensor 33-2 detects acceleration generated by acceleration, deceleration, turning, collision, or the like of the car. The acceleration sensor 33-2 includes, for example, a front-rear acceleration sensor that detects acceleration in the front-rear direction of the car, a lateral acceleration sensor that detects lateral acceleration in the lateral direction (vehicle width direction) of the car, and an up-down acceleration sensor that detects acceleration in the up-down direction of the car. The acceleration sensor outputs the acceleration information of the vehicle to the device connected to the in-vehicle network 19-2.

The collision prediction control ECU 20-2 detects the position of an object on the image input from the camera 16-2 based on the information input from the radar device 14-2 (for example, the relative position with each object and the like). In addition, the collision prediction control ECU 20-2 determines the type of the object (pedestrian, car, or the like) from the characteristics of the detected object. The collision prediction control ECU 20-2 repeats the processing described above at a predetermined control cycle, monitors the objects existing around the own car, and calculates the collision probability with the own vehicle for each monitor target object.

When detecting a monitor target object whose collision probability with the own vehicle is equal to or higher than a predetermined value, the collision prediction control ECU 20-2 predicts that the own vehicle collides with the monitor target object and outputs the collision prediction signal to the seat control ECU 60-2 and the airbag ECU 70-2. That is, the collision prediction signal is output before the collision is detected by the acceleration sensor 33-2. The collision prediction signal also includes information indicating the collision mode (frontal collision, side collision, and rear collision) between the own vehicle and the collision prediction object.

To the airbag ECU 70-2, an inflator 172-2, which constitutes a part of an airbag module 170-2 (see FIG. 20) provided on the side portion of a seat back 102-2 of the vehicle seat S described later is connected. The inflator 172-2 is a device that generates gas to inflate the airbag 171-2. The airbag ECU 70-2 outputs a signal to the inflator 172-2 when the acceleration detected by the acceleration sensor 33-2 becomes a predetermined threshold value or more and causes the inflator 172-2 to deploy the airbag 171-2. The airbag ECU 70-2 changes the acceleration threshold value described above when the collision prediction signal is input from the collision prediction control ECU 20-2.

The self-driving control ECU 80-2 switches between a manual driving mode in which wheel steering, acceleration, deceleration, braking, and the like are performed based on the driver's operation and self-driving mode in which wheel steering, acceleration, deceleration, braking, and the like are automatically performed. The self-driving control ECU 80-2 sets the self-driving level based on the peripheral situation, traveling state, and the like of the own vehicle and performs self-driving control according to the self-driving level. Switching between the self-driving mode and the manual driving mode can be performed, for example, by the driver operating the input/output device 50-2.

The self-driving control ECU 80-2 controls a throttle actuator 91-2 that changes the throttle opening of the own car, a brake actuator 92-2 that adjusts the braking force generated by the braking device of the own car, and a steering actuator 93-2 that changes the amount of steering of the wheels by the steering device of the own car. The throttle actuator 91-2 controls the amount of air supplied to the engine (throttle opening) in response to the instruction of the self-driving control ECU 80-2 and controls the driving force of the car. The brake actuator 92-2 controls the braking system according to the instruction of the self-driving control ECU 80-2 and controls the braking force applied to the wheels of the car. The steering actuator 93-2 controls the drive of the assistance motor that constitutes a part of the electric power steering system.

When the driving mode of the vehicle is set to the self-driving mode, the self-driving control ECU 80-2 performs self-driving control processing that causes the own vehicle to travel automatically without the driving operation by the occupant seated in the driver's seat. This self-driving control processing is realized by determining the situation of the own vehicle and its surroundings based on the information from the peripheral situation acquisition system 10-2 and the traveling state detection sensor group 30-2 and controlling the throttle actuator 9-21, brake actuator 92-2, and the steering actuator 93-2.

The self-driving control ECU 80-2 selects one of a plurality of self-driving levels based on the peripheral situation of the own vehicle and the traveling state of the own car. There are levels 0 to 5 in self-driving, depending on the degree of intervention of the self-driving system. Note that level 0 is a level at which the driver manually performs all operations such as acceleration, steering, braking, and the like (manual driving state) and is described as a manual driving mode in this specification. Level 1 is a level at which the system performs any one of acceleration, steering, and braking. Level 2 is a level at which the system performs multiple operations among acceleration, steering, and braking. Level 3 is a level at which the system performs all of acceleration, steering, and braking but the operation by the driver is required in response to a request from the system, for example, when getting off the highway, in an emergency, or the like. Level 4 is a level at which the driver is not required to be involved in driving at all under specific circumstances, and the system performs all of acceleration, steering, and braking. Level 5 is a level at which the system performs all of acceleration, steering, and braking under any circumstances and the driver is not required. The self-driving control ECU 80-2 performs the self-driving control processing according to the set self-driving level.

The self-driving control processing can be realized by using a known technique. The self-driving control ECU 80-2 includes a vehicle position recognition unit 81-2, an external situation recognition unit 82-2, a traveling state recognition unit 83-2, a traveling plan generation unit 84-2, and a traveling control unit 85-2. The self-driving control ECU 80-2 generates a traveling plan along a preset target route based on the peripheral information of the vehicle and map information by each of the units described above and controls driving so that the vehicle travels autonomously according to the generated traveling plan.

The vehicle position recognition unit 81-2 recognizes the position of the own vehicle on the map based on the vehicle position information received by the GPS device 11-2 and the map information of the map information storage unit 13a-2. Note that the vehicle position recognition unit 81-2 may acquire and recognize the position of the own vehicle used in the navigation system 13-2 from the navigation system 13-2.

The external situation recognition unit 82-2 recognizes the external situation of the vehicle based on the peripheral information acquired by the in-vehicle communication device 12-2 and the detection result of the peripheral situation acquisition system 10-2 (for example, obstacle information of the radar device 14-2, imaging information of the camera 16-2, and the like). The external situation includes, for example, the position of the white line in the traveling lane with respect to the car, the position of the center of the lane, the road width, the road shape, the situation of obstacles around the car, and the like. The situation of obstacles around the vehicle includes, for example, information for distinguishing between fixed obstacles and moving obstacles, the position of the obstacle with respect to the car, the moving direction of the obstacle with respect to the car, the relative speed of the obstacle with respect to the car, and the like.

The traveling state recognition unit 83-2 recognizes the traveling state of the vehicle based on the detection results of the traveling state detection sensor group 30-2 (for example, the vehicle speed information of the vehicle speed sensor 32-2, the acceleration information of the acceleration sensor 33, and the like).

The traveling plan generation unit 84-2 generates a vehicle course based on, for example, the target route calculated by the navigation system 13-2, the vehicle position recognized by the vehicle position recognition unit 81-2, and the external situations of the vehicle (including the vehicle position and orientation) recognized by the external situation recognition unit 82-2. That is, a locus in which the vehicle travels on the target route is generated.

The traveling control unit 85-2 automatically controls the traveling of the vehicle based on the traveling plan generated by the traveling plan generation unit 84-2. The traveling control unit 85-2 outputs a control signal according to the traveling plan to each of the actuators 91-2, 92-2, and 93-2. As a result, the traveling control unit 85-2 controls the operation of the vehicle so that the vehicle travels autonomously according to the traveling plan. When controlling the traveling of the car, the traveling control unit 85-2 controls the traveling of the vehicle according to the traveling plan while monitoring the recognition results of the vehicle position recognition unit 81-2, the external situation recognition unit 82-2, and the traveling state recognition unit 83-2.

The input/output device 50-2 notifies the occupant of various information such as the state of the vehicle and the like and inputs information from the occupant. The input/output device 50-2 includes, for example, a switch for operating a direction indicator light, a headlight, a wiper, and the like, a switching operation unit related to self-driving, an operation panel having a touch sensor that displays various information and detects contact of an occupant finger and the like, an operation unit for performing various input operations, and the like. Note that the switching operation unit related to self-driving is an operation unit that gives an instruction for switching from manual driving to self-driving and instruction for switching from self-driving to manual driving.

The in-vehicle camera 39-2 is connected to the in-vehicle situation monitoring ECU 40-2, and information from the in-vehicle camera 39-2 is input into the in-vehicle situation monitoring ECU 40-2. The in-vehicle situation monitoring ECU 40-2 monitors the condition of the occupants of the own vehicle including the occupants seated in the driver's seat based on the image of the inside of the vehicle interior taken by the in-vehicle camera 39-2. The condition of the occupant includes, for example, the presence or absence of drowsiness, the presence or absence of inattentive driving, and the like. The in-vehicle situation monitoring ECU 40-2 detects biometric information including at least one of the line of sight, face orientation, eyeball movement, and face movement of the occupant by image recognition and detects the condition of the occupant (especially the occupant seated on the driver's seat) based on the detected biometric information.

The seat control ECU 60-2 controls a seat back driving unit 161-2 that adjusts the angle of the seat back 102-2 of the vehicle seat S (FIG. 17), which will be described later, and a seat cushion driving unit 162-2 that rotates a seat cushion 101-2 of the vehicle seat S centering around the vertical axis.

The seat control ECU 60-2 adjusts the angle of the seat back 102-2 by controlling the driving of the seat back driving unit 161-2. For example, when a signal indicating that the current self-driving level is 4 or higher is input from the self-driving control ECU 80-2, and if an operation signal for reclining the vehicle seat S is input from the input/output device 50-2, the seat control ECU 60-2 drives the seat back driving unit 161-2. As a result, the angle of the seat back 102-2 is adjusted so that the seat back 102-2 is laid down, and the vehicle seat S is reclined. When a signal indicating that the self-driving level becomes less than 4 is input from the self-driving control ECU 80-2 during the self-driving mode in which the self-driving level is 4 or higher, the seat control ECU 60-2 adjusts the angle of the seat back 102-2 by driving the seat back driving unit 161-2 so that the seat back 102-2 stands up.

The seat control ECU 60-2 changes the orientation of the vehicle seat S by controlling the drive of the seat cushion driving unit 162-2. For example, when a signal indicating that the current self-driving level is 4 or higher is input from the self-driving control ECU 80-2, and if an operation signal for turning the vehicle seat S to the rear is input from the input/output device 50-2, the seat control ECU 60-2 rotates the seat cushion 101-2 by 180 degrees by driving the seat cushion driving unit 162-2 to turn the vehicle seat S to the rear. When a signal indicating that the self-driving level becomes less than 4 is input from the self-driving control ECU 80-2 during the self-driving mode in which the self-driving level is 4 or higher, the seat control ECU 60-2 rotates the seat cushion 101-2 by driving the seat cushion driving unit 162-2 so that the vehicle seat S is oriented to the front.

Figure 17:
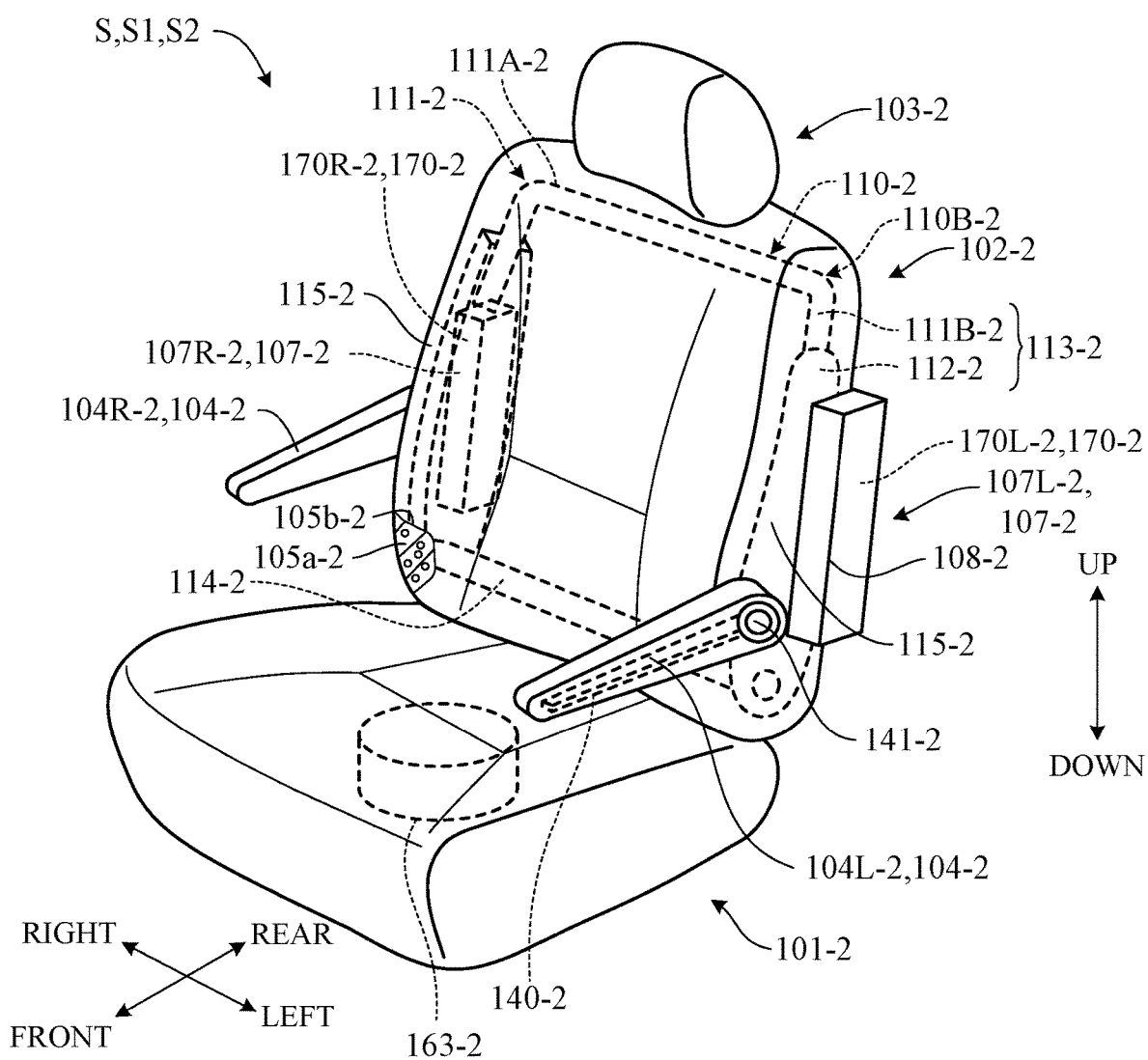
FIG. 17 is a perspective view of a vehicle seat.

FIG. 17 is a perspective view of the vehicle seat S (driver's seat S1 and passenger seat S2). The driver's seat S1 and the passenger seat S2 are symmetrically configured. In the following, for convenience, the front-rear direction, the lateral direction, and the up-down direction of the vehicle seat S are defined as illustrated in the drawing, and the configuration of each part is described according to this definition. The front of the front-rear direction is the direction in which the occupant in the riding posture faces, the lateral direction is the seat width direction, and the up-down direction is the seat height direction. Note that, when the driver's seat S1 is arranged facing the steering wheel SW as illustrated in FIG. 15, the front-rear direction, the lateral direction, and the up-down direction of the vehicle seat S correspond with the front-rear direction, the lateral direction, and the up-down direction of the car.

As illustrated in FIG. 17, the vehicle seat S includes a seat cushion 101-2 that supports the hip of the occupant, a seat back 102-2 that supports the back of the occupant, and a headrest 103-2 that is provided on the upper part of the seat back 102-2 and supports the head of the occupant, and an armrest 104-2 that is provided at the left and right side end portions of the seat back 102-2 and supports the arm portion of the occupant. The seat cushion 101-2 extends in the front-rear direction and the lateral direction and has a substantially rectangular shape as a whole when viewed from above. The seat back 102-2 extends in the up-down direction and the lateral direction and has a substantially rectangular shape as a whole when viewed from the front. The seat back 102-2 is supported by the rear end portion of the seat cushion 101-2 so as to be tiltable in the front-rear direction.

The armrest 104-2 includes a left armrest 104L-2 provided on the left side portion of the seat back 102-2 and a right armrest 104R-2 provided on the right side portion of the seat back 102-2. That is, the vehicle seat S is provided with a pair of symmetrical armrests 104-2 (104L-2 and 104R-2). Each armrest 104-2 is rotatably attached to the seat back 102-2 centering around a shaft portion 141-2 extending in the lateral direction.

Figure 18:
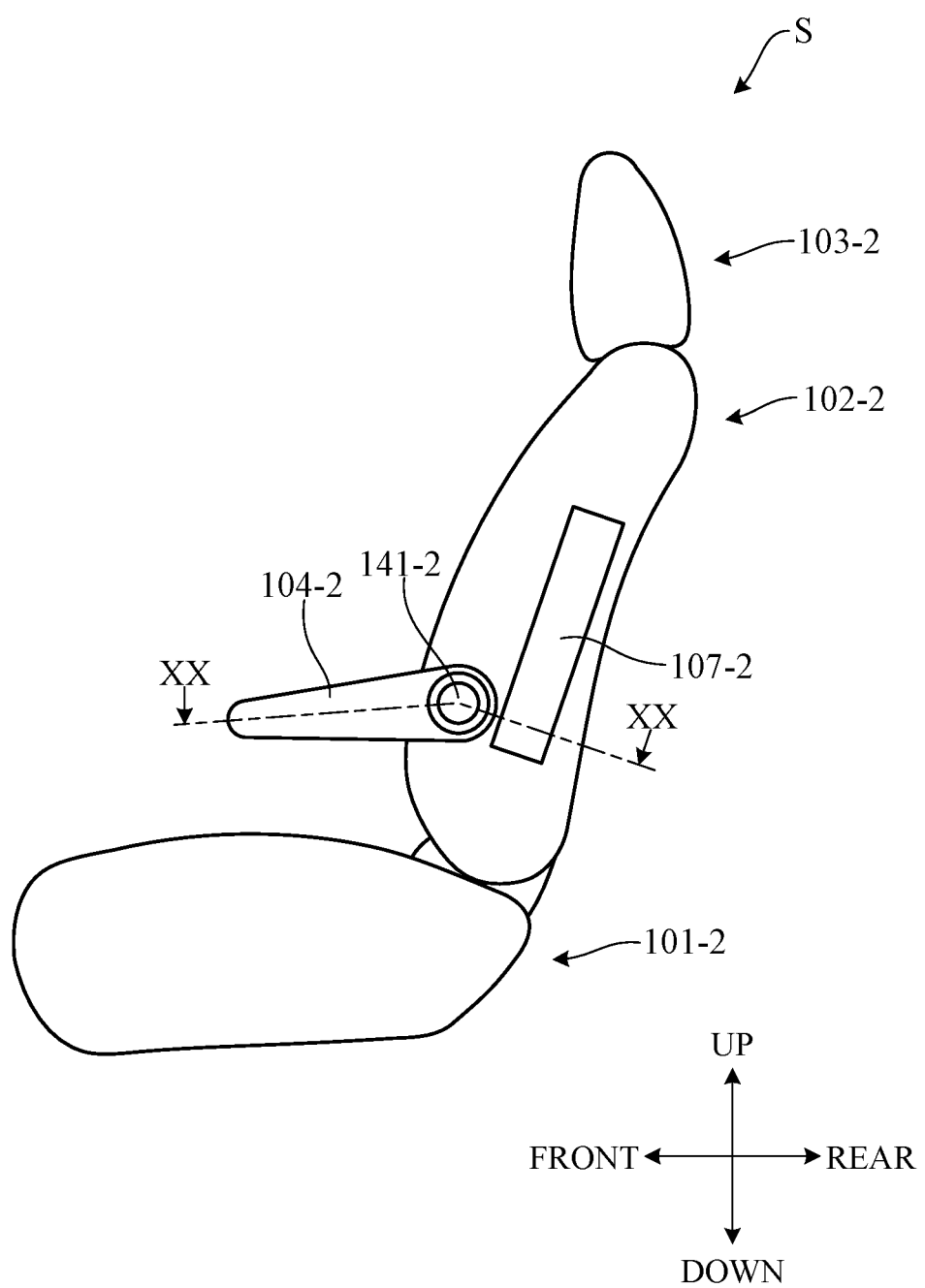
FIG. 18 is a side view of a vehicle seat in use with an armrest tilted forward.
Figure 19:
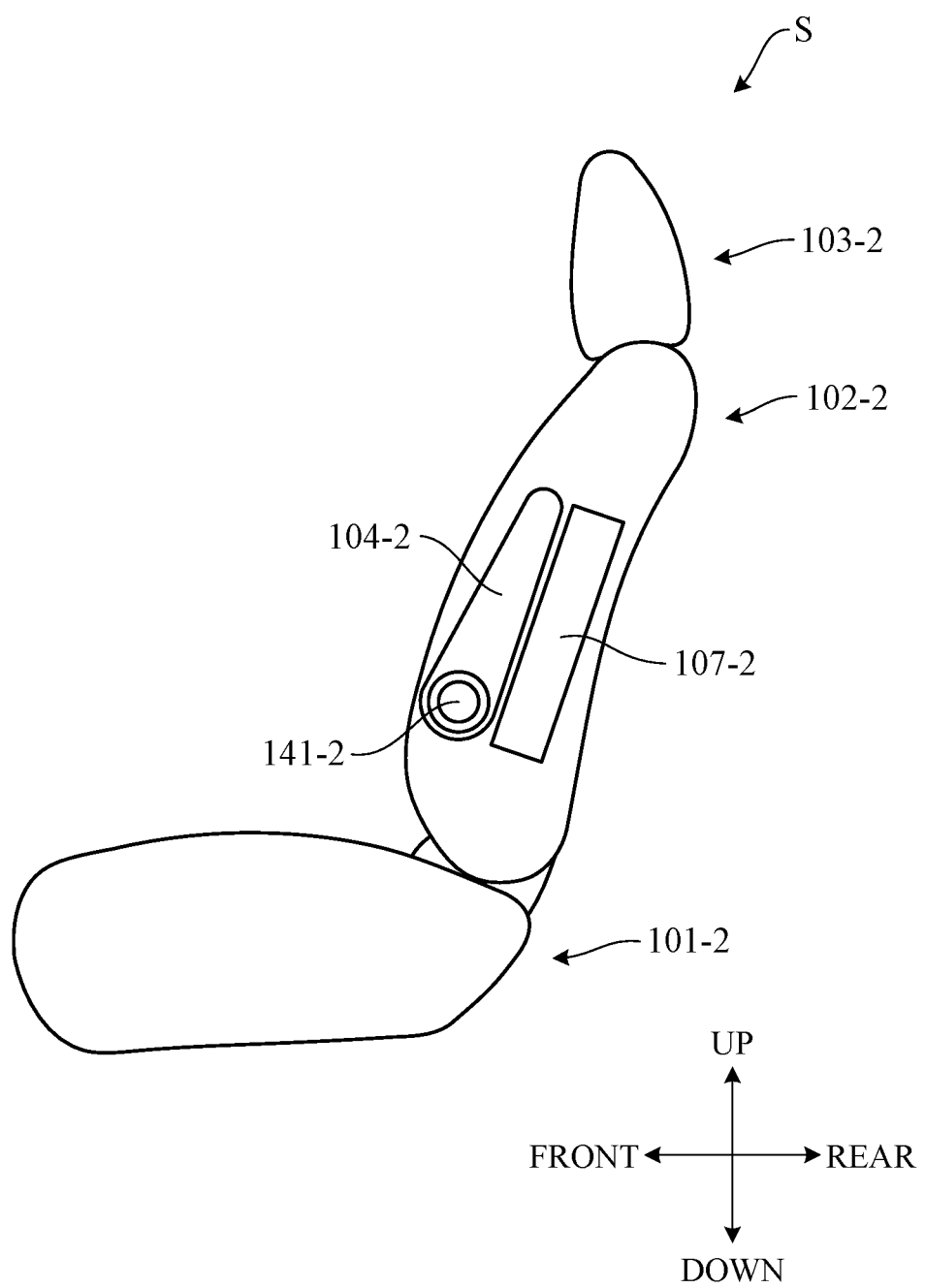
FIG. 19 is a side view of a vehicle seat in a stored state with the armrest raised.

FIG. 18 is a side view of the vehicle seat S illustrating the usage state of the armrest 104-2, and FIG. 19 is a side view of the vehicle seat S illustrating the stored state of the armrest 104-2. The armrest 104-2 is provided so as to be rotatable over approximately 90° between the use position illustrated in FIG. 18 and the stored position illustrated in FIG. 19. As illustrated in FIG. 18, the armrest 104-2 protrudes forward from the seat back 102-2 at the use position, and in this state, the occupant can rest his arm portion on the upper surface of the armrest 104-2. As illustrated in FIG. 19, at the stored position, the armrest 104-2 is retracted without protruding forward from the seat back 102-2.

Figure 20:
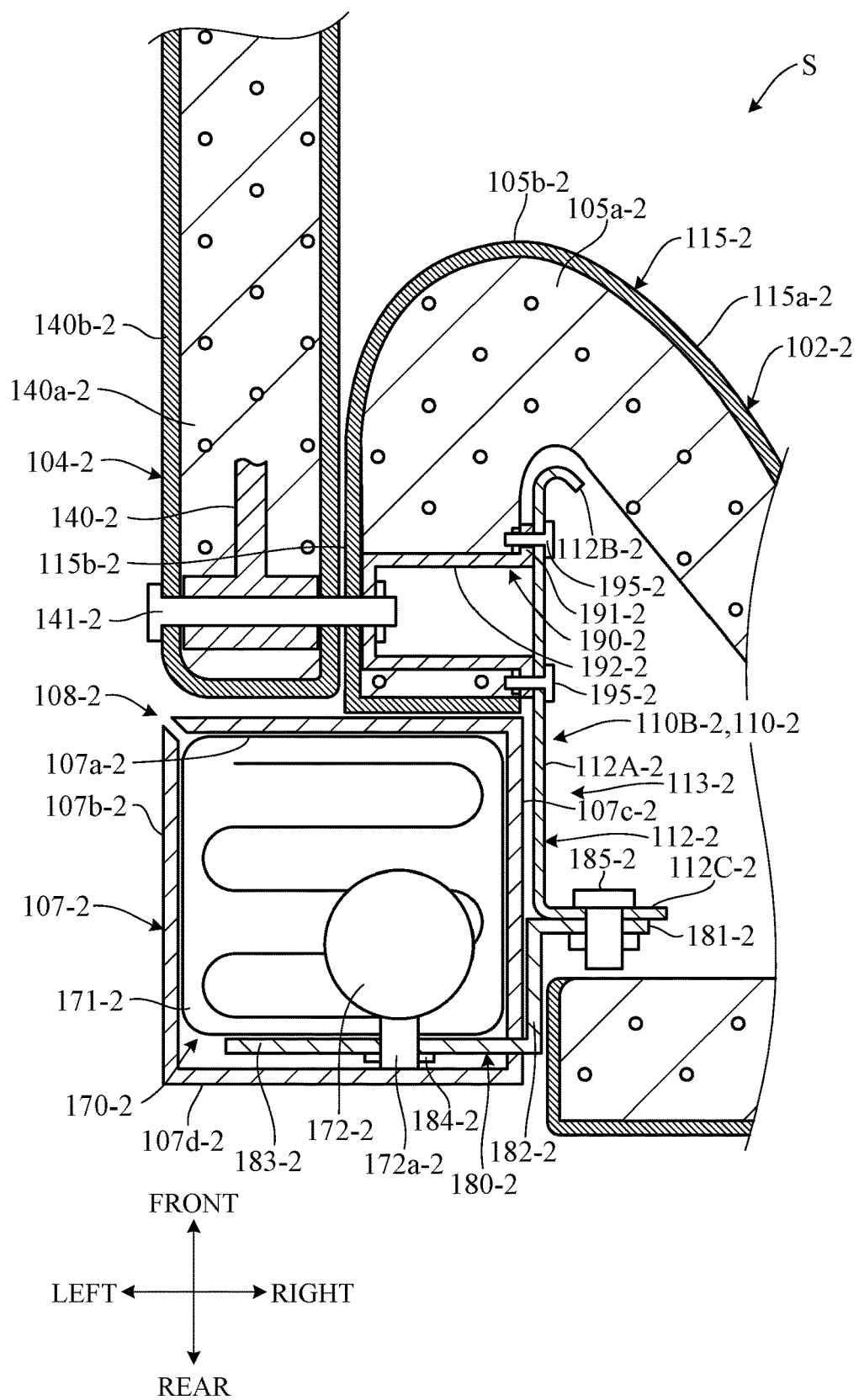
FIG. 20 is a cross-sectional view taken along line XX-XX of FIG. 18 and is a diagram illustrating a mounting structure of an airbag housing portion and an airbag module in a vehicle seat according to the second embodiment.

FIG. 20 is a cross-sectional view taken along line XX-XX of FIG. 18. As illustrated in FIGS. 17 and 6, the seat back 102-2 and the seat cushion 101-2 includes a seat frame 110-2, a seat pad 105a-2 made of urethane foam or the like attached to the seat frame 110-2, and a skin material 105b-2 made of cloth, leather, or the like that covers the seat pad 105a-2. The armrest 104-2 includes an arm frame 140-2, an arm pad 140a-2 made of urethane foam or the like attached to the arm frame 140-2, and a skin material 140b-2 made of cloth, leather, or the like that covers the arm pad 140a-2.

The seat back 102-2 has a pair of left and right bank portions 115-2 that protrude forward from the central portion in the lateral direction on both sides in the width direction of the vehicle seat S, that is, in the lateral direction of the car, and the front surface of the seat back 102-2 is formed in a concave shape. More specifically, as illustrated in FIG. 20, the bank portion 115-2 has an inclined portion 115a-2 that inclines forward and outward in the lateral direction and a side wall portion 115b-2 that extends rearward from the front end portion of the inclined portion 115a-2. The pair of left and right bank portions 115-2 retain the occupant seated on the vehicle seat S in the lateral direction.

As illustrated in FIG. 17, a rotation mechanism 163-2 is provided below the seat cushion 101-2 that rotates the vehicle seat S centering around the rotating shaft extending in the up-down direction. By this rotation mechanism 163-2, the vehicle seat S (for example, the passenger seat S2) can be turned 180 degrees as illustrated in FIG. 15.

As illustrated in FIG. 20, the vehicle seat S includes an airbag 171-2 (so-called side airbag). In connection with this, as illustrated in FIGS. 3 and 6, the vehicle seat S includes a pair of left and right airbag modules 170-2 provided at the left and right side end portions of the seat back 102-2 and a pair of left and right airbag housing portions 107-2 for housing a pair of left and right airbag modules 170-2 respectively. More specifically, as illustrated in FIG. 3, the airbag module 170-2 includes a left airbag module 170L-2 provided on the left side portion and a right airbag module 170R-2 provided on the right side portion of the seat back 102-2, and these are configured symmetrically. The airbag housing portion 107-2 includes a left airbag housing portion 107L-2 housing the left airbag module 170L-2 and a right airbag housing portion 107R-2 housing the right airbag module 170R-2, and these are configured symmetrically. The left airbag housing portion 107L-2 is provided behind the left armrest 104L-2, and the right airbag housing portion 107R-2 is provided behind the right armrest 104R-2.

The airbag housing portion 107-2 is configured in a substantially rectangular parallelepiped shape that is elongated in the up-down direction as a whole and is arranged along the left and right side end portions of the seat back 102-2. A fracture portion 108-2 is formed in the up-down direction at the outer front end portion of the airbag housing portion 107-2, or more strictly, at the corner portion where the outer side surface in the lateral direction and the front end surface intersect. The fracture portion 108-2 is a portion that breaks and becomes an outlet of the airbag 171-2 that is deployed when the airbag 171-2 of the airbag module 170-2 housed in the airbag housing portion 107-2 is inflated. In other words, the fracture portion 108-2 is a tear line formed along the outer front end portion of the airbag housing portion 107-2.

The airbag module 170-2 housed in the airbag housing portion 107-2 constitutes a device that absorbs the impact of a vehicle collision and protects the occupant. The airbag module 170-2 may be a caseless airbag module without a module case or may be a module case that includes a module case.

As illustrated in FIG. 20, the airbag module 170-2 includes an airbag 171-2 and an inflator 172-2. Both the airbag 171-2 and the inflator 172-2 are wrapped and retained in wrapping material. The inflator 172-2 is a device that generates gas in response to an input signal from a harness (not illustrated in the drawings). The airbag ECU 70-2 illustrated in FIG. 16 outputs an operation signal to the inflator 172-2 when the acceleration detected by the acceleration sensor 33-2 becomes equal to or higher than a predetermined threshold value. When the operation signal is input to the inflator 172-2, the inflator 172-2 generates gas to inject the gas into the airbag 171-2. As a result, the airbag 171-2 is inflated and deployed in the event of a vehicle collision. Note that the inflator 172-2 may also be operated according to the collision prediction signal.

The airbag module 170-2 is attached to the seat back frame 110B-2. The seat back frame 110B-2 is a skeleton portion of the seat back 102-2 portion in the seat frame 110-2 constituting the skeleton of the vehicle seat S. That is, the seat back frame 110B-2 is a part of the seat frame 110-2.

As illustrated in FIG. 3, the seat back frame 110B-2 includes an inverted U-shaped pipe frame 111-2, a pair of left and right plate-shaped frames 112-2, and a lower frame 114-2 erected between the lower end portions of the pair of left and right plate-shaped frames 112-2. That is, the seat back frame 110B-2 is formed in a substantially rectangular frame shape as a whole along the outer shape of the seat back 102-2 extending in the up-down and lateral directions.

More specifically, the upper part of the pipe frame 111-2 extending in the lateral direction constitutes the upper frame 111A-2 of the seat back frame 110B-2. The pair of left and right side portions 111B-2 of the pipe frame 111-2 extending downward from the left and right end portions of the upper part of the pipe frame 111-2 and the upper end portion of the pair of left and right plate-shaped frames 112-2 are joined by welding. The side frame 113-2 of the seat back frame 110B-2 is constituted by joining the side portion 111B-2 of the pipe frame 111-2 and the plate-shaped frame 112-2.

As illustrated in FIG. 20, the armrest 104-2 is attached to the front portion of the plate-shaped frame 112-2 via a bearing metal fitting 190-2. Specifically, in the space behind the bank portion 115-2 of the seat back 102-2, the plate-shaped frame 112-2 includes a side plate portion 112A-2 extending in the front-rear direction, a bent portion 112B-2 at the front end of the side plate portion 112A-2 that bents in an arc shape inward in the lateral direction along the shape of the bank portion 115-2, and an airbag support portion 112C-2 that is bent inward in the lateral direction from the rear end of the side plate portion 112A-2 and extends in the lateral direction. The bearing metal fitting 190-2 is attached to the vicinity of the bent portion 112B-2 on the left and right outer surfaces of the side plate portion 112A.

The bearing metal fitting 190-2 includes a pair of front-rear plate-shaped flange portions 191-2 each extending in the front-rear direction and a shaft mounting portion 192-2 having a substantially U-shaped cross-section that protrudes outward in the lateral direction between the pair of front-rear flange portions 191-2. The flange portion 191-2 is arranged facing the left and right inner side surfaces of the side wall portion 115b-2 of the bank portion 115-2 and is fixed to the plate-shaped frame 112-2 by a fastener 195-2 such as a bolt or the like penetrating the side plate portion 112A-2 of the plate-shaped frame 112-2. At this time, the shaft mounting portion 192-2 is housed inside the seat pad portion 105a-2 in a state of penetrating the seat pad portion 105a-2. The end portion of the shaft portion 141-2 that penetrates the armrest 104-2 in the lateral direction is fixed to the outer end portion in the lateral direction of the shaft mounting portion 192-2. As a result, the armrest 104-2 is rotatably supported with respect to the seat back 102-2 with the shaft portion 141-2 as the central axis.

A plate-shaped bracket 180-2 is attached to the airbag support portion 112C-2 of the plate-shaped frame 112-2. The bracket 180-2 includes a first mounting portion 181-2 extending in the lateral direction, a rear extending portion 182-2 extending rearward from the left and right outer end portions of the first mounting portion 181-2, and a second mounting portion 183-2 extending outward in the lateral direction from the rear end portion of the rear extending portion 182-2, and is formed by bending the entire portion into a crank shape. The first mounting portion 181-2 is fixed to the rear end surface of the airbag support portion 112C-2 of the plate-shaped frame 112-2 by using a fastener 185-2 such as a bolt or the like.

The second mounting portion 183-2 is formed with a through-hole through which a stud bolt 172a-2 protruding from the inflator 172-2 of the airbag module 170-2 is inserted. With the stud bolt 172a-2 inserted through this through-hole, the inflator 172-2 is fixed to the bracket 180-2 by the fastener 184-2. As a result, the airbag module 170-2 is fixed to the bracket 180-2.

The airbag housing portion 107-2 includes a front plate portion 107a-2, a pair of left and right side plate portions 107b-2 and 107c-2 extending rearward from both left and right end portions of the front plate portion 107a-2, and a rear plate portion 107d-2 that connects the rear end portions of the pair of left and right side plate portions 107b-2 and 107c-2, and has a substantially rectangular cross-section as a whole. The front plate portion 107a-2 is arranged behind the side wall portion 115b-2 facing the rear end surface of the side wall portion 115b-2 of the bank portion 115-2 of the seat back 102-2. The side plate portion 107c-2 on the inner side in the lateral direction faces the side plate portion 112A-2 of the plate-shaped frame 112-2 and the extending portion 182-2 of the bracket 180-2, and is arranged on the outer side thereof in the lateral direction. The outer end portion in the lateral direction of the airbag housing portion 107-2 protrudes to the outer side in the lateral direction than the left-right end portion of the seat back 102-2. The amount of protrusion is substantially equal to the thickness of the armrest 104-2 in the lateral direction, and the outer end surface in the lateral direction of the side plate portion 107b-2 is located on an extension line or substantially an extension line of the outer end surface in the lateral direction of the armrest 104-2. As a result, the maximum seat width of the vehicle seat S is defined by the armrest 104-2.

A slit is formed in the side plate portion 107c-2 of the airbag housing portion 107-2 to insert the second mounting portion 183-2 of the bracket 180-2. The airbag housing portion 107-2 is fixed to the bracket 180-2 with the second mounting portion 183-2 of the bracket 180-2 inserted into this slit. As a result, the airbag housing portion 107-2 and the airbag module 170-2 are attached to the side frame 113-2 with the airbag module 170-2 housed inside the airbag housing portion 107-2.

A fracture portion 108-2 is formed along the connecting portion between the front plate portion 107a-2 and the side plate portion 107b-2 on the outer side in the lateral direction. In other words, the fracture portion 108-2 is formed in the up-down direction at the corner portion located on the outside of the seat and in front of the seat of the airbag housing portion 107-2. Note that the fracture portion 108-2 may be configured by forming a slit in the airbag housing portion 107-2.

Figure 21:
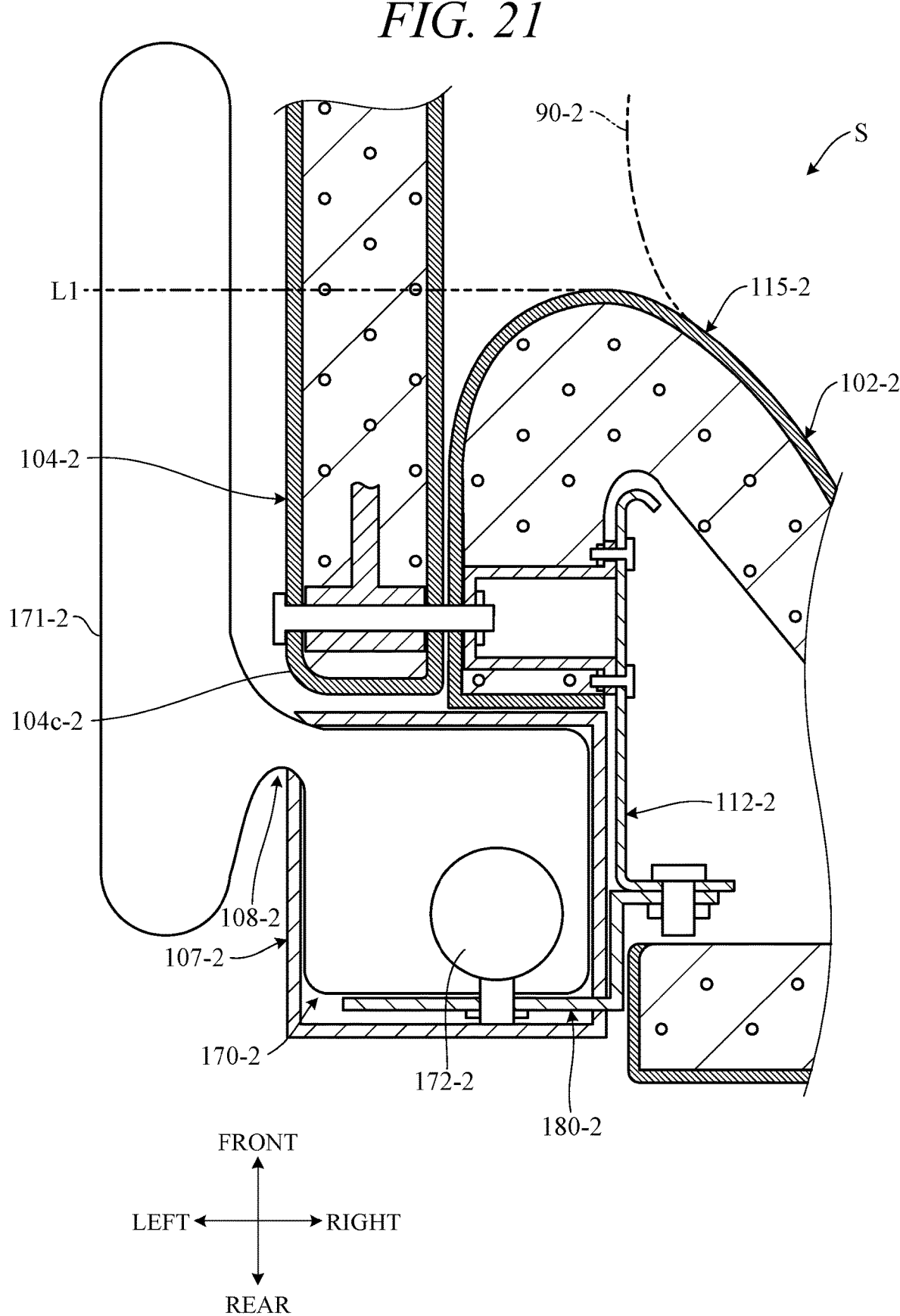
FIG. 21 is a diagram illustrating a state in which an airbag is inflated.

FIG. 21 is a plan view illustrating an operating state of the airbag 171. In the second embodiment, the fracture portion 108-2 of the airbag housing portion 107-2 is formed substantially on the rearward extension line of the end surface outer in the lateral direction of the armrest 104-2. As a result, as illustrated in FIG. 21, when the airbag module 170-2 is inflated, it is possible for the airbag 171-2 to spread the fracture portion 108-2 and be inflated into space on the side portion of the vehicle seat S. As a result, the airbag 171-2 can be inflated and deployed so as not to interfere with the armrest 104-2.

At the base end portion of the armrest 104-2, that is, the rear end and the outer end portion in the lateral direction, a relief portion 104c-2 that curves along the outer peripheral surface of the airbag 171-2 in the deployed state is provided. By providing the relief portion 104c-2, the interference between the airbag 171-2 and the armrest 104-2 can be suppressed more effectively. Note that the position and shape of the relief portion 104c-2 are not limited to those described above, and the relief portion can be appropriately set on the armrest 104-2 in consideration of the deployment direction and the like of the airbag 171-2.

When deployed, the airbag 171-2 is configured to be deployable to the front over straight line L1 that defines the front end portion of the bank portion 115-2. As a result, the impact from the side of the occupant at the time of a collision can be efficiently absorbed. Note that the airbag housing portion 107-2 may be covered with a skin material. In this case, the skins may be sewed up at a position close to the fracture portion 108-2 so that the skin material is cleaved at the fracture portion 108-2 in response to the inflation of the airbag 171-2.

According to the second embodiment, the following effects can be obtained.

(1) The vehicle seat according to the second embodiment is configured as a vehicle seat S provided on the vehicle (FIG. 15). This vehicle seat S includes a seat cushion 101-2 that supports the hip of the occupant, a seat back 102-2 that is erected from the rear end portion of the seat cushion 101-2 and supports the back of the occupant, an armrest 104-2 that supports the arm portion of the occupant, and an airbag 171-2, and is provided with an airbag module 170-2 which is provided behind the armrest 104-2 and at the side end portion of the seat back 102-2 in the seat width direction and an airbag housing portion 107-2 for housing the airbag module 170-2 (FIG. 17). The seat back 102-2 has bank portions 115-2 protruding forward on both sides in the seat width direction (FIG. 17). The airbag housing portion 107-2 includes a fracture portion 108-2 that fractures when the airbag 171-2 of the airbag module 170-2 is inflated from the airbag housing portion 107-2, and the fracture portion 108-2 is formed in the up-down direction at the side end and the front end portion of the airbag housing portion 107-2 in the seat width direction (FIGS. 17 and 20). The airbag 171-2 is configured to be deployable to the front than the bank portion 115-2 when deployed (FIG. 21). As a result, the airbag 171-2 can be inflated and deployed so as not to interfere with the armrest 104-2, and the impact from the side of the occupant 90-2 can be efficiently absorbed. As described above, according to the second embodiment, the armrest 104-2 provided on the side portion of the seat back 102-2 prevents the deployment of the airbag 171-2 provided on the same side portion from being hindered, and it is possible to provide a vehicle seat S in which it is possible to perform the inflation and deployment of the airbag 171-2 smoothly.

(2) The armrest 104-2 is provided with a relief portion 104c-2 that curves along the outer peripheral surface of the airbag 171-2 in the deployed state (FIG. 21). As a result, the interference between the airbag 171-2 and the armrest 104-2 can be suppressed more effectively.

(3) The vehicle seat S is provided so that the orientation in the front-rear direction can be changed (FIG. 15). The armrest 104-2 includes a left armrest 104L-2 (first armrest) provided on the left side portion of the seat back 102-2 and a right armrest 104R-2 (second armrest) provided on the right side portion of the seat back 102-2, and the airbag module 170-2 includes a left airbag module 170L-2 (first airbag module) provided behind the left armrest 104L-2 and the right airbag module 170R-2 (second airbag module) provided behind the right armrest 104R-2 (FIG. 3). As a result, the driver can be appropriately protected when the vehicle seat S reclines or when the vehicle seat is rotated 180 degrees and faces backward.

The second embodiment can be modified into various forms. Hereinafter, modifications of the second embodiment will be described.

First Modification

Figure 22:
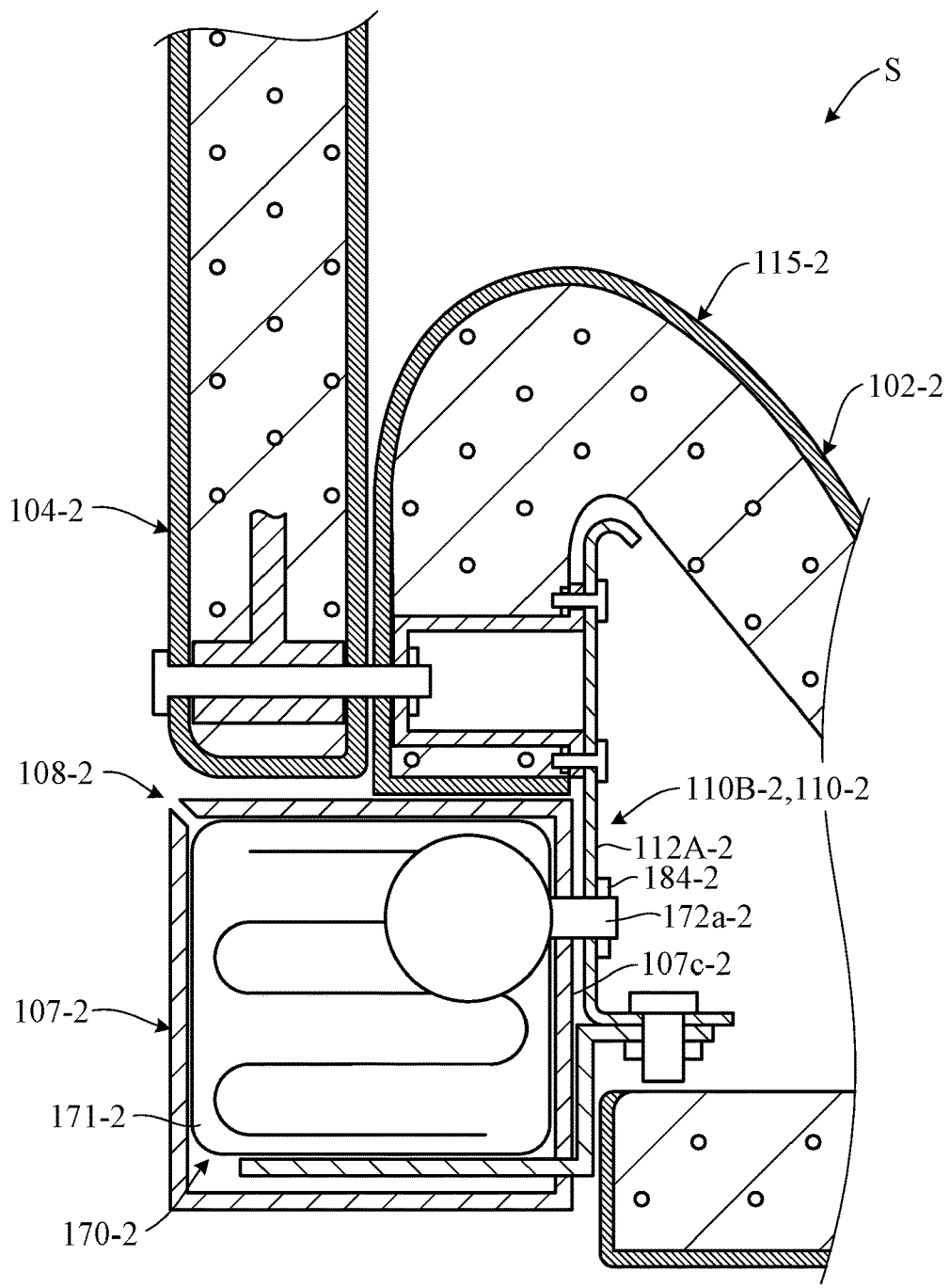
FIG. 22 is a diagram illustrating a mounting structure of an airbag housing portion and an airbag module in a vehicle seat according to a first modification of the second embodiment.

In the second embodiment described above, the airbag housing portion 107-2 and the airbag module 170-2 are attached to the side plate 112A-2 via the bracket 180-2 (FIG. 20), but the mounting structure of the airbag housing portion 107-2 and the airbag module 170-2 with respect to the seat back frame 110B-2 is not limited to this, and various forms may be adopted. FIG. 22 is a diagram illustrating a modification of FIG. 20. In FIG. 22, the airbag housing portion 107-2 and the airbag module 170-2 are directly attached to the side plate 112A-2 of the plate-shaped frame 112-2. Hereinafter, the configuration of FIG. 22 will be specifically described.

As illustrated in FIG. 22, a through-hole through which the stud bolt 172a-2 of the inflator 172-2 is inserted is formed in the side plate portion 107c-2 on the inner side in the lateral direction of the airbag housing portion 107-2. Correspondingly, the side plate 112A-2 is also formed with a through-hole through which the stud bolt 172a-2 of the inflator 172-2 is inserted. When attaching the airbag housing portion 107-2, insert the stud bolt 172a-2 of the inflator 172-2 into each through-hole of the airbag housing portion 107-2 and the side plate 112A-2, and then fix the stud bolt 172a-2 to the side plate 112A-2 with a fastener 184-2 such as a nut or the like. As a result, with the airbag module 170-2 housed inside the airbag housing portion 107-2, the airbag housing portion 107-2 and the airbag module 170-2 are attached to the side portion of the side frame 113-2.

Second Modification

Figure 23:
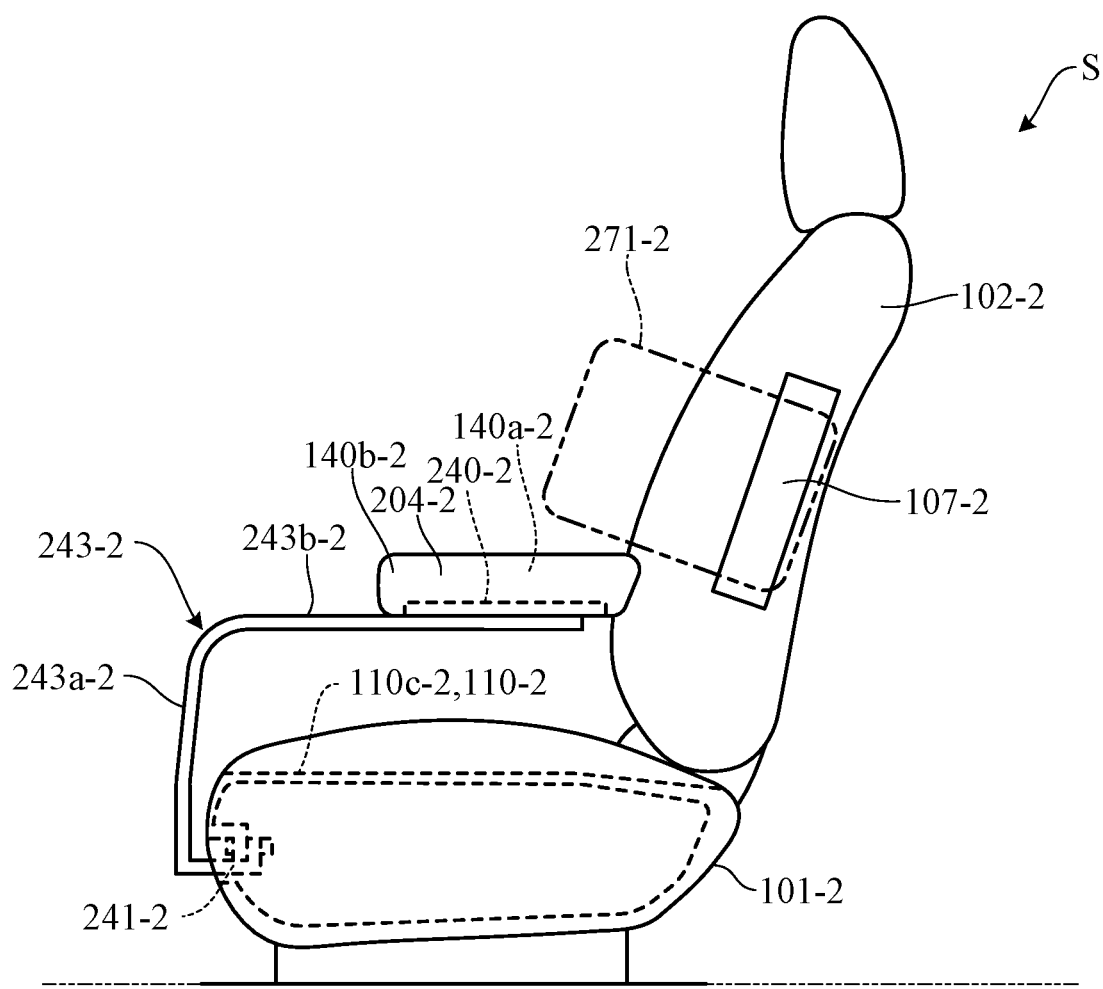
FIG. 23 is a side view of a vehicle seat according to a second modification of the second embodiment.
Figure 23:
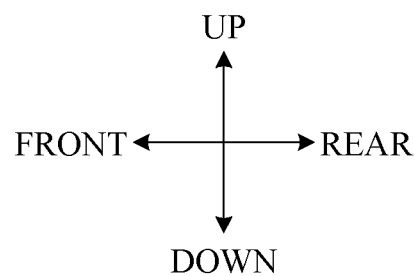

In the second embodiment described above, the armrest 104-2 is rotatably supported by the side end portion of the seat back 102-2, but it may be supported by other than the seat back 102-2. FIG. 23 is a side view of the vehicle seat S illustrating an example thereof. In FIG. 23, the armrest 204-2 is supported from the seat cushion 101-2 via the connecting portion 243-2. More specifically, one end portion of the connecting portion 243-2 is attached to the front side of the seat cushion 101-2 via the mounting portion 241-2.

The mounting portion 241-2 may be attached to the seat cushion frame 110C-2 arranged inside the seat cushion 101-2 by a fastener such as a bolt, nut, or the like, or may be attached to the seat cushion frame 110C-2 by welding or the like. Note that the seat cushion frame 110C-2 is a skeleton portion of the seat cushion 101-2 portion in the seat frame 110-2. The connecting portion 243-2 includes a vertical portion 243a-2 extending upward from the mounting portion 241-2 and a horizontal portion 243b-2 that bends 90 degrees rearward from the tip of the vertical portion 243a-2 and extends rearward. The armrest 204-2 includes an arm frame 240-2 fixed to the horizontal portion 243b-2, an arm pad 140a-2 attached to the arm frame 240-2, and a skin material 140b-2 that covers the arm pad 140a-2.

By providing the mounting portion 241-2 of the armrest 204-2 on the front side of the seat cushion 101-2 in this way, it is possible to secure a wider space on the side of the seat back 102-2 as compared with the second embodiment. Therefore, the degree of freedom in setting the range in which the airbag 271-2 is inflated and deployed, which is represented by the chain double-dashed line in FIG. 23, is high, and the interference between the airbag 271-2 inflated and deployed and the armrest 204-2 may be avoided easily.

Third Modification

Figure 24:
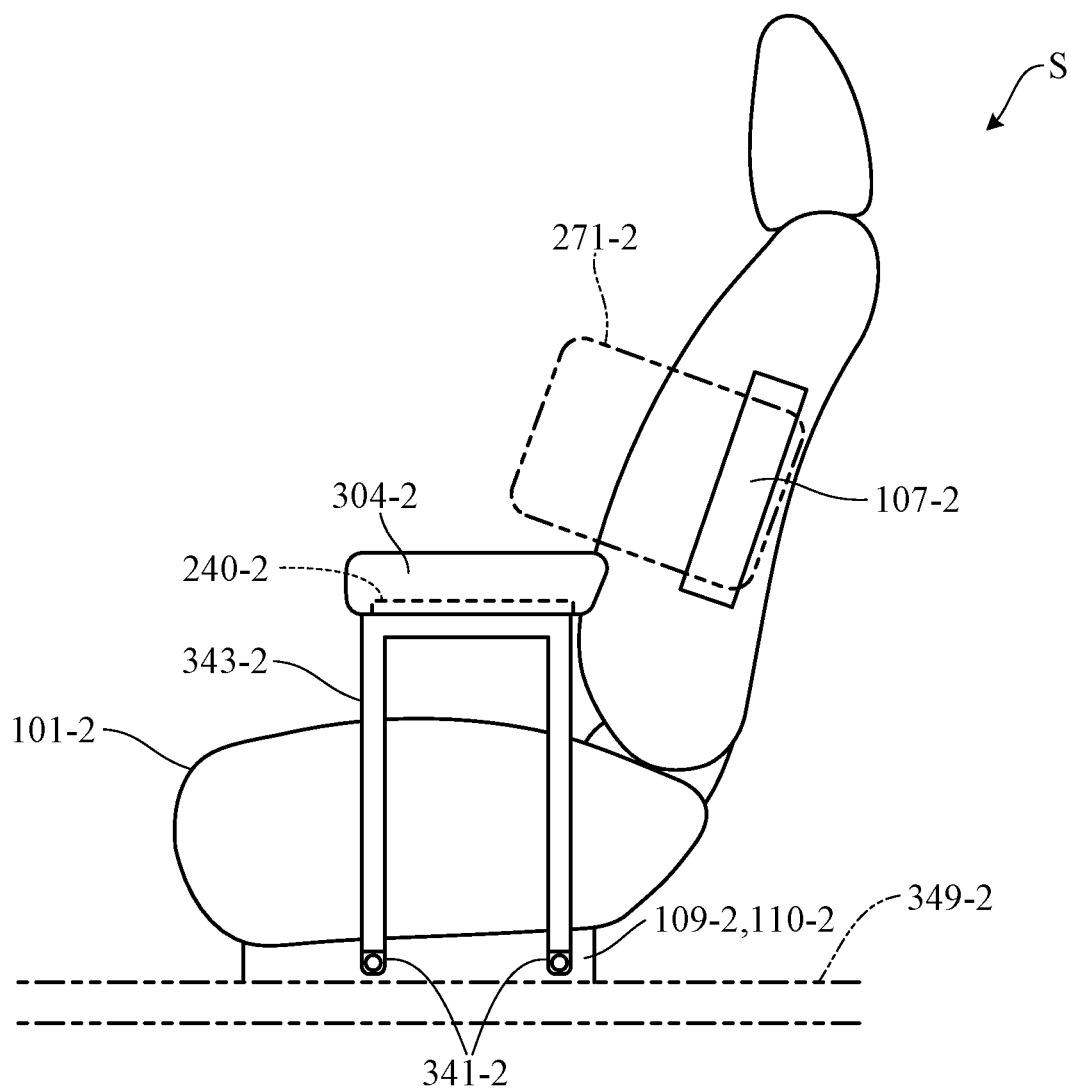
FIG. 24 is a side view of a vehicle seat according to a third modification of the second embodiment.
Figure 24:
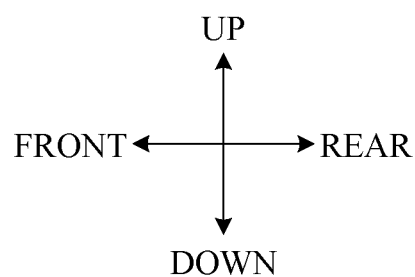

FIG. 24 is a side view of the vehicle seat S illustrating another mounting structure of the armrest 304-2. In FIG. 24, unlike FIG. 23, the armrest 304-2 is supported from below the seat cushion 101-2 via the connecting portion 343-2. More specifically, the mounting portion 341-2 of the armrest 304-2 is provided on the engaging portion 109-2 that engages with the guide rail 349-2 that guides the movement of the seat cushion 101-2 in the front-rear direction.

The engaging portion 109-2 is provided at the lower part of the seat cushion frame 110C-2. As a result, it is possible to secure a wider space on the side of the seat back 102-2 as compared with the second embodiment. Therefore, the degree of freedom in setting the range in which the airbag 271-2 is inflated and deployed is high, and the interference between the airbag 271-2 inflated and deployed and the armrest 304-2 may be avoided easily.

Fourth Modification

Figure 25:
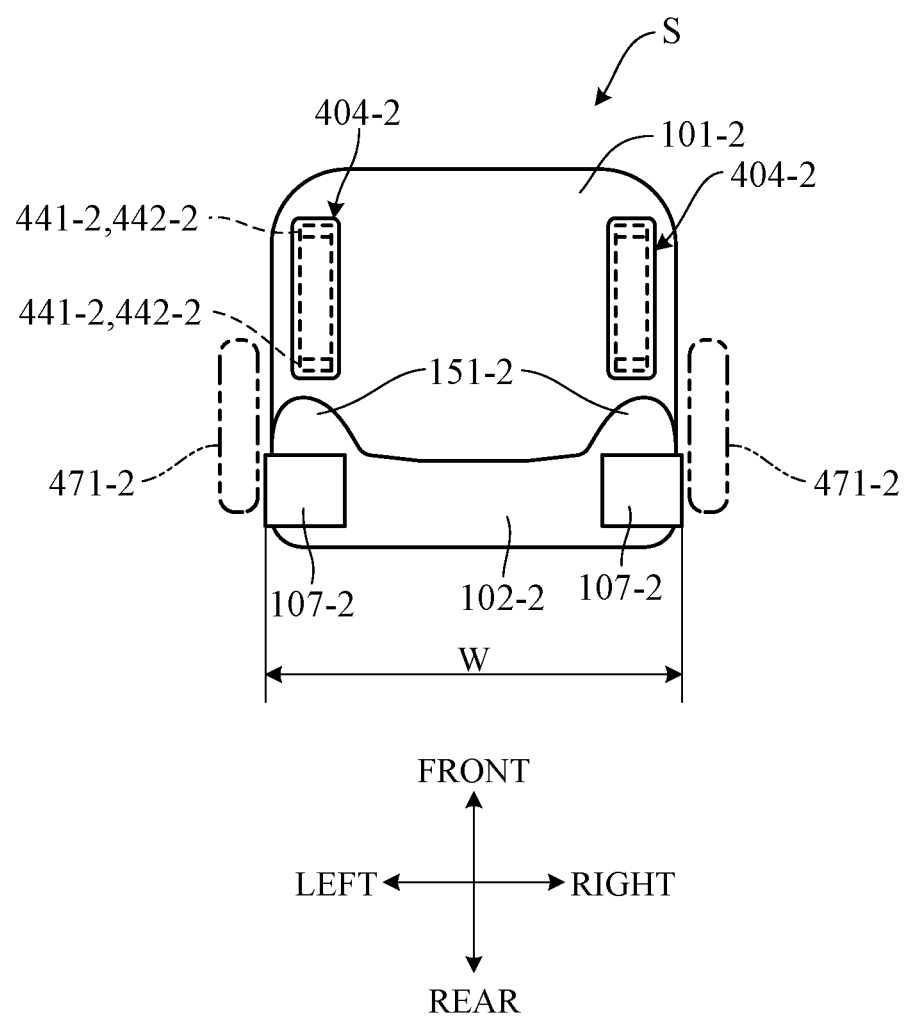
FIG. 25 is a plan view of a vehicle seat according to a fourth modification of the second embodiment.

FIG. 25 is a plan view of the vehicle seat S illustrating yet another mounting structure of the armrest 404-2. In FIG. 25, the mounting portion 441-2 of the armrest 404-2 is provided inside the seat cushion 101-2. For example, as illustrated in FIG. 25, the mounting portion 441-2 of the armrest 404-2 is mounted on the seat cushion frame 110C-2 (not illustrated in FIG. 25) constituting the seat cushion 101-2, and the connecting portion 442-2 is provided so as to extend upward from the mounting portion 441-2. With this configuration, it is possible to secure a wider space on the side of the seat back 102-2 as compared with the second embodiment. Therefore, the degree of freedom in setting the range in which the airbag 471-2 is inflated and deployed is high, and the interference between the airbag 471-2 inflated and deployed and the armrest 404-2 may be avoided easily.

Further, in the example of FIG. 25, the entire armrest 404-2 is arranged inside the seat cushion 101-2 in the plan view. Therefore, it is possible to set the installation position of the airbag housing portion 107-2 inside the seat back 102-2 as compared with the second embodiment. As a result, it is possible to reduce the left-right width W of the vehicle seat S, and it is possible to further increase a deployment space for the airbag 471-2 represented by the chain double-dashed line in FIG. 25.

As described above, in the second modification, the third modification, and the fourth modification, by providing the mounting portions 241-2, 341-2, and 441-2 of the armrests 204-2, 304-2, and 404-2 in one of the front side, the inside, and underside of the seat cushion 101-2 (see FIGS. 23, 24, and 25), it is possible to separate the armrests 204-2, 304-2, and 404-2 away from the airbag housing portion 107-2 as compared with the second embodiment described above. Therefore, when the airbags 271-2 and 471-2 are deployed, it is possible to more effectively prevent the airbags 271-2 and 471-2 from interfering with the armrests 204-2, 304-2, and 404-2. Also, it is possible to increase the degree of freedom in the installation position of the airbag housing portion 107-2. Note that the configurations of the connecting portions 243-2, 343-2, and 442-2 as the armrest supporting portions that support the armrests are not limited to those described above.

Fifth Modification

Figure 26:
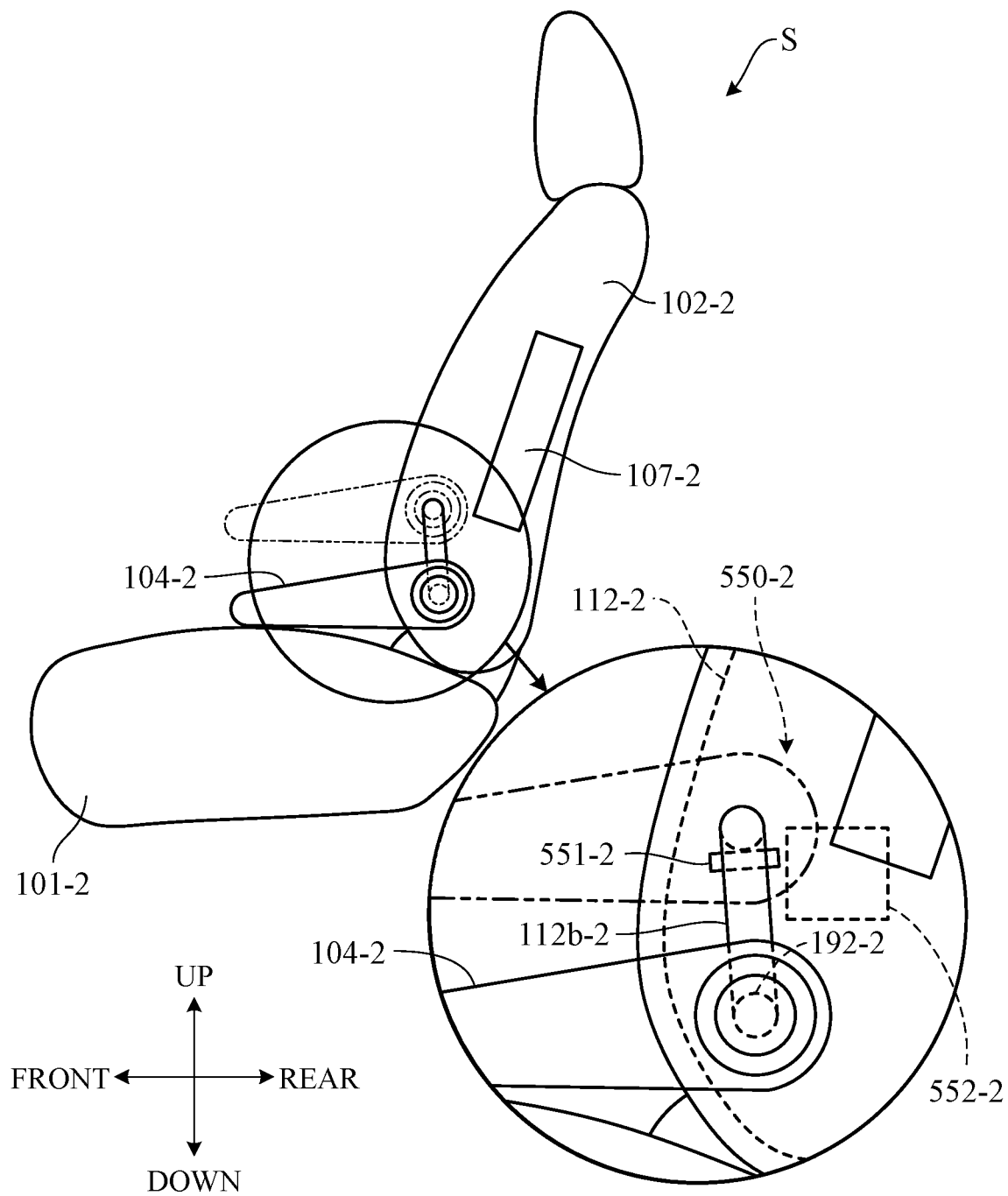
FIG. 26 is a side view of a vehicle seat according to a fifth modification of the second embodiment.

The vehicle seat S may include a moving device for moving the armrest 104-2. FIG. 26 is a side view (partially enlarged view) of the vehicle seat S illustrating an example thereof. In FIG. 26, the vehicle seat S includes a slide moving device 550-2 that slidingly moves the armrest 104-2.

As illustrated in FIG. 26, the plate-shaped frame 112-2 is formed with an elongated hole 112b-2 extending substantially in the up-down direction, and a shaft mounting portion 192-2 of the bearing metal fitting 190-2 is fitted into the elongated hole 112b-2. The shaft mounting portion 192-2 is movable along the elongated hole 112b-2. The slide moving device 550-2 includes a support shaft 551-2 that supports the shaft mounting portion 192-2 from below and an electric actuator 552-2 that moves the support shaft 551-2 in the axial direction (front-rear direction). The electric actuator 552-2 includes an electric motor as a power source and a ball screw mechanism or a rack and pinion mechanism which is a motion conversion mechanism for converting the rotational motion of the electric motor into a linear motion of the support shaft 551-2.

The seat control ECU 60-2 (FIG. 16) drives the electric actuator 552-2 by outputting an operation signal when the collision prediction signal is input and moves the support shaft 551-2 that supports the shaft mounting portion 192-2 rearward. As a result, there is nothing to support the shaft mounting portion 192-2, so that the shaft mounting portion 192-2 falls along the elongated hole 112b-2 by gravity. As a result, the armrest 104-2 is separated away from the airbag housing portion 107-2. According to such a modification, the armrest 104-2 may be separated away from the airbag housing portion 107-2 before the collision is predicted and the airbag 171-2 is deployed, so that it is possible to more effectively prevent the airbag 171-2 from interfering with the armrest 104-2 when the airbag 171-2 is deployed as compared with the second embodiment described above. Also, it is possible to increase the degree of freedom in the installation position of the airbag housing portion 107-2.

Sixth Modification

Figure 27A:
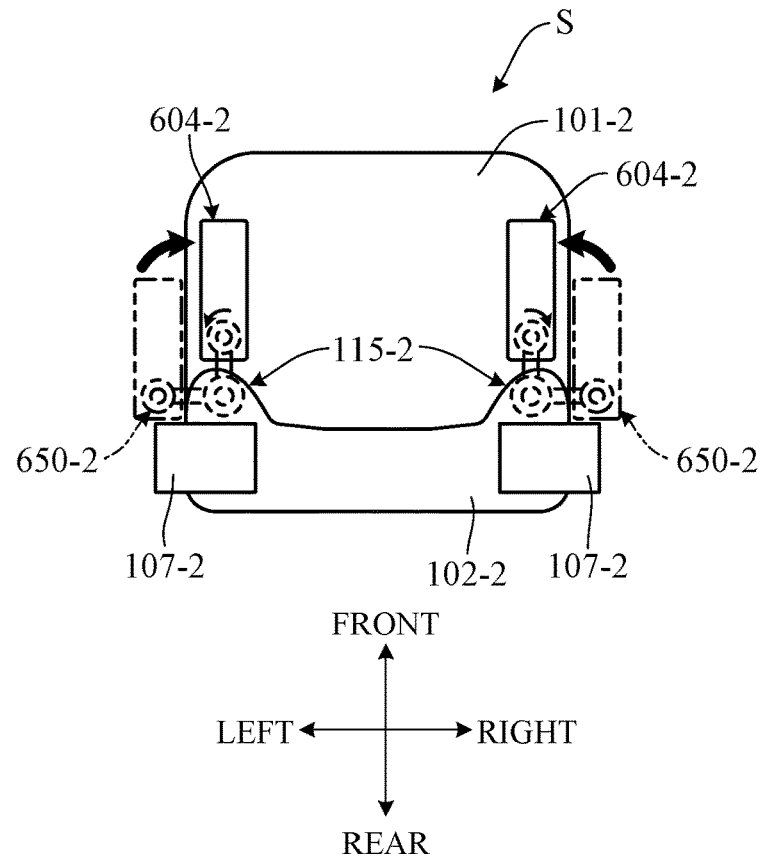
FIG. 27A is a plan view of a vehicle seat according to a sixth modification of the second embodiment.
Figure 27B:
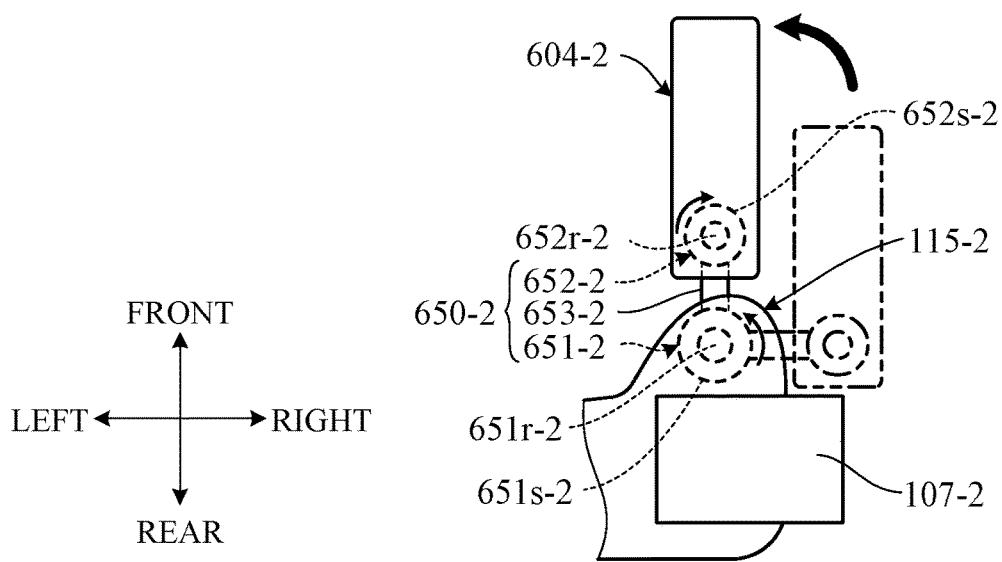
FIG. 27B is a partially enlarged view of the vehicle seat of FIG. 27A.

Instead of the slide moving device 550-2, a rotating device for rotating the armrest 104-2 may be provided. FIG. 27A is a plan view of an example thereof, and FIG. 27B is an enlarged view of a main part of FIG. 27A. In FIGS. 27A and 27B, the vehicle seat S includes a rotating device 650-2 that rotatively moves (rotates) the armrest 104-2.

As illustrated in FIGS. 27A and 27B, the rotating device 650-2 includes a first electric motor 651-2 provided inside the bank portion 115-2 and a second electric motor 652-2 provided at the base end portion of the armrest 604-2. The stator 651s-2 of the first electric motor 651-2 is fixed to the left and right side portions of the seat back frame 110B-2. The rotor 651r-2 of the first electric motor 651-2 and the stator 652s-2 of the second electric motor 652-2 are connected by a connecting member 653-2. The rotor 652r-2 of the second electric motor 652-2 is fixed to the arm frame of the armrest 604-2.

The rotor 651r-2 of the first electric motor 651-2 and the rotor 652r-2 of the second electric motor 652-2 are provided so as to extend in the up-down direction. The seat back 102-2 and the armrest 604-2 are provided with openings that may allow movement of the connecting member 653-2.

When the collision prediction signal is input, the seat control ECU 60-2 (FIG. 16) uses the first electric motor 651-2 to rotate the armrest 604-2 90 degrees in one direction (counterclockwise in the drawings) centering around the rotor 651r-2 and uses the second electric motor 652 to rotate the armrest 604-2 90 degrees in the other direction (clockwise in the drawings) centering around the rotor 652r-2. As a result, the armrest 604-2 is located above the seat cushion 101-2.

In other words, in the plan view, the armrest 604-2 moves from the outside to the inside of the seat cushion 101-2. That is, the armrest 604-2 is separated away from the airbag housing portion 107-2. As a result, it is possible to separate the armrest 604-2 away from the airbag housing portion 107-2 before a collision is predicted and the airbag 171-2 is deployed. Therefore, as compared with the second embodiment described above, it is possible to more effectively prevent the airbag 171-2 from interfering with the armrest 604-2 when the airbag 171-2 is deployed. Also, it is possible to increase the degree of freedom in the installation position of the airbag housing portion 107-2.

Seventh Modification

Figure 28A:
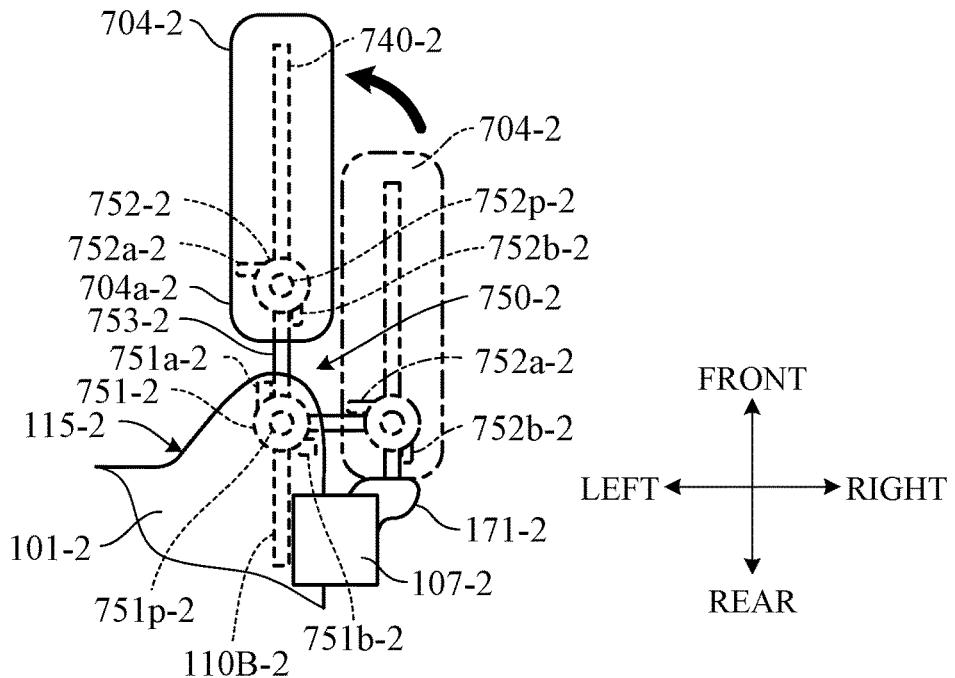
FIG. 28A is a diagram illustrating how an armrest of a vehicle seat according to a seventh modification of the second embodiment moves due to a deployment of an airbag.
Figure 28B:
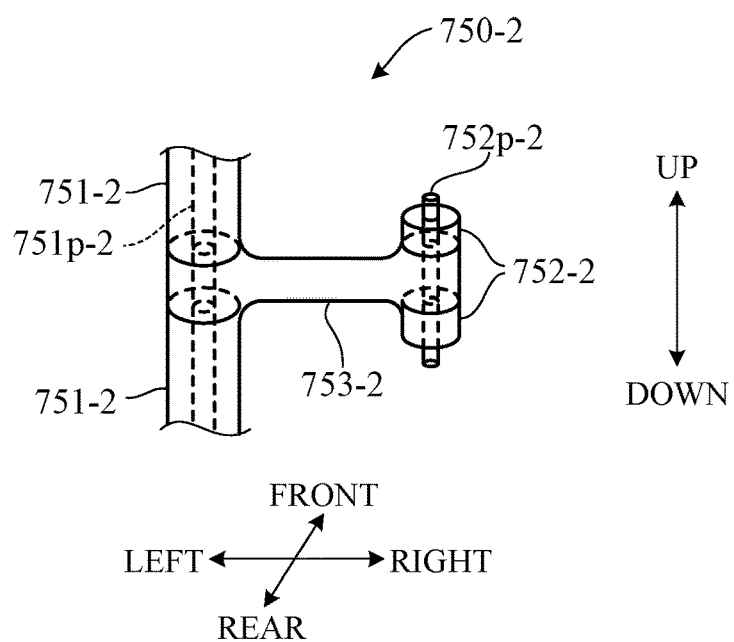
FIG. 28B is a schematic perspective view of a moving mechanism of the vehicle seat of FIG. 28A.

In the sixth modification described above, the armrest 604-2 is driven by the first electric motor 651-2 and the second electric motor 652-2, but the armrest may be moved by using the force when the airbag 171-2 is inflated and deployed. FIGS. 28A and 28B are diagrams illustrating a configuration of a moving mechanism 750-2 that enables such movement of the armrest 704-2.

In particular, FIG. 28A is a diagram illustrating how the armrest 704-2 is moved by deploying the airbag 171-2, and FIG. 28B is a schematic perspective view of the moving mechanism 750-2. As illustrated in FIGS. 28A and 28B, the moving mechanism 750-2 includes a pair of upper and lower first tubular members 751-2 fixed to the seat back frame 110B-2, a pair of upper and lower second tubular members 752-2 fixed to the arm frame 740-2, and a connecting member 753-2 whose one end portion is rotatably attached to the first tubular member 751-2 and another end portion is rotatably attached to the second tubular member 752-2. The first tubular member 751-2 is arranged inside the bank portion 115-2, and the second tubular member 752-2 is arranged at the base end portion 704a-2 of the armrest 704-2.

The connecting member 753-2 is provided with throughholes penetrating in the up-down direction at both end portions thereof. One end portion of the connecting member 753-2 is arranged so as to be sandwiched between a pair of first tubular members 751-2. A pin 751p-2 extending in the up-down direction is inserted into through-holes of one end portion of the connecting member 753-2 and the first tubular member 751-2. The other end portion of the connecting member 753-2 is arranged so as to be sandwiched between a pair of second tubular members 752-2. A pin 752p-2 extending in the up-down direction is inserted into throughholes of the other end portion of the connecting member 753-2 and the second tubular member 752-2.

As illustrated in FIG. 28A, the armrest 704-2 is arranged so that the base end portion 704a-2 is located on the side of the bank portion 115-2 during normal use (see the chain double-dashed line). When the airbag 171-2 is inflated and deployed, the airbag 171-2 urges the base end portion 704a-2 of the armrest 704-2 from the rear to the front. As a result, the armrest 704-2 rotates counterclockwise as illustrated centering around the pin 751p-2, and the armrest 704-2 rotates clockwise as illustrated centering around the pin 752p-2. As a result, the armrest 704-2 is arranged so that the base end portion 704a-2 is located in front of the bank portion 115-2, as in the sixth modification described above (see the solid line). Since the armrest 704-2 is located in front of the bank portion 115-2 and is separated away from the airbag housing portion 107-2, it is possible to secure a large deployment space for the airbag 171-2 provided on the side of the seat back 102-2.

Note that the first tubular member 751-2 is provided with stoppers 751a-2 and 751b-2 capable of contacting the shaft portion of the connecting member 753-2. The stoppers 751a-2 and 751b-2 are provided so that the rotation range of the connecting member 753 centering around the pin 751p-2 is about 90 degrees. The second tubular member 752-2 is provided with stoppers 752a-2 and 752b-2 capable of contacting the shaft portion of the connecting member 753-2. The stoppers 752a-2 and 752b-2 are provided so that the rotation range of the connecting member 753-2 centering around the pin 752p-2 is about 90 degrees.

In this way, the vehicle seat S according to the seventh modification includes the moving mechanism 750-2 that moves the armrest 704-2 so that the armrest 704-2 separates away from the airbag 171-2 in conjunction with the deployment of the airbag 171-2. Therefore, it is possible to move the armrest 704-2 without providing a power source such as an electric motor or the like and easily secure the deployment space for the airbag 171-2.

Eighth Modification

Figure 29:
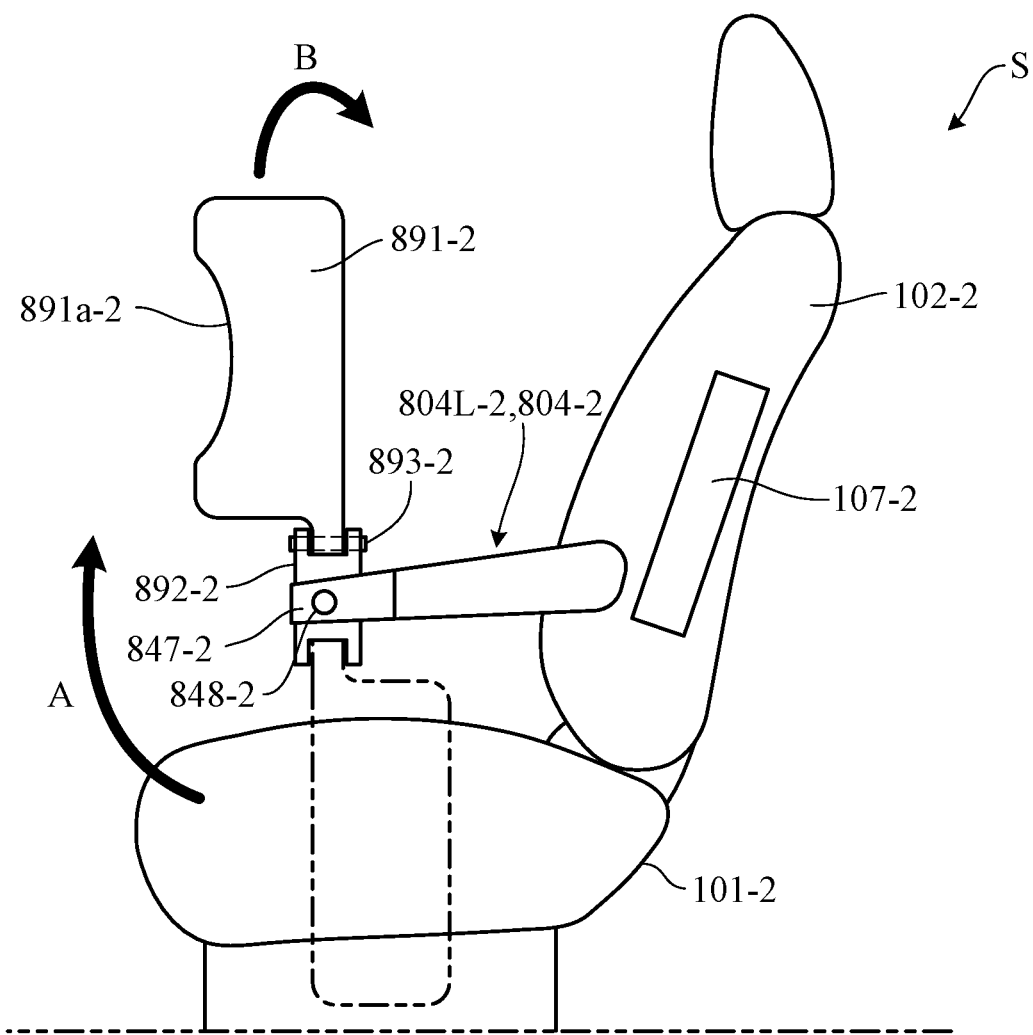
FIG. 29 is a side view of a vehicle seat according to a seventh modification of the second embodiment.
Figure 30:
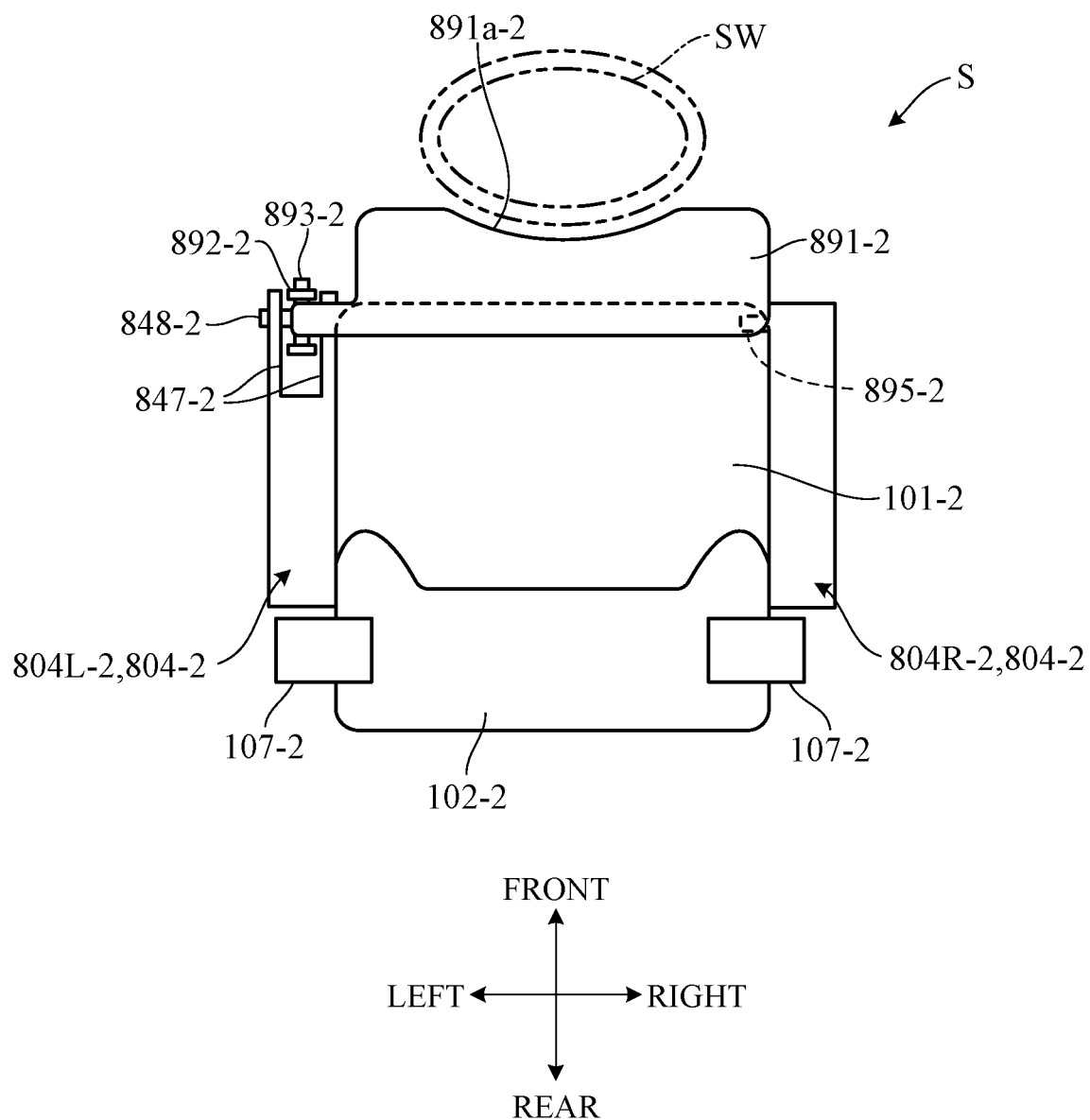
FIG. 30 is a plan view of the vehicle seat of FIG. 29.

Accessories may also be provided on the armrest. FIGS. 29 and 30 are a side view and a plan view of the vehicle seat S illustrating an example. In FIGS. 29 and 30, a table 891-2 is provided on a left armrest 804L-2. Note that the table 891-2 may be provided on either the left or right armrest 804-2.

As illustrated in FIGS. 29 and 30, the table 891-2 is connected to the front end portion of the armrest 804-2. A pair of left and right retaining plates 847-2 are provided at the front end portion of the armrest 804-2. A rotating member 892-2 is arranged between the pair of left and right retaining plates 847-2. Through-holes are provided in the pair of left and right retaining plates 847-2 and the rotating member 892-2, and a pin 848-2 extending in the lateral direction is inserted in the through-holes. Therefore, the table 891-2 is rotatable centering around the pin 848-2 between a position where the tip end portion is arranged below the armrest 804-2 (see the chain double-dashed line in FIG. 29) and a position where the tip end portion is arranged above the armrest 804-2 (see the solid line in FIG. 29).

At the end portion of the rotating member 892-2, a pin 893-2 extending in a direction orthogonal to the pin 848-2 is provided. The base end portion of the table 891-2 is rotatably attached to the pin 893-2. That is, the table 891-2 is rotatable centering around the pin 893-2 between a position along the vertical direction (see FIG. 29) and a position along the horizontal direction (see FIG. 30). Note that the right armrest 104R-2 is provided with a mounting portion 895-2 on which the end portion of the table 891-2 is mounted. The mounting portion 895-2 may be stored inside the right armrest 104R-2.

The table 891-2 has a curved portion 891a-2 that curves along the steering wheel SW. The curved portion 891a-2 is a relief portion formed so as not to interfere with the steering wheel SW. When using the table 891-2, after the table 891-2 in the unused state represented by the chain double-dashed line in FIG. 29 is rotated centering around the pin 848-2 as represented by arrow A and raised vertically, it is rotated centering around the pin 893-2 as represented by arrow B, and the tip end portion of the table 891-2 is mounted on the mounting portion 895-2 of the right armrest 104R-2 as illustrated in FIG. 30. Note that a locking mechanism for fixing the table 891-2 at the mounting portion 895-2 may be provided.

Note that the mounting portion 895-2 for fixing the tip end portion of the table 891-2 may be configured to be rotatable at a predetermined rotation angle. The mounting portion 895-2 is connected to the right armrest 804R-2 via a rotation shaft extending in the lateral direction. The mounting portion 895-2 can rotate centering around the rotation shaft in a predetermined rotation range. As a result, it is possible to tilt the table 891-2 to a predetermined angle, so that in a state that the vehicle seat S is reclining, it is possible to adjust the angle of the table 891-2 and set an information terminal such as a book, a smartphone, or the like is set to a position where the occupant may see it easily. Therefore, it is possible to improve the comfort of the vehicle in the self-driving state.

Other Modifications

Further, the vehicle seat S may take the form as described below according to the driving mode of the car.

For example, when a self-driving mode of self-driving level 4 or higher is set and an operation of reclining the vehicle seat S is performed by the occupant, an electric motor that rotates the armrest 104-2 on the door DR side so as to be located at the state of in use may be provided. Further, it is possible to configure that a sub-armrest housed in the armrest 104-2 is slidingly moved forward so as to expand the area of the upper surface on which the occupant's arm portion can be placed on the left and right armrests 104-2.

By the way, in self-driving modes of level 2 and level 3, while the driver has taken the hand off the steering wheel SW, it is required to keep putting the hand near the steering wheel SW so as to be able to operate the steering wheel SW immediately in an emergency or the like, and it tends to be a burden on the driver. Therefore, when a predetermined self-driving mode is set, an auxiliary armrest that supports the upper arm (the portion between the shoulder joint and the elbow joint) of the occupant seated on the driver's seat S1 from below may be provided on the vehicle seat S. As the auxiliary armrest, for example, a rotary auxiliary armrest rotatably provided on the bank portion 115-2 may be adopted. The rotary auxiliary armrest is stored in a position where it does not touch the driver when the manual driving mode is set. When the driving mode of the vehicle is switched from the manual driving mode to the self-driving mode of a predetermined level, the rotary auxiliary armrest is rotated and arranged in a support position to support the upper arm of the occupant from below. According to this configuration, it is possible to support the upper arm by the auxiliary armrest in the self-driving mode of the predetermined level, so that it is possible to relieve the driver's fatigue. Also, the driver may easily operate an information terminal such as a smartphone and the like, and it is possible to improve comfort.

The configuration of the auxiliary armrest is not limited to the rotary auxiliary armrest described above. For example, an inflatable inflation portion may be provided on a part of the bank portion 115-2, and this inflation portion may be used as the auxiliary armrest. When the driving mode of the vehicle is set to the manual driving mode, the inflation portion is in the deflated state, and when switched to the self-driving mode of the predetermined level, the inflatable auxiliary armrest is inflated, and the driver's upper arm is supported from below by the inflation portion. In this case as well, it is possible to relieve the driver's fatigue.

Also, the armrest 104-2 may be configured to be rotatable by an electric motor or the like, and an auxiliary armrest which is rotatably attached to the tip end portion of the armrest 104-2 by an electric motor or the like may be provided. This auxiliary armrest is arranged so as to extend forward from the tip end portion of the armrest 104-2 when the driving mode of the vehicle is set to the manual driving mode. When the driving mode of the vehicle is set to, for example, a self-driving mode of level 3 or higher, the armrest 104-2 is moved to the stored state by the electric motor or the like, and the auxiliary armrest is further rotated by 90 degrees by the electric motor or the like to support the driver's upper arm from below. In this case as well, it is possible to relieve the driver's fatigue.

The input/output device 50-2 (FIG. 16) that becomes operable when the self-driving mode is set may be provided on the armrest 104-2. The input/output device includes, for example, a switch for operating a direction indicator light, a headlight, a wiper, and the like, a switching operation unit related to self-driving, an operation panel having a touch sensor that displays various information and detects contact of an occupant finger and the like, an operation unit for performing various input operations, and the like. The input/output device 50-2 is, for example, a trackball, a touch panel, or the like provided on the upper surface or the side surface of the tip end portion of the armrest 104-2. Also, for the input/output device 50-2, a device having a gesture control function using image data taken by a camera that images the occupant may be used. Further, the input/output device 50-2 may have a voice recognition function for controlling each unit of the predetermined in-vehicle system 1-2 by voice.

A light unit may be provided on the armrest 104-2. The light unit is controlled to be turned on and off according to the operation of the armrest 104-2 and the driving mode of the car. For example, the light unit is controlled to blink when the self-driving mode is switched to the manual driving mode and reports the driver to be switched to the manual driving mode. Also, when the armrest 104-2 is moved, the light unit may be configured to blink in order to make the driver recognize that it is moving or to move the emitting unit so as to make the driver recognize the moving direction. Also, the light unit is controlled to illuminate an object such as a book and the like when, for example, the self-driving mode of level 3 or higher is set. Further, the light unit is controlled to be turned on, for example, when the occupant gets on and off the car. Note that the light unit is preferably provided so as to be movable and be able to illuminate an arbitrary place.

The armrest 104-2 may be configured so that the width of the portion on which the occupant's arm portion is placed may be changed between the time of the manual driving mode and the self-driving mode. For example, when the armrest 104-2 is in use tilted forward and the self-driving mode of a predetermined level (for example, level 4 or higher) is set and the occupant performs an operation to recline the vehicle seat S, the armrest 104-2 is rotated about 90 degrees centering around the axis extending along the longitudinal direction of the armrest 104-2. As a result, the portion that was on the side surface in the manual driving mode is located on the upper surface, and it is possible to place the occupant's arm thereon. That is, by forming the armrest 104-2 into a vertically long rectangular cross-sectional shape so that the width of the side surface of the armrest 104-2 in the manual driving mode is wider than the width of the upper surface, it is possible to expand the width of the portion supporting the occupant's arm portion when the self-driving mode of a predetermined level is set. In this way, it is possible to improve comfort in the vehicle by variably configuring the width of the portion of the armrest 104-2 on which the occupant's arm portion is placed according to the self-driving level and/or the reclining operation.

A display device such as a liquid crystal panel and the like may be provided on the armrest 104-2. Further, the angle of the display screen of the display device may be changed according to the reclining angle of the vehicle seat S. For example, information from the camera 16-2 (FIG. 16) is input to the display device via a harness wired in the armrest 104-2, and the display device may display, for example, an image of the rear of the car. As a result, the occupant can check the rear situation of the vehicle on the display screen of the display device of the armrest 104-2 in the self-driving state.

An in-vehicle camera 39-2 (FIG. 16) may be provided on the armrest 104-2. In this case, for example, the image information of the driver taken by the in-vehicle camera 39-2 provided on the armrest 104-2 is output to the in-vehicle situation monitoring ECU 40-2, and the driver is monitored by the in-vehicle situation monitoring ECU 40-2. The armrest 104-2 may be provided with a holder for holding an information terminal such as a smartphone and the like or a charger capable of charging the information terminal.

A device capable of adjusting the movable range may be provided so that the movable range of the armrest 104-2 when the self-driving mode is set becomes larger compared to the movable range of the armrest 104-2 when the manual driving mode is set. This prevents the armrest 104-2 from moving unintentionally or the like and hindering driving during the manual driving state and allows the armrest 104-2 to be moved to an arbitrary position during the self-driving state, and it is possible to improve comfort.

In the embodiment in which the armrests 104-2 are provided on the left and right sides of the vehicle seat S as in the second embodiment described above, the armrest 104-2 on the door DR side may hinder the occupant from getting on and off. Therefore, it is also possible to secure the route for getting on and off for the occupant by rotating the armrest 104-2 so that the tip end portion of the armrest 104-2 is located outside the vehicle in conjunction with an operation of an opening and closing switch of the door DR. In this case, it is preferable to blink or turn on the light unit provided at the tip end portion of the armrest 104-2 and report a driver of another vehicle behind that the door DR is opened and closed and the armrest 104-2 is protruded to the outside of the car. Since the armrest 104-2 is arranged so as to extend laterally from the inside of the vehicle to the outside of the car, it is possible to be grasped when the occupant gets on and off. That is, it is possible to use the armrest 104-2 as a support member when the occupant gets on and off.

It is also possible to configure that the distance between the left and right armrests 104-2 is changed according to the driving mode of the car. For example, the distance between the left and right armrests 104-2 when the self-driving mode is set is made larger than that when the manual driving mode is set. As a result, it is possible to improve comfort in the self-driving mode. In this case, when the self-driving mode is switched to the manual driving mode, the left and right armrests 104-2 move closer to the driver's torso, and the distance between the left and right armrests 104-2 becomes smaller. Since the driver's arm portion is moved inward by moving the left and right armrests 104-2, it is possible to recognize intuitively to be switched to the manual driving mode.

The operating range of the airbag installed in the vehicle may be changed between the self-driving mode and the manual driving mode. For example, in the self-driving mode, the operating range of the airbag may be expanded as compared with the manual driving mode. As a result, it is possible to protect the occupant appropriately when the driver's seat S1 is reclining in the self-driving mode. When switching from the self-driving mode to the manual driving mode, the armrest 104-2 may be moved to guide the driver's arm portion to the steering wheel SW.

It is also possible to use the vehicle seat S according to the second embodiment as the vehicle seat of the occupant protection device of the first embodiment described above. In this case, in the vehicle seat S, the pressure-receiving portion (the seat back pad 20, the pressure-receiving plate 5, and the like as illustrated in FIGS. 2 and 3) that receives the load from the seated occupant supported by the seat frame 110-2 and the posture changing mechanism (the posture changing mechanism 6 as illustrated in FIG. 4) that movably supports the pressure-receiving portion are provided as in the first embodiment. Then, at the time of activating the side airbag when the airbag module 170-2 is activated by the impact acting on the door DR from the outside to inflate and deploy the side airbag 171-2, the seat control ECU 60-2 controls the posture changing mechanism (actuator 61 in FIG. 4 or the like) so as to move the pressure-receiving portion so that the occupant is pushed in the direction away from the door DR before the occupant contacts the side airbag 171-2. As a result, it is also possible to obtain the same effects as those of the first embodiment.

Third Embodiment

Hereinafter, a third embodiment of the present invention will be described with reference to the drawings. The armrest device according to the third embodiment may be applied to a vehicle seat arranged in the inner space of the side wall of the vehicle, but in the following, an example applied to a vehicle seat provided in a car, that is, a vehicle seat is explained. The vehicle of the third embodiment is configured as a self-driving vehicle having a self-driving function. Note that the self-driving vehicle may travel not only in the self-driving mode that does not require a driving operation by a driver but also in the manual driving mode by the driving operation of the driver.

The traveling operation of the self-driving vehicle is controlled by a vehicle control system. In the self-driving mode, the vehicle control system determines a traveling route to the destination based on the current position of the own vehicle and the surrounding situation of the own car. Then, so that the vehicle travels according to the traveling route, traveling actuators such as a driving actuator (for example, a throttle actuator and a transmission actuator), a braking actuator, a steering actuator, and the like of the vehicle are automatically controlled without the operation of the driver. On the other hand, in the manual driving mode, the vehicle control system controls the traveling actuators according to the operation of the accelerator pedal, the brake pedal, the steering wheel, and the like by the driver.

The vehicle control system includes a driving level command switch that commands a self-driving level in the self-driving mode. As described in the second embodiment above, the self-driving level is an index of how much the driving is automated. The self-driving level is classified into level 0 to level 5 based on SAE J3016 defined by SAE International, for example. Specifically, level 0 is a driving level without automation, and at level 0, all driving operations are performed by a human (driver).

Level 1 is a driving level (driving support) in which the system performs any of acceleration, steering, and braking operations. That is, at level 1, under specific conditions, the vehicle control system controls any of the accelerator, brake, and steering wheel operations according to the surrounding situation, and all other driving operations are performed by the human. Level 2 is a driving level (partial driving automation) in which the system performs multiple operations of acceleration, steering, and braking at once. Up to level 2, humans are obliged to monitor the surroundings.

Level 3 is a driving level (conditional self-driving) in which the vehicle control system performs all acceleration, steering, and braking, and the driver corresponds only when there is a request from the vehicle control system. From level 3 onwards, the vehicle control system monitors the surroundings and humans are not obliged to monitor the surroundings. Level 4 is a driving level (highly self-driving) in which the vehicle control system performs all driving operations in a specific situation and a human does not need to take turns even if the vehicle control system cannot continue driving. Therefore, from level 4 onwards, the vehicle control system will correspond even in an emergency. Level 5 is a driving level (fully self-driving) in which the vehicle control system autonomously performs automated traveling under all conditions.

The driver commands a self-driving level of any of levels 0 to 5 according to the operation of the driving level command switch. It is also possible to configure that the vehicle control system determines whether or not conditions for self-driving are satisfied depending on the surrounding situations and the like and automatically switches the driving level command switch according to the determination result to command any of levels 0 to 5. An armrest device suitable for use in such a self-driving vehicle will be described below.

Figure 31:
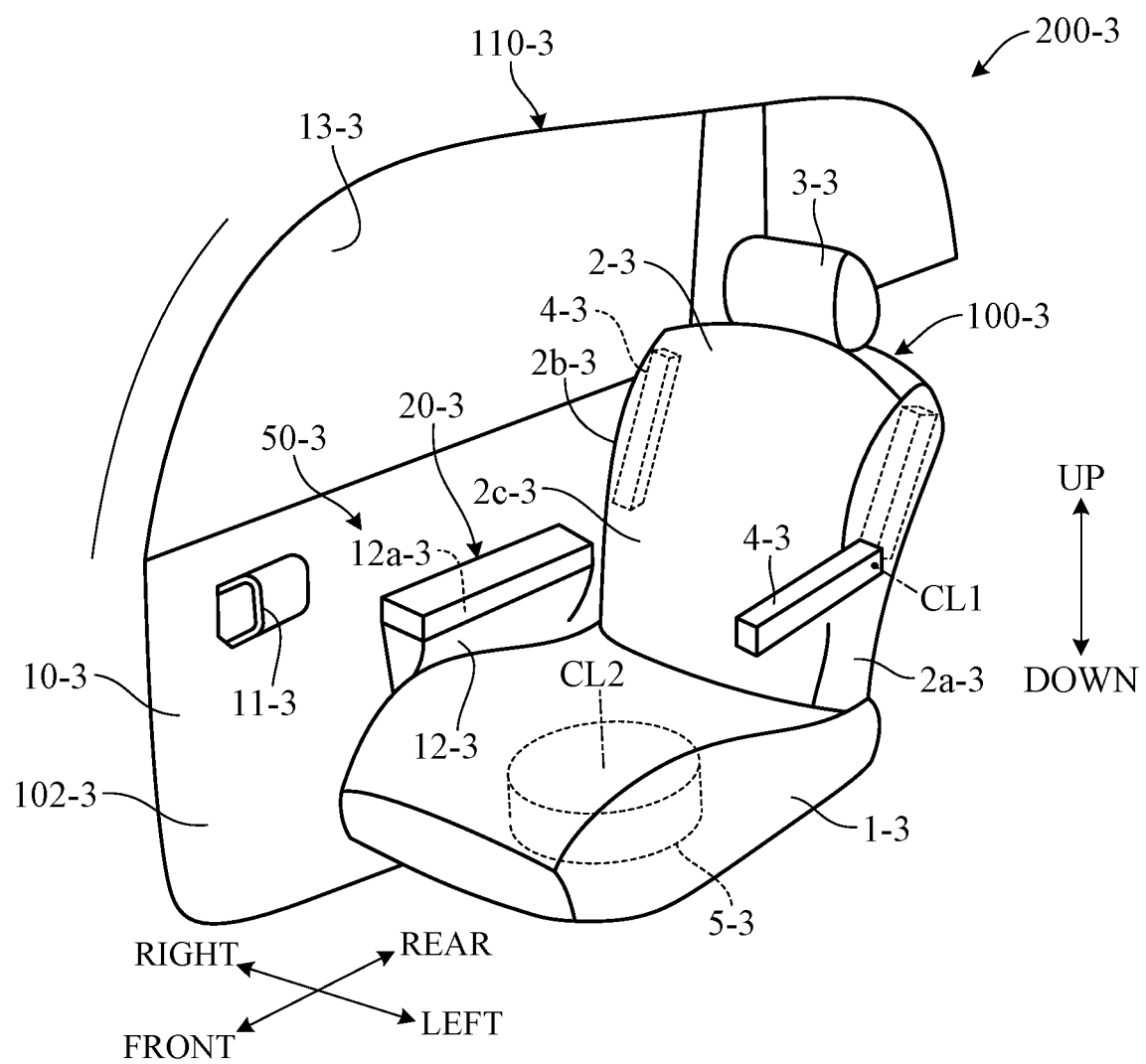
FIG. 31 is a perspective view illustrating an arrangement of a vehicle seat to which an armrest device according to the third embodiment of the present invention is applied in a car interior.

FIG. 31 is a perspective view illustrating an arrangement in a vehicle interior of a vehicle seat 100-3 (hereinafter, simply referred to as a seat) to which an armrest device according to the third embodiment of the present invention is applied. In the following, for convenience, the front-rear direction, the lateral direction, and the up-down direction are defined with reference to the occupant seated on the seat 100-3 as illustrated in the drawing, and the configuration of each part will be described according to this definition. When the seat 100-3 is facing forward as illustrated in the drawing, the front-rear direction corresponds to the length direction of a car 200-3, and the up-down direction corresponds to the height direction of the car 200-3, and the lateral direction corresponds to the vehicle width direction. In FIG. 31, the driver's seat 100-3 on the right side of the vehicle is illustrated, and a configuration of the driver's seat 100-3 is mainly described. Note that, although not illustrated in the drawings, the passenger seat on the left side of the vehicle is configured to be symmetrical with the driver's seat 100-3.

As illustrated in FIG. 31, the seat 100-3 includes a seat cushion 1-3 that supports the hip of the occupant, a seat back 2-3 that supports the back of the occupant, and a headrest 3-3 that is provided on the upper part of the seat back 2-3 and supports the head of the occupant. The seat cushion 1-3 extends in the front-rear direction and the lateral direction and has a substantially rectangular shape in the plan view as a whole. The seat back 2-3 extends in the up-down direction and the lateral direction and has a substantially rectangular shape in the front view as a whole. The seat back 2-3 is supported by the rear end portion of the seat cushion 1-3 so as to be tiltable in the front-rear direction.

A seat armrest 4-3 is provided on the left side surface 2*a*-3 of the seat back 2-3. The seat armrest 4-3 has a substantially rectangular parallelepiped shape as a whole, and one end portion (base end portion) in the longitudinal direction thereof is rotatably supported by the left side surface 2*a*-3 of the seat back 2-3 centering around the axis line CL1 extending in the lateral direction. That is, the seat armrest 4-3 is rotatable between the use position (solid line in FIG. 31) with the other end (tip end portion) in the longitudinal direction facing forward and the stored position (dotted line in FIG. 31) facing upward. When the seat armrest 4-3 is in the use position, the occupant seated on the seat 100-3 may place the left arm portion on the seat armrest 4-3.

At the lower part of the seat cushion 1-3, a rotation mechanism 5-3 that rotatably supports the seat cushion 1-3 centering around the axis line CL2 extending in the up-down direction is provided. When the driver is driving the car 200-3 in the manual driving mode, the seat 100-3 is fixed in the driving posture (referred to as a first posture) in which the seat surface 2*c*-3 of the seat back 2-3 faces forward. On the other hand, when the car 200-3 is in the self-driving mode and the driver does not need to drive, it is possible to rotate the seat 100-3 via the rotation mechanism 5-3. As a result, for example, it is possible to change the posture of the seat 100-3 to a non-driving posture (referred to as a second posture) in which the seat surface 2c-3 faces backward.

Note that, similar to the left side surface 2a-3, the right side surface 2b-3 of the seat back 2-3 is also provided with a substantially rectangular parallelepiped seat armrest 4-3 that is rotatable centering around an axis line extending in the lateral direction. When the seat 100-3 is in the first posture as illustrated in the drawing, the seat armrest 4-3 on the right side is rotated to the stored position represented by the dotted line. On the other hand, although not illustrated in the drawings, the right seat armrest 4-3 is rotated to the use position when the seat 100-3 is in the second posture, and at this time, the left seat armrest 4-3 facing the door 110-3 is rotated to the stored position.

A door 110-3 that can be opened and closed is provided on the right side of the seat 100-3. The inner wall 10-3 of the door 110-3 is provided with a door handle 11-3 for opening and closing the door operated by an occupant and a door armrest 20-3. The door armrest 20-3 is placed on a base portion 12-3 so as to block the upper end opening 12a-3 of the base portion 12-3 that is elongated in the front-rear direction, has a substantially rectangular shape in the plan view, is formed to have a predetermined thickness in the up-down direction, protrudes from the inner wall 10-3 to the inside of the vehicle interior 102-3, and a cavity is formed inside. Although not illustrated in the drawings, on the inner wall 10-3, an operation switch for inputting an opening and closing command for the window 13-3, an operation command for the locking device for the door 110-3, and the like, a door gripping portion for gripping the door 110-3, a drink holder, and the like are also provided.

The door armrest 20-3 is provided at a position substantially symmetrical centering around the seat 100-3 with respect to the seat armrest 4-3 on the left side in the use position. That is, like the seat armrest 4-3 in the use position, the door armrest 20-3 extends in the front-rear direction along the side surface 2b-3 of the seat back 2-3 and is located above than the seat cushion 1-3. As a result, for example, in the self-driving mode, one arm portion of the occupant may be placed on the seat armrest 4-3 and the other arm portion may be placed on the door armrest 20-3, and the occupant may ride in a relaxed posture.

Figure 32:
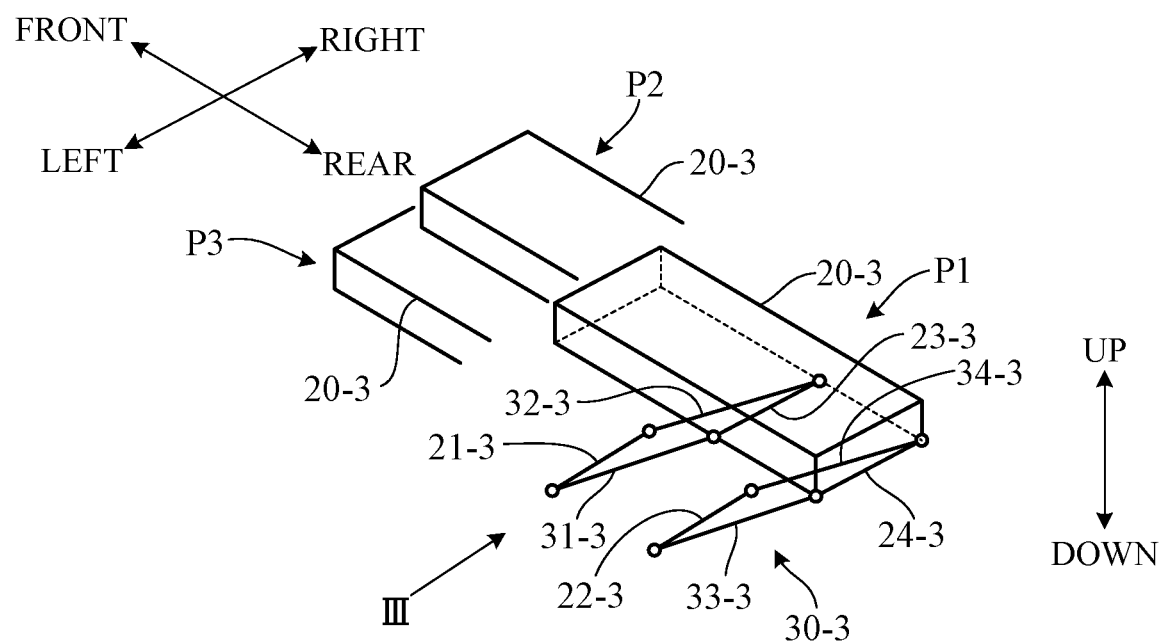
FIG. 32 is a perspective view illustrating a configuration of a support mechanism of a door armrest according to the third embodiment of the present invention.
Figure 33:
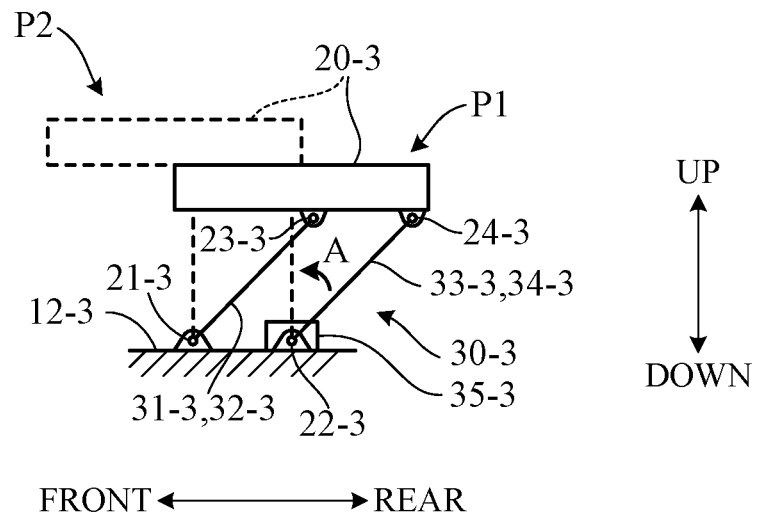
FIG. 33 is a view of arrow III in FIG. 32.

The door armrest 20-3 constitutes the armrest device 50-3 according to the third embodiment. As a characteristic configuration of the third embodiment, the door armrest 20-3 is configured to be movable forward and upward with respect to the base portion 12-3. FIG. 32 is a perspective view (viewed from diagonally left rear) illustrating a configuration of a support mechanism 30-3 of a door armrest 20-3 in the third embodiment, and FIG. 33 is a side view (a view of arrow III in FIG. 32). Note that the illustration of the base portion 12-3 is omitted.

As illustrated in FIGS. 32 and 33, the support mechanism 30-3 includes a link mechanism arranged inside the base portion 12-3. The link mechanism includes a pair of left and right rod-shaped front rods 31-3 and 32-3 and a pair of left and right rod-shaped rear rods 33-3 and 34-3. The lengths of these rods 31-3 to 34-3 are equal to each other, and these rods 31-3 to 34-3 are provided parallel to each other. As illustrated in FIG. 33, the front rods 31-3 and 32-3 are positioned so as to overlap each other in the side view, and the rear rods 33-3 and 34-3 are also positioned so as to overlap each other in the side view.

The lower end portions of the rear rods 33-3 and 34-3 are fixed to the rotating shaft 22-3 extending in the lateral direction, and the rotating shaft 22-3 is rotatably supported on the bottom portion of the base portion 12-3. An actuator 35-3 such as an electric motor or the like is provided at the end portion of the rotating shaft 22-3, the rotating shaft 22-3 is rotated by driving the actuator 35-3, and the rear rods 33-3 and 34-3 rotate in the front-rear direction with the rotating shaft 22-3 as a fulcrum as the rotating shaft 22-3 rotates.

The lower end portions of the front rods 31-3 and 32-3 are rotatably supported on the bottom portion of the base portion 12-3 via the rotating shaft 21-3 extending in the lateral direction. The upper end portions of the front rods 31-3 and 32-3 are rotatably supported on the bottom surface of the door armrest 20-3 via the rotating shaft 23-3 extending in the lateral direction. The upper end portions of the rear rods 33-3 and 34-3 are rotatably supported on the bottom surface of the door armrest 20-3 via the rotating shaft 24-3 extending in the lateral direction.

The distance from the rotating shaft 21-3 to the rotating shaft 23-3 and the distance from the rotating shaft 22-3 to the rotating shaft 24-3 are equal to each other. Also, the distance from the rotating shaft 21-3 to the rotating shaft 22-3 and the distance from the rotating shaft 23-3 to the rotating shaft 24-3 are equal to each other. Therefore, the support mechanism 30-3 constitutes a side view parallelogram link having the front rods 31-3 and 32-3 and the rear rods 33-3 and 34-3 as two sides.

When the door armrest 20-3 is located at the normal position P1 (solid line in FIG. 33), the rotating shaft 23-3 is located behind the rotating shaft 21-3, and the rotating shaft 24-3 is located behind the rotating shaft 22-3. Therefore, the front rods 31-3 and 32-3 and the rear rods 33-3 and 34-3 are inclined rearward and extend upward, respectively. From this state, when the rear rods 33-3 and 34-3 are rotated forward as illustrated by arrow A until they are in the vertical state (dotted line in FIG. 33) for example by driving the actuator 35-3, the front rods 31-3 and 32-3 also rotate forward at the same time. As a result, the door armrest 20-3 moves to the protruding position P2 (dotted line in FIG. 33) in front of and above the normal position P1.

The support mechanism 30-3 may also be configured not only to move the door armrest 20-3 to the protruding position P2 located forward and upward but also to a protruding position P3 on the left side (occupant side) of the protruding position P2 as illustrated in FIG. 32. In this case, for example, the support mechanism 30-3 may be configured so that a single or a plurality of rods whose rotation direction is regulated by a guide or the like so as to rotate forward and to the left, that is, a single or a plurality of rods that support the bottom surface of the door armrest 20-3 are provided, and the rod may be rotated forward and to the left by the driving the actuator 35-3 to move it to the protruding position P3. Alternatively, the door armrest 20-3 may be slidably supported along the rotating shafts 23-3 and 24-3, and the door armrest 20-3 may be slid to the left along the rotating shafts 23-3 and 24-3 by using a ball screw or the like to be moved to the protruding position P3.

Although not illustrated in the drawings, a telescopic rod may be supported by the base portion 12-3, and the door armrest 20-3 may be fixed to the tip end portion of the rod. In this case, the door armrest 20-3 may be positioned at the normal position P1 when the rod is in the degenerate state, and the door armrest 20-3 may be moved to the protruding position P2 or the protruding position P3 by extending the rod forward or forward and to the left by driving an actuator (for example, an air cylinder).

Figure 34:
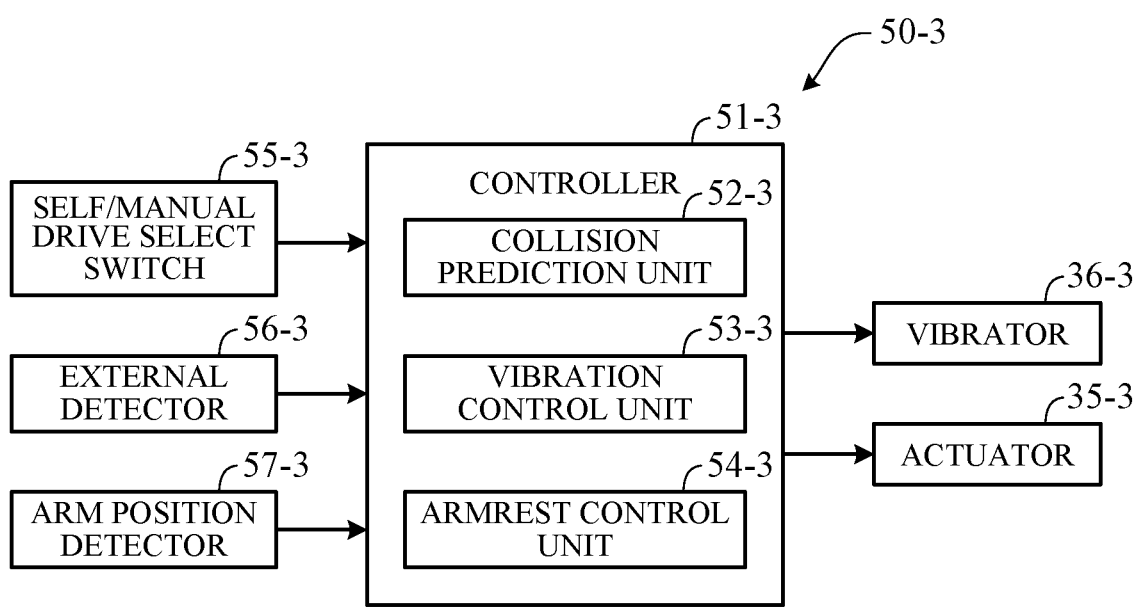
FIG. 34 is a block diagram illustrating a control configuration of an armrest device according to the third embodiment of the present invention.

The armrest device 50-3 according to the third embodiment includes the door armrest 20-3 configured to be movable as described above. FIG. 34 is a block diagram illustrating a control configuration of the armrest device 50-3 according to the third embodiment of the present invention. As illustrated in FIG. 34, the armrest device 50-3 includes a controller 51-3 related to the control of the door armrest 20-3, and a manual/automation changeover switch 55-3, an external detector 56-3, an arm position detector 57-3, a vibrator 36-3, and an actuator 35-3 that are connected to the controller 51-3 respectively via an in-vehicle network such as a CAN or the like.

The manual/automation changeover switch 55-3 is configured as a switch that may be manually operated by the driver, for example, and outputs a command to switch to the self-driving mode in which the self-driving function is enabled or to the manual driving mode in which the self-driving function is disabled, according to the switch operation. Regardless of the operation of the manual/automation changeover switch 55-3, when a predetermined traveling condition is satisfied, a changeover from the manual driving mode to the self-driving mode or a changeover from the self-driving mode to the manual driving mode may be commanded. That is, the manual/automation changeover switch 55-3 may be automatically switched so that the mode changeover is performed automatically instead of manually.

The external detector 56-3 is a detector that detects the external situation, which is the peripheral information of the car 200-3. Specifically, the external detector 56-3 can be configured by a rider that measures scattered light with respect to omnidirectional irradiation light of the car 200-3 to measure the distance from the car 200-3 to surrounding obstacles, a radar that detects other cars and obstacles around the car 200-3 by irradiating electromagnetic waves and detecting reflected waves, a camera that is mounted on the car 200-3 and includes an image sensor such as a CCD, CMOS, or the like to image the periphery (front, rear, and sides) of the car 200-3, and the like The arm position detector 57-3 is a detector that detects whether or not the arm portion of the occupant seated on the seat 100-3 is placed on the door armrest 20-3. The arm position detector 57-3 may be configured by, for example, a pressure sensor that detects the pressure due to the weight of the arm acting on the door armrest 20-3, an in-vehicle camera that images the vicinity of the door armrest 20-3, and the like.

The vibrator 36-3 is an actuator for vibration that vibrates the door armrest 20-3. The vibrator 36-3 is built in, for example, the door armrest 20-3 or is provided on the support portion of the door armrest 20-3. The vibration caused by the operation of the vibrator 36-3 is transmitted to the occupant's arm portion via the door armrest 20-3, and consequently, it is possible to inform the occupant that an object (other vehicle or the like) may collide with the car 200-3.

The controller 51-3 is an electronic control circuit (ECU) and is composed of a microcomputer including a CPU as an operating circuit, storage units such as a ROM, a RAM, and the like, and other peripheral circuits such as an input/output interface (I/O interface) and the like. The controller 51-3 reads a program stored in advance in the storage unit and executes a predetermined process.

The controller 51-3 includes a collision prediction unit 52-3, a vibration control unit 53-3, and an armrest control unit 54-3 as functional configurations. Note that, although FIG. 34 illustrates a single controller 51-3 (ECU) for convenience, a plurality of ECUs may be used instead of a single ECU to carry out the functions of each unit. That is, the controller 51-3 may also be configured by a plurality of microcomputers communicable via an in-vehicle network such as a CAN or the like.

The collision prediction unit 52-3 detects an object around the car (own car) 200-3 based on the signal input from the external detector 56-3 and determines the type of the object (pedestrian, car, or the like) based on the characteristics of the detected object. The collision prediction unit 52-3 monitors the detected object and calculates the collision probability $\alpha$ with the car 200-3 for each monitored object. The collision probability $\alpha$ is calculated in consideration of the approach speed of the monitored object to the car 200-3. The collision prediction unit 52-3 may determine the collision mode (frontal collision, left-right side collision, and rear collision) between the car 200-3 and the collision prediction object and calculate the collision probability $\alpha$ in the case of a specific collision (for example, left-right lateral collision).

When detecting a monitored object having a collision probability $\alpha$ with the car 200-3 of a predetermined value $\alpha 1$ or more, the collision prediction unit 52-3 determines that the probability that the car 200-3 and the monitored object will collide is high and outputs a first collision prediction signal. The collision prediction unit 52-3 continuously outputs the first collision prediction signal as long as the collision probability $\alpha$ is equal to or higher than the first predetermined value $\alpha 1$ and stop outputting the first collision prediction signal when the collision probability $\alpha$ becomes less than the first predetermined value $\alpha 1$.

Further, when detecting a monitored object having a collision probability $\alpha$ equal to or higher a second predetermined value $\alpha 2$ that is higher than the first predetermined value $\alpha 1$, the collision prediction unit 52-3 predicts that the car 200-3 and the monitored object will collide and outputs a second collision prediction signal. The first collision prediction signal and the second collision prediction signal also include information indicating the collision mode (frontal collision, left-right side collision, rear collision) between the car 200-3 and the collision prediction object.

When the first collision prediction signal is output from the collision prediction unit 52-3, the vibration control unit 53-3 determines whether or not the position of the occupant's arm portion detected by the arm position detector 57-3 is on the door armrest 20-3. Then, when determining that it is on the door armrest 20-3, a control signal is output to the vibrator 36-3 to operate the vibrator 36-3. This causes the door armrest 20-3 to vibrate. When the output of the first collision prediction signal from the collision prediction unit 52-3 is stopped, the vibration control unit 53-3 stops the operation of the vibrator 36-3.

When the second collision prediction signal is output from the collision prediction unit 52-3, the armrest control unit 54-3 determines whether or not the position of the occupant's arm portion detected by the arm position detector 57-3 is on the door armrest 20-3. Then, when determining that it is on the door armrest 20-3, a control signal is output to the actuator 35-3 to move the door armrest 20-3 from the normal position P1 to the protruding position P2 or the protruding position P3 in FIG. 32.

Figure 35:
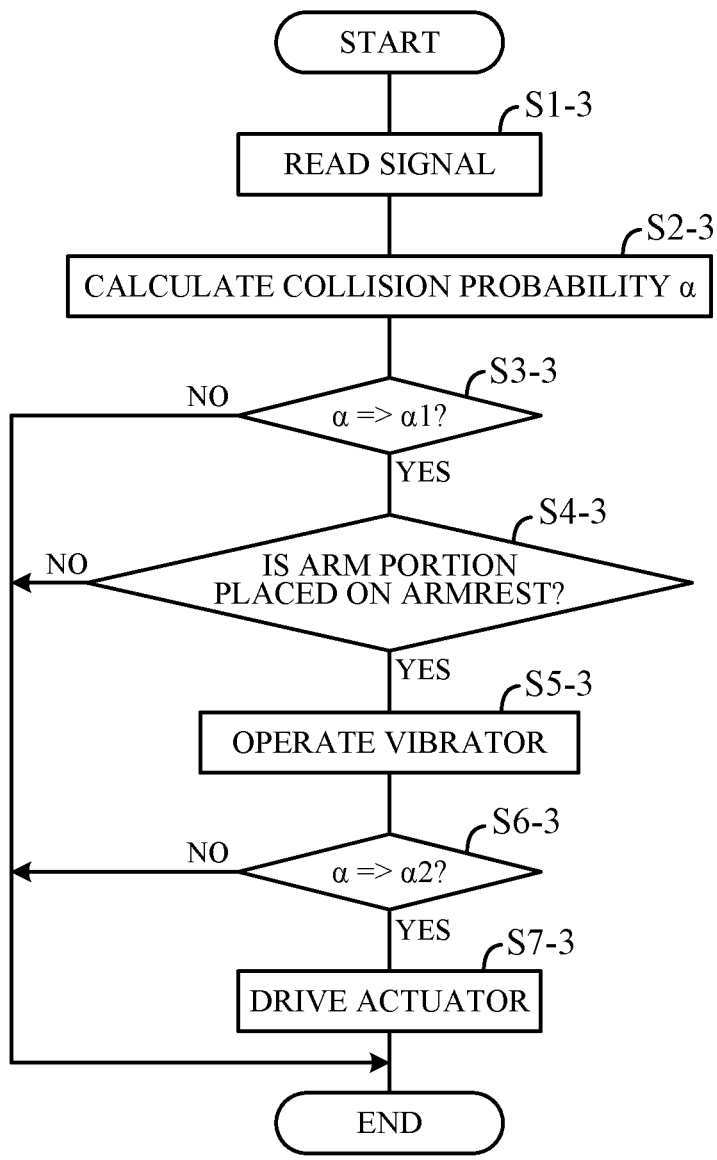
FIG. 35 is a flowchart illustrating an example of processing executed by the controller of FIG. 34.

FIG. 35 is a flowchart illustrating an example of processing related to the armrest movement executed by the CPU of the controller 51-3 in FIG. 34 according to a program stored in advance. The processing illustrated in this flowchart is started when the self-driving mode is commanded by, for example, the manual/automation changeover switch 55-3 and is repeated at a predetermined cycle until switched to the manual driving mode.

First, in step S1-3, signals from the external detector 56-3 and the arm position detector 57-3 are read. Next, in step S2-3, an object around the car 200-3 is detected based on the signal input from the external detector 56-3, and a collision probability α in which the detected object collides with the side surface (for example, the right side surface) of the car 200-3 is calculated. Next, in step S3-3, it is determined whether or not the collision probability α is equal to or higher than the predetermined value α1. If affirmed in step S3-3, the process proceeds to step S4-3, and if denied, the process ends.

In step S4-3, it is determined whether or not the occupant's arm portion is placed on the door armrest 20-3 based on the signal from the arm position detector 57-3. If affirmed in step S4-3, the process proceeds to step S5-3, and if denied, the process ends. In step S5-3, a control signal is output to the vibrator 36-3 to operate the vibrator 36-3. As a result, the occupant can recognize, for example, that another vehicle may approach the car 200-3 and collide with the car 200-3 through the vibration of the arm portion.

Next, in step S6-3, it is determined whether or not the collision probability α calculated in step S2-3 is equal to or higher than the predetermined value α2. If affirmed in step S6-3, the process proceeds to step S7-3, and if denied, the process ends. In step S7-3, a control signal is output to the actuator 35 to move the door armrest 20-3 from the normal position P1 to the protruding position P2 in front of and above thereof. As a result, the arm portion is moved forward and upward, so that the occupant may easily take a posture standing ready for a collision with another car, for example.

The operation of the armrest device 50-3 according to the third embodiment will be described more specifically. In the self-driving mode, the occupant does not need to drive the car 200-3, so there are some cases of riding in a relaxed state, for example, placing both arms on the door armrest 20-3 and the seat armrest 4-3 respectively. At this time, for example, when another vehicle approaches the car 200-3 from the right side of the car 200-3 and the collision probability α becomes the predetermined value α1 or more, the vibrator 36-3 operates (step S5-3).

As a result, it is possible that the occupant easily recognizes that another vehicle may collide with the car 200-3. That is, in the self-driving mode, when the occupant is sleeping, listening to music, or the like, the occupant may not notice even if informing the predetermined situation of the car 200-3 by voice, but by reporting (causing to feel physically) by the vibration of the vibrator 36-3, it is possible that the occupant easily notices the predetermined situation of the car 200-3. As a result, it is possible for the occupant to take a posture standing ready for a collision by himself/herself. Also, since vibration is applied to the arm portion that needs to be moved in order to take a posture standing ready for a collision, the occupant reflexively lifts the arm portion, and it is easy to take the posture standing ready for the collision.

Since the car 200-3 monitors the surrounding situations and performs self-driving, if there is a space for the car 200-3 to evacuate when another vehicle approaches, it is possible to move the car 200-3 to that space to avoid a collision. That is, the collision avoidance operation by the self-driving is performed. After performing the collision avoidance operation, the collision probability α becomes less than the predetermined value α1, so that the operation of the vibrator 36-3 is stopped.

On the other hand, due to reasons such as there is no evacuation space, there is an evacuation space but the evacuation is not in time, or the like, when another vehicle further approaches the car 200-3 and the collision probability becomes the predetermined value α2 (higher than α1) or more, the actuator 35-3 is driven, and the door armrest 20-3 moves from the normal position P1 to the protruding position P2 forward and upward thereof (step S7-3). As a result, since the occupant's arm portion is moved forward and upward, it is possible for the occupant to take a posture standing ready for a collision easily. That is, in general, a person raises his/her arm portion forward to take a posture standing ready for a collision when he/she detects a dangerous situation, but according to the third embodiment, since the occupant's arm portion is lifted forward by moving the door armrest 20-3. it is possible to take a posture standing ready for a collision easily. In particular, when another vehicle approaches the right side wall of the car 200-3, it is possible for the occupant to appropriately take a posture standing ready for a collision of an obstacle by lifting the right arm and taking the posture standing ready for the collision.

When the occupant's arm portion is not placed on the door armrest 20-3 (step S4-3), the vibrator 36-3 does not operate even if the collision probability α becomes the predetermined value α1 or higher, and the door armrest 20-3 remains in the normal position P1 even if the collision probability α becomes the predetermined value α2 or higher. That is, in this case, since it is difficult to cause the occupant to take a posture standing ready for a posture by operating the vibrator 36-3 or moving the door armrest 20-3, unnecessary operations are omitted. Note that the process of step S4-3 may be omitted, and the vibrator 36-3 may be operated and the actuator 35-3 may be driven according to the collision probability α regardless of whether the occupant's arm portion is placed on the door armrest 20-3.

According to the third embodiment of the present invention, the following effects can be obtained.

(1) The armrest device 50-3 includes a door armrest 20-3 that supports an arm portion of an occupant seated on a seat 100-3 arranged in an inner space of a door 110-3 of a car 200-3, a support mechanism 30-3 that supports the door armrest 20-3 so as to be movable from a normal position P1 to a protruding position P2 in front of and above the normal position P1, and an actuator 35-3 that is provided in the support mechanism 30-3 and moves the door armrest 20-3 from the normal position P1 to the protruding position P2 when it is predicted that an impact due to a collision of another vehicle or the like acts on the car 200-3 (FIGS. 33 and 34). With this configuration, it is possible to move the occupant's arm portion forward and upward, and it is possible for the occupant to take a posture standing ready for a collision between the car 200-3 and another vehicle before the collision.

(2) The support mechanism 30-3 may also support the door armrest 20-3 so as to be movable to a protruding position P3, in front of and above the normal position P1 and further inside in a lateral direction (inside in a vehicle width direction) (FIG. 32). As a result, for example, when another vehicle is likely to collide with the door 110-3 of the car 200-3, the arm portion of the occupant moves in the direction of escaping from the other car, so that it is possible to protect the occupant appropriately.

(3) The armrest that is movable from the normal position P1 to the protruding position P2 is the door armrest 20-3 provided on the inner wall 10-3 of the door 110-3 (FIG. 31). Therefore, for example, when another vehicle collides with the door 110-3, the arm portion on the door 110-3 side is lifted so that it is possible for the occupant to take an optimum posture standing ready for the collision.

(4) The armrest device 50-3 further includes a controller 51-3 that controls the actuator 35-3 so as to move the door armrest 20-3 from the normal position P1 to the protruding position P2 when it is predicted that an impact acts on the door 110-3 due to a collision of another vehicle or the like (FIG. 34). By moving the door armrest 20-3 on the side portion of the vehicle in response to the side collision in this way, it is possible to cause the occupant to stand ready for the side collision appropriately. Also, it is possible to drive the actuator 35-3 at an optimum timing by a command from the controller 51-3.

(5) The armrest device 50-3 further includes a vibrator 36-3 that vibrates the door armrest 20-3 (FIG. 34). As a result, it is possible to appropriately inform the occupant that it is required to take a posture standing ready for a collision through the arm on the door armrest 20-3.

(6) The armrest device 50-3 including the door armrest 20-3 that is movable from the normal position P1 to the protruding position P2 is applied to a self-driving car 200-3 having a self-driving function. In the self-driving car 200-3, since the occupant often rides in a relaxed posture with the arm portion placed on the door armrest 20-3, it is particularly effective to apply the armrest device 50-3 including the door armrest 20-3 being movable to the self-driving car 200-3 as in the third embodiment.

The third embodiment can be modified into various forms. Hereinafter, modifications of the third embodiment will be described.

First Modification

A first modification of the third embodiment will be described. In the third embodiment, the door armrest 20-3 is configured to be movable to the protruding position P2 in front of the vehicle when the seat 100-3 is facing forward, but it is also possible to face the seat 100-3 backward, and in this case, the door armrest 20-3 is moved appropriately in the first modification. Note that, in the following, differences from the third embodiment will be mainly described.

Figure 36:
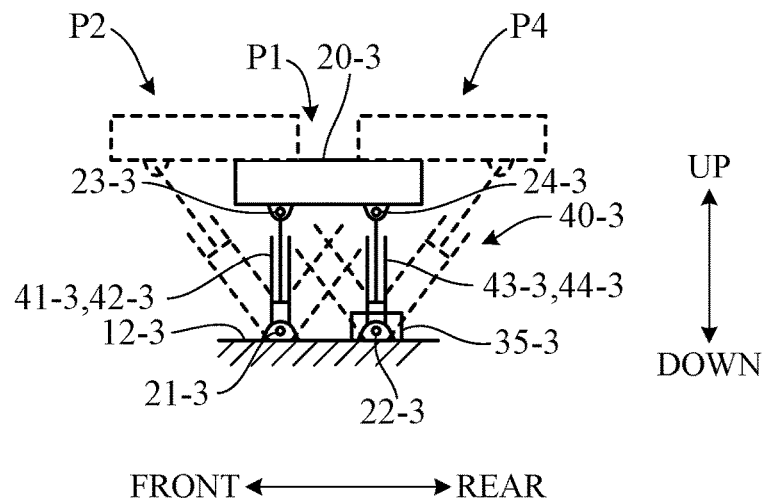
FIG. 36 is a side view illustrating a configuration of a support mechanism of a door armrest according to a first modification of the third embodiment of the present invention.

FIG. 36 is a side view illustrating a configuration of the support mechanism 40-3 of the door armrest 20-3 according to the first modification. Note that the same parts as those in FIG. 33 are designated by the same signs. As illustrated in FIG. 36, the support mechanism 40-3 includes a pair of left and right front cylinders 41-3 and 42-3 and a pair of left and right rear cylinders 43-3 and 44-3 which are arranged so as to overlap each other in a side view and are telescopic. The front cylinders 41-3 and 42-3 and the rear cylinders 43-3 and 44-3 each have a cylinder tube and a cylinder rod arranged so as to be expandable and contractible in the cylinder tube.

The lower end portions of the cylinder tubes of the rear cylinders 43-3 and 44-3 are fixed to a rotating shaft 22-3, respectively. An actuator 35-3 is provided at the end portion of the rotating shaft, and the rear cylinders 43-3 and 44-3 rotate being integrated with the rotating shaft 22-3 with the rotating shaft 22-3 as a fulcrum by driving the actuator 35-3. The upper end portions of the cylinder rods of the front cylinders 41-3 and 42-3 are rotatably supported on the bottom surface of the door armrest 20-3 via the rotating shaft 23-3. The upper end portions of the cylinder rods of the rear cylinders 43-3 and 44-3 are rotatably supported on the bottom surface of the door armrest 20-3 via the rotating shaft 24-3. The lower end portions of the cylinder tubes of the front cylinders 41-3 and 42-3 are rotatably supported on the bottom portion of the base portion 12-3 via the rotating shaft 21-3.

As illustrated by the solid line in FIG. 36, when the door armrest 20-3 is in the normal position P1, the cylinders 41-3 to 44-3 are degenerated to the maximum and extend in the up-down direction. From this state, when the cylinders 41-3 to 44-3 are rotated forward by the forward direction drive of the actuator 35-3 and the cylinders 41-3 to 44-3 are extended to the maximum, the door armrest 20-3 moves to the protruding position P2 on the front side, which is in front of and above the normal position P1. On the other hand, when the cylinders 41-3 to 44-3 rotate rearward due to the reverse direction drive of the actuator 35-3 and the cylinders 41-3 to 44-3 extend to the maximum, the door armrest 20-3 moves to the protruding position P4 on the rear side, which is behind and above the normal position P1.

Note that, in the configuration of FIG. 36, the door armrest 20-3 may be moved to the protruding position (P3 of FIG. 32) in front of and above the normal position P1 and further inward in the vehicle width direction. Also, the door armrest 20-3 may be moved to the protruding position behind and above the normal position P1 and further inward in the vehicle width direction.

Figure 37:
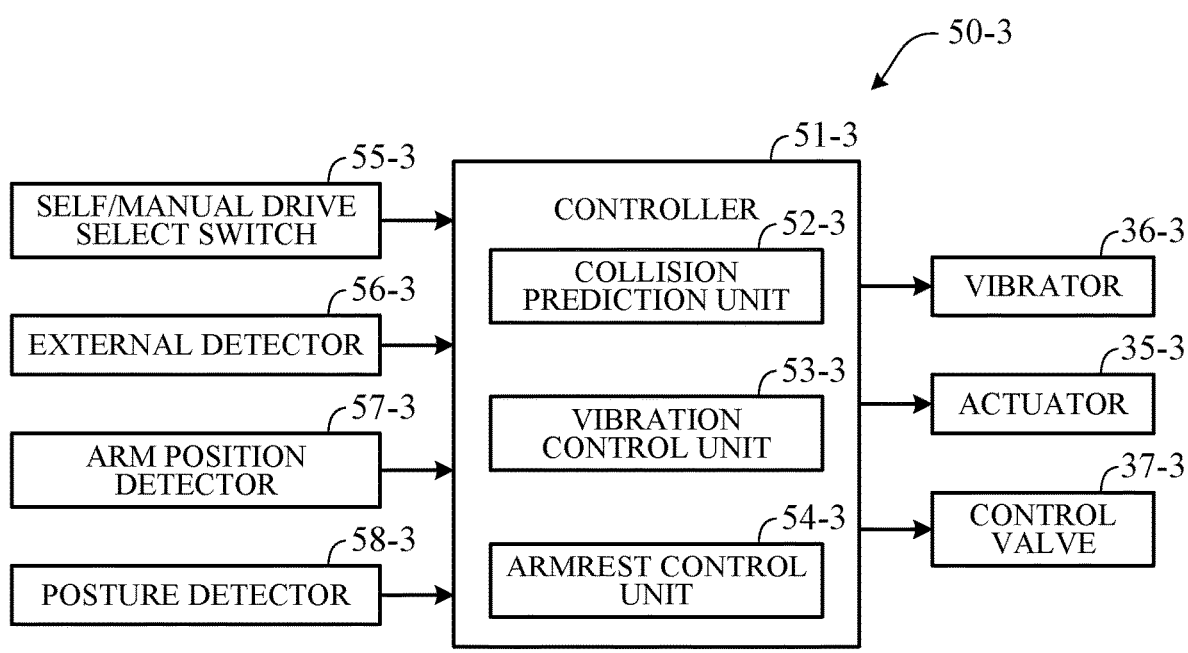
FIG. 37 is a block diagram illustrating a control configuration of an armrest device according to the first modification of the third embodiment of the present invention.

FIG. 37 is a block diagram illustrating a control configuration of the armrest device 50-3 according to the first modification. Note that the same parts as those in FIG. 34 are designated by the same signs. As illustrated in FIG. 37, in the first modification, in addition to the configuration of FIG. 34, a posture detector 58-3 and a control valve 37-3 are further connected to the controller 51-3.

The posture detector 58-3 is composed of, for example, an angle sensor such as a rotary encoder provided in the rotation mechanism 5-3 (FIG. 31), and it is possible to detect a posture of the seat 100-3 (first posture and second posture) by detecting a rotation angle of the seat 100-3 centered on an axis line CL2. Note that the posture detector 58-3 may also be configured by an in-vehicle camera that images the seat 100-3.

The control valve 37-3 is arranged in, for example, a pipeline that supplies drive air from an air source to the front cylinders 41-3 and 42-3 and the rear cylinders 43-3 and 44-3. The control valve 37-3 is opened, for example, when the door armrest 20-3 is moved to the protruding positions P2 and P4, whereby air is supplied to the cylinders 41-3 to 44-3 to extend the cylinders 41-3 to 44-3. Note that the cylinders 41-3 to 44-3 may be extended by using an actuator such as an electric motor instead of the control valve 37-3.

Figure 38:
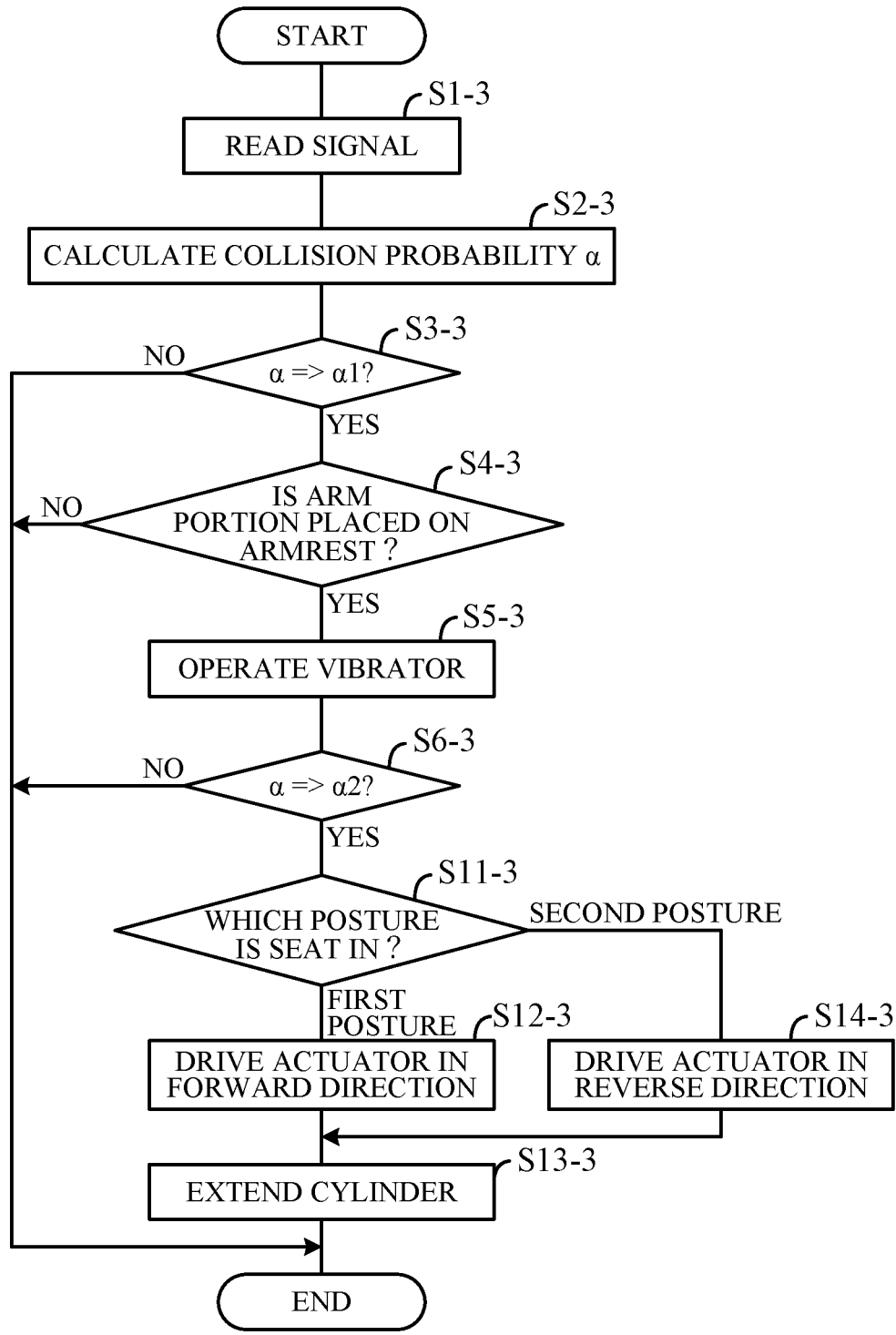
FIG. 38 is a flowchart illustrating an example of processing executed by a controller of FIG. 37.

FIG. 38 is a flowchart illustrating an example of processing executed by the CPU of the controller 51-3 of FIG. 37 according to a program stored in advance. The processing represented in this flowchart is started while driving the car 200-3 in, for example, the self-driving mode, and is repeated at a predetermined cycle. Note that the same parts as those in FIG. 35 are designated by the same signs.

As illustrated in FIG. 38, when the collision probability α is determined to be equal to or higher than the predetermined value α2 in step S6-3, the process proceeds to step S11-3, and it is determined whether the seat 100-3 is in the first posture or the second posture based on a signal from the posture detector 58-3. If it is determined in step S11-3 that the seat 100-3 is in the first posture, the process proceeds to step S12-3, and as in step S7-3 in FIG. 35, a control signal is output to the actuator 35-3 to drive the actuator 35-3 in the forward direction (forward direction drive). As a result, the cylinders 41-3 to 44-3 rotate forward. Next, in step S13-3, a control signal is output to the control valve 37-3 to extend the cylinders 41-3 to 44-3. As a result, the door armrest 20-3 moves to the protruding position P2 in the front.

On the other hand, if it is determined in step S11-3 that the seat 100-3 is in the second posture, the process proceeds to step S14-3, a control signal is output to the actuator 35-3 to drive the actuator 35-3 in the reverse direction (reverse direction drive). As a result, the cylinders 41-3 to 44-3 rotates rearward. Next, in step S13-3, a control signal is output to the control valve 37-3 to extend the cylinders 41-3 to 44-3. As a result, the door armrest 20-3 moves to the protruding position P4 in the rear.

The first modification has the following effects in addition to the effects described in the third embodiment. That is, the seat 100-3 is configured so that the posture can be changed to a first posture in which the occupant faces the front (first direction) of the car 200-3 and a second posture in which the occupant faces the rear (second direction) of the car 200-3 via a rotation mechanism 5-3. The support mechanism 40-3 supports the door armrest 20-3 so as to be movable from the normal position P1 to the protruding position P2 in front of the vehicle and upward and the protruding position P4 rearward the vehicle and above (FIG. 36). As a result, if a collision with another vehicle is predicted when the seat 100-3 is in the first position, the door armrest 20-3 may be moved to the protruding position P2 in front of the vehicle and above, and on the other hand, if a collision with another vehicle is predicted when the seat 100-3 is in the second posture, the door armrest 20-3 may be moved to the protruding position P4 rearward the vehicle and above.

This allows the occupant to move the arm portions forward and upward regardless of whether the occupant is seated facing the front or the rear of the car. Therefore, when a collision of another vehicle with the car 200-3 is predicted, it is possible to cause the occupant to stand ready for the collision well regardless of the posture of the seat 100-3. That is, in the self-driving car 200-3, since the driving operation of the occupant may not be required, the occupant may be seated with the seat 100-3 facing backward, but even in this case, it is possible to cause the occupant to stand ready for a collision well by moving the door armrest 20-3.

Second Modification

A second modification of the third embodiment will be described. In the third embodiment described above, the door armrest 20-3 is configured to be movable in the front-rear direction and upward, but in the second modification, the seat armrest 4-3 is further configured to be movable in the front-rear direction and upward. Note that, in the following, differences from the third embodiment will be mainly described.

Figure 39:
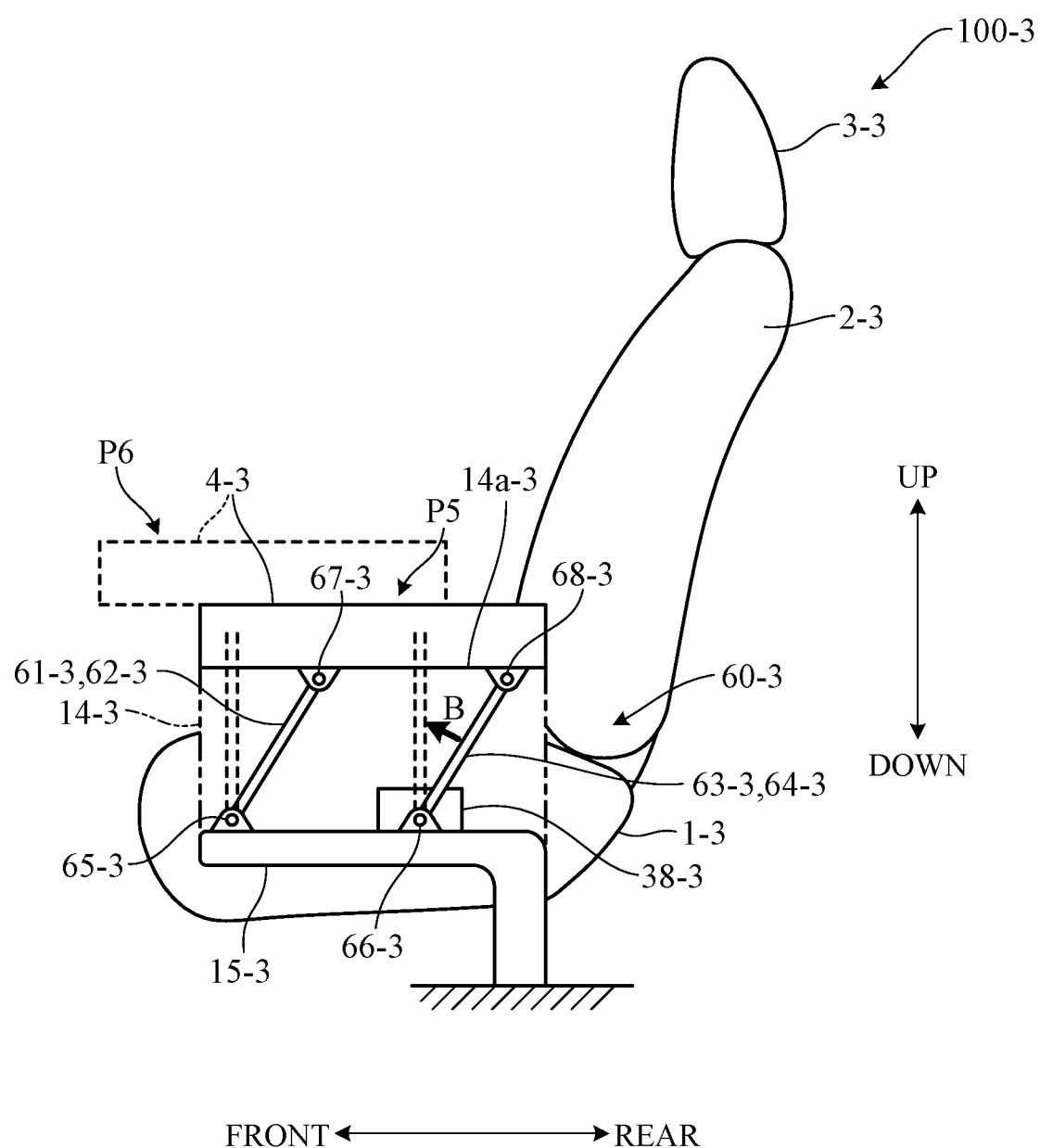
FIG. 39 is a side view illustrating a configuration of a support mechanism of a seat armrest according to a second modification of the third embodiment of the present invention.

FIG. 39 is a side view of the seat 100-3 as viewed from the inside of the vehicle (for example, the left side of the car). As illustrated in FIG. 39, the seat armrest 4-3 is placed on a base portion 14-3 (represented by a virtual line for convenience) so as to block the upper end opening 14a-3 of the base portion 14-3 that is arranged at the left side of the seat 100-3 (opposite the door 110-3) and has a substantially rectangular parallelepiped shape with a hollow interior. The base portion 14-3 is supported from the floor via a substantially L-shaped support frame 15-3. A support mechanism 60-3 that movably supports the seat armrest 4-3 is arranged in the base portion 14-3.

The support mechanism 60-3 is configured as a parallelogram link similar to the support mechanism 30-3 of the door armrest 20-3 illustrated in FIG. 33. That is, the support mechanism 60-3 includes a pair of left and right rod-shaped front rods 61-3 and 62-3 and a pair of left and right rod-shaped rear rods 63-3 and 64-3 formed to have the same length with each other. These rods 61-3 to 64-3 are arranged parallel to each other. The lower end portions of the rear rods 63-3 and 64-3 are fixed to the rotating shaft 66-3 extending in the lateral direction, and the rotating shaft 66-3 is rotatably supported on the bottom portion of the base portion 14-3. An actuator 38-3 such as an electric motor or the like is provided at the end portion of the rotating shaft 66-3, the rotating shaft 66-3 is rotated by driving the actuator 38-3, and the rear rods 63-3 and 64-3 rotate in the front-rear direction with the rotation shaft 66-3 as a fulcrum as the rotating shaft 66-3 rotates.

The lower end portions of the front rods 61-3 and 62-3 are rotatably supported on the bottom portion of the base portion 14-3 via a rotating shaft 65-3 extending in the lateral direction. The upper end portions of the front rods 61-3 and 62-3 are rotatably supported on the bottom surface of the seat armrest 4-3 via the rotating shaft 67-3 extending in the lateral direction. The upper end portions of the rear rods 63-3 and 64-3 are rotatably supported on the bottom surface of the seat armrest 4-3 via the rotating shaft 68-3 extending in the lateral direction.

When the seat armrest 4-3 is located at the use position P5 (solid line in FIG. 39), the rotating shaft 67-3 is located behind the rotating shaft 65-3, and the rotating shaft 68-3 is located behind the rotating shaft 66-3. Therefore, the front rods 61-3 and 62-3 and the rear rods 63-3 and 64-3 are inclined rearward and extend upward, respectively. From this state, when the rear rods 63-3 and 64-3 are rotated forward as illustrated by arrow B until they are in the vertical state (dotted line in FIG. 39) for example by driving the actuator 38-3, the front rod 61-3 and 62-3 also rotate forward at the same time. As a result, the seat armrest 4-3 moves to the protruding position P6 (dotted line in FIG. 39) in front of and above the use position P5.

The support mechanism 60-3 may also be configured not only to move the seat armrest 4-3 to the protruding position P6 located forward and upward but also to a protruding position on the right side (occupant side) of the protruding position P6. For example, when the door armrest 20-3 is configured to move to the protruding position P3 (FIG. 32) on the occupant side, the seat armrest 4-3 is also configured to move to the occupant side. Note that the support mechanism 60-3 may be configured to move the seat armrest 4-3 forward and upward to the opposite side of the occupant (opposite the door 110-3).

Figure 40:
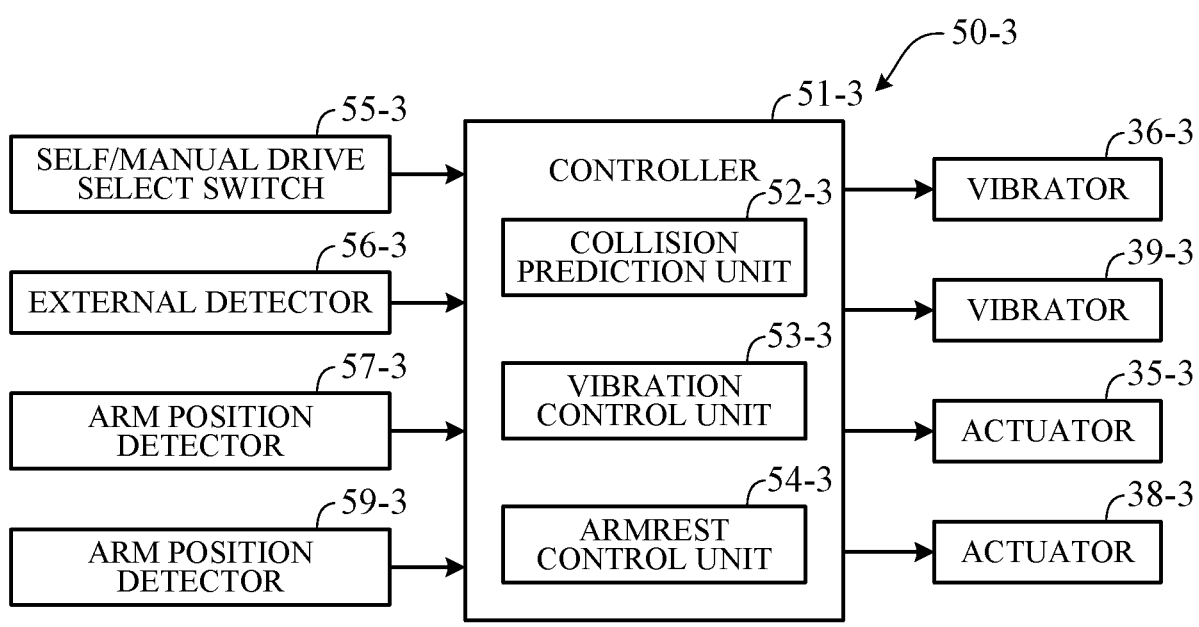
FIG. 40 is a block diagram illustrating a control configuration of an armrest device according to the second modification of the third embodiment of the present invention.

FIG. 40 is a block diagram illustrating a control configuration of the armrest device 50-3 according to the second modification. Note that the same parts as those in FIG. 34 are designated by the same signs. As illustrated in FIG. 40, in the second modification, in addition to the configuration of FIG. 34, an arm position detector 59-3, an actuator 38-3, and a vibrator 39-3 are further included.

The arm position detector 59-3 is a detector that detects whether or not the arm portion of the occupant seated on the seat 100-3 is placed on the seat armrest 4-3. Similar to the arm position detector 57-3, the arm position detector 59-3 may be configured by, for example, a pressure sensor that detects the pressure due to the weight of the arm acting on the seat armrest 4-3, an in-vehicle camera that images the vicinity of the seat armrest 4-3, and the like. The vibrator 39-3 is a vibration actuator that vibrates the seat armrest 4-3, similar to the vibrator 36-3.

Figure 41:
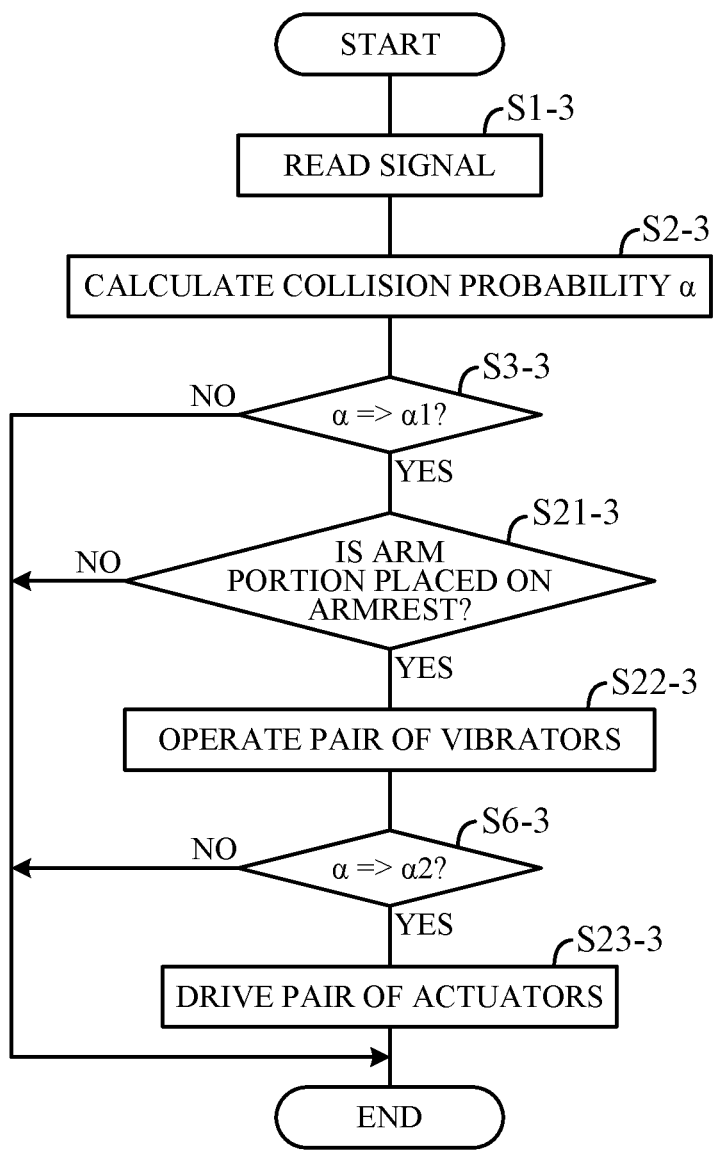
FIG. 41 is a flowchart illustrating an example of processing executed by the controller of FIG. 40.

FIG. 41 is a flowchart illustrating an example of processing executed by the CPU of the controller 51-3 of FIG. 40 according to a program stored in advance. The processing represented in this flowchart is started while driving the car 200-3 in, for example, the self-driving mode, and is repeated at a predetermined cycle. Note that the same parts as those in FIG. 35 are designated by the same signs.

As illustrated in FIG. 41, when the collision probability α is determined to be equal to or higher than the predetermined value α1 in step S3-3, the process proceeds to step S21-3, and based on signals from the arm position detectors 57-3 and 59-3, it is determined whether or not the occupant's arm portions are placed on the armrests, that is, on the door armrest 20-3 and the seat armrest 4-3. If affirmed in step S21-3, the process proceeds to step S22-3, and if denied, the process ends. In step S22-3, a control signal is output to the pair of vibrators 36-3 and 39-3 to operate the vibrators 36-3 and 39-3. Note that, in step S21-3, if it is determined that only the right arm portion of the occupant is placed on the armrest (door armrest 20-3), only the vibrator 36-3 may be operated, and if it is determined that only the left arm portion is placed on the armrest (seat armrest 4-3), only the vibrator 39-3 may be operated.

Next, in step S6-3, it is determined whether or not the collision probability α calculated in step S2-3 is equal to or higher than the predetermined value α2. If affirmed in step S6-3, the process proceeds to step S23-3, a control signal is output to the pair of actuators 35-3 and 38-3, the door armrest 20-3 is moved to the protruding position P2 forward and upward from the normal position P1 (FIG. 33), and the seat armrest 4-3 is moved to the protruding position P6 forward and upward from the use position P5. As a result, the both arm portions of the occupant are moved forward and upward, so that the occupant may easily take a posture standing ready for a collision with another car, for example.

The second modification has the following effects in addition to the effects described in the third embodiment. That is, as armrests that are movable from the normal position P1 and the use position P5 to the protruding positions P2 and P6 forward and upward, the door armrest 20-3 (first armrest) is provided on the inner wall surface of the door 110-3, and the seat armrest 4-3 (second armrest) is provided on the side of the seat 100-3 on the left-right opposite side of the door armrest 20-3 is provided (FIG. 39). As a result, since it is possible to move the left and right armrests 4-3 and 20-3 at the same time, it is possible for the occupant to favorably take a posture standing ready for a collision of another vehicle with the car 200-3 when the collision is predicted.

Other Modifications

In the third embodiment described above, the entire door armrest 20-3 or the seat armrest 4-3 is moved, but only a part thereof may be moved. For example, only the tip end portion may be moved, or only the central portion may be moved. In the third embodiment described above, when a collision with another vehicle is predicted, the controller 51-3 controls the actuator 35-3 so as to move the door armrest 20-3 forward and upward, but the configuration of the control unit is not limited to those described above. For example, the vibrator 36-3 as the vibration unit may be omitted, and the vibration control unit 53-3 may be omitted. The collision prediction unit 52-3 may predict the presence or absence of a collision with the side wall (door 110-3) of the car, and when a collision on the side wall is predicted, the armrest control unit 54-3 may be configured to drive the armrest on the side wall side. Note that the side wall may be other than the door. Therefore, the door armrest may be provided on the side wall of the frame other than the door according to the position of the arm portion of the occupant seated on the seat.

In the third embodiment described above, at least the door armrest 20-3 is moved from the normal position P1 (first position) to the protruding positions P2, P3, and P4 (second positions) in front of and above the occupant, but only one or both left and right seat armrests 4-3 may be moved forward and upward. That is, it is possible to apply the third embodiment to various armrests that support the arm portion of the occupant seated on the vehicle seat arranged in the inner space of the side wall of the vehicle such as a car and the like. In the third embodiment described above, the armrests (door armrest 20-3 and seat armrest 4-3) are supported so as to be movable from the normal position P1 or the use position P5 to the protruding positions P2, P3, P4, and P6 by the support mechanisms 30-3, 40-3, and 60-3, but the configuration of the support mechanism is not limited to the ones described above, and therefore, the configuration of the actuator provided in the support mechanism is not limited to the ones described above. The armrest may be provided on other than the seat and on other than the side wall (for example, on the vehicle body floor). An armrest that is provided on other than the seat and is other than the door armrest may also be referred to as a seat armrest for convenience.

Figure 42:
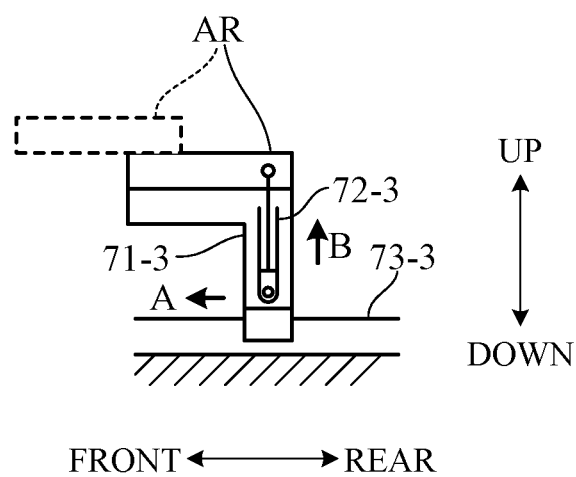
FIG. 42 is a side view illustrating a modification of the support mechanism of the armrest.

FIG. 42 is a side view illustrating another example of the support mechanism. In FIG. 42, the armrest AR (door armrest or seat armrest) is mounted movable in the up-down direction from the support frame 71-3 via a telescopic cylinder 72-3. The lower end portion of the support frame 71-3 is slidably supported in the front-rear direction along the rail 73-3 extending in the front-rear direction on the vehicle body floor. In this configuration, when a collision with another vehicle or the like is predicted, the support frame 71-3 is moved forward as represented by arrow A by driving an actuator (motor or cylinder) not illustrated in the drawings, and the armrest AR is moved upward by extending the cylinder 72-3 as represented by arrow B. As a result, it is possible for the armrest AR to be moved from the first position (solid line in FIG. 42) to the second position forward and upward (dotted line in FIG. 42).

Figure 43:
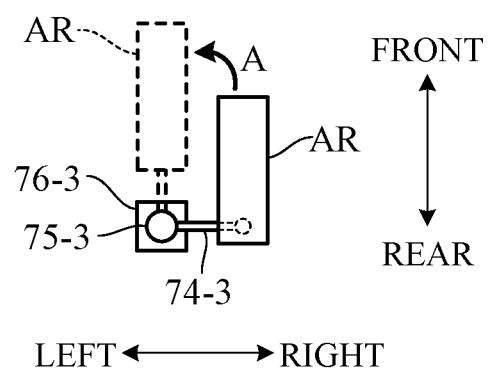
FIG. 43 is a plan view illustrating another modification of the support mechanism of the armrest.

FIG. 43 is a plan view illustrating yet another example of the support mechanism. In FIG. 43, the rear end portion of the armrest AR (door armrest or seat armrest) is rotatably supported with the support portion 75-3 as a fulcrum via the support rod 74-3. The support portion 75-3 is, for example, a columnar member erected upward on the vehicle body floor or from the seat 100-3 via the cylinder 76-3. In this configuration, when a collision with another vehicle or the like is predicted, the cylinder 76-3 extends to move the armrest AR upward, and the support rod 74-3 is rotated forward as presented by arrow A by driving an actuator (for example, a motor) provided on the support portion 75-3. The armrest AR is supported by the support rod 74-3 so that the tip end portion always faces forward, for example, via a link mechanism, and therefore, it is possible for the armrest AR to be moved from the first position (solid line in FIG. 43) to the second position forward and upward (dotted line in FIG. 43).

The vehicle seat 100-3 of the third embodiment may take the configuration described below according to the driving mode of the car 200-3. That is, for example, when a self-driving mode of level 4 or higher is set and an operation of reclining the seat 100-3 rearward is performed by the occupant, an electric motor that rotates the seat armrest 4-3 on the door 110-3 side so as to be located at the state of in use may be provided. Further, a sub-armrest may be provided inside the armrests 4-3 and 20-3 so as to slidably move forward so that the area of the portion on which the occupant's arm portion can be placed is expanded.

Similar to the modification of the second embodiment described above, when a predetermined self-driving mode is set, an auxiliary armrest that supports the upper arm (the portion between the shoulder joint and the elbow joint) of the occupant seated on the seat 100-3 from below may be provided on the seat 100-3.

Similar to the modification of the second embodiment described above, the armrest (for example, the seat armrest 4-3) is rotatably configured by an electric motor or the like, and an auxiliary armrest that is rotatably attached to the tip end portion of the armrest by an electric motor or the like may be provided.

Similar to the modification of the second embodiment described above, an input/output device that becomes operable when the self-driving mode is set may be provided on the armrest (for example, the seat armrest 4-3).

Similar to the modification of the second embodiment described above, the armrests 4-3 and 20-3 may be provided with a light unit.

Similar to the modification of the second embodiment described above, the armrests 4-3 and 20-3 may also be configured to be able to change the width of the part on which the occupant's arm portion is placed in the manual driving mode and the self-driving mode. In this case, when switching from the self-driving mode to the manual driving mode, the armrest may be moved to guide the driver's arm portion to the steering wheel.

Similar to the modification of the second embodiment described above, the armrests 4-3 and 20-3 may be provided with a display device such as a liquid crystal panel or the like. Further, the angle of the display screen of the display device may be changed according to the reclining angle of the seat 100-3.

Similar to the modification of the second embodiment described above, the in-vehicle camera may be attached to the armrest.

Similar to the modification of the second embodiment described above, a device capable of adjusting the movable range may be provided so that the movable range of the armrests 4-3 and 20-3 when the self-driving mode is set becomes larger compared to the movable range of the armrests when the manual driving mode is set.

Similar to the modification of the second embodiment described above, it is also possible to secure the route for getting on and off for the occupant by rotating the seat armrest 4-3 so that the tip end portion of the seat armrest 4-3 on the door side is located outside the vehicle in conjunction with an operation of an opening and closing switch of the door 110-3.

Similar to the modification of the second embodiment described above, it is also possible to configure that the distance between the left and right armrests (for example, the door armrest 20-3 and the seat armrest 4-3) is changed according to the driving mode of the car.

Figure 44:
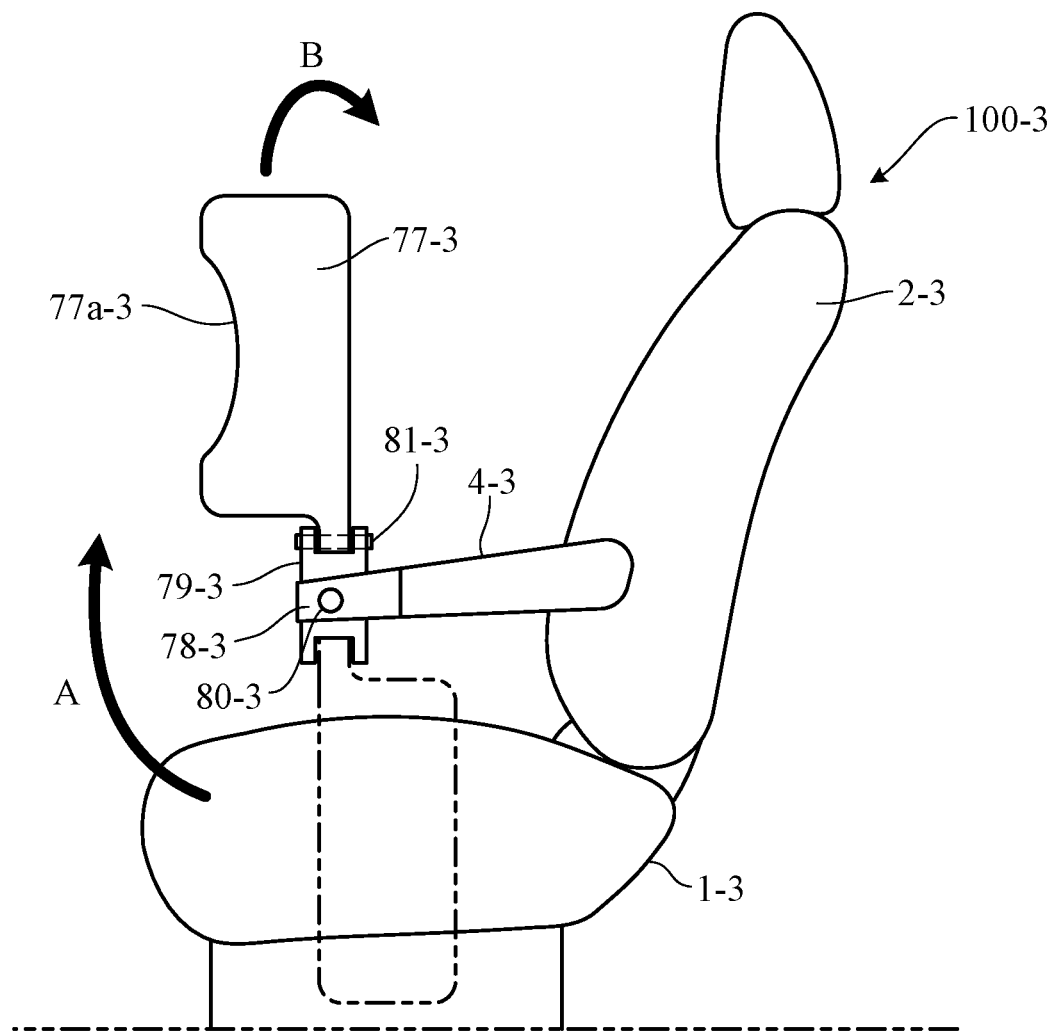
FIG. 44 is a side view of a seat illustrating an example in which a table is provided at a tip end portion of an armrest.

Various accessories may also be attached to the armrest. For example, a table may be provided at the tip end portion of the armrest. FIG. 44 is a side view of the seat 100-3 illustrating an example thereof. In FIG. 44, a table 77-3 is provided at the tip end portion of the left seat armrest 4-3. Note that the table 77-3 may be provided on either one of the left and right armrests (door armrest 20-3 and seat armrest 4-3) or may be provided on both.

As illustrated in FIG. 44, the table 77-3 is connected to the front end portion of the seat armrest 4-3. A pair of left and right retaining plates 78-3 are provided at the front end portion of the seat armrest 4-3. A rotating member 79-3 is arranged between the pair of left and right retaining plates 78-3. Through-holes are provided in the pair of left and right retaining plates 78-3 and the rotating member 79-3, and a pin 80-3 extending in the lateral direction is inserted in the through-holes. Therefore, the table 77-3 is rotatable centering around the pin 80-3 between a position where the tip end portion is arranged below the seat armrest 4-3 (the chain double-dashed line) and a position where the tip end portion is arranged above the seat armrest 4-3 (the solid line).

A pin 81-3 extending in the front-rear direction is provided at the end portion of the rotating member 79-3. The base end portion of the table 77-3 is rotatably attached to the pin 81-3. That is, the table 77-3 is rotatable centering around the pin 81-3 between a position along the vertical direction illustrated in the drawing and a position along the horizontal direction not illustrated in the drawing. Note that the door armrest 20-3 on the right side is provided with a mounting portion on which the right end portion of the table 77-3 is mounted. The mounting portion may be stored inside the door armrest 20-3.

The table 77-3 has a curved portion 77a-3 that curves along the steering wheel. The curved portion 77a-3 is a relief portion formed so as not to interfere with the steering wheel when the table 77-3 is rotated to a position along the horizontal direction. When using the table 77-3, after the table 77-3 in the unused state represented by the chain double-dashed line in FIG. 44 is rotated centering around the pin 80-3 as represented by arrow A and raised vertically, it is rotated centering around the pin 81-3 as represented by arrow B, and the tip end portion of the table 77-3 is mounted on the mounting portion of the door armrest 20-3. Note that a locking mechanism for fixing the table 77-3 at the mounting portion may be provided.

Note that the mounting portion for fixing the right end portion of the table 77-3 may be configured to be rotatable at a predetermined rotation angle. For example, the mounting portion is connected to the door armrest 20-3 via a rotation shaft extending in the lateral direction and is rotatably provided in a predetermined rotation range centering around the rotation shaft. As a result, it is possible to tilt the table 77-3 to a predetermined angle, so that in a state that the seat 100-3 is reclining, it is possible to adjust the angle of the table 77-3 and set an information terminal such as a book, a smartphone, or the like is set to a position where the occupant may see it easily. Therefore, it is possible to improve the comfort of the vehicle in the self-driving state.

In the third embodiment described above, the seat 100-3 is configured to be rotatable via the rotation mechanism 5-3, but the rotation mechanism 5-3 may be omitted so that the seat 100-3 always faces forward. In this case, the seat armrest 4-3 on the right side may be omitted. In the third embodiment described above, the control related to the armrest movement is performed on the condition that the self-driving mode is commanded by the manual/automation changeover switch 55-3, but the control related to the armrest movement may be performed in the same manner even when the manual driving mode is commanded. In this case, other armrests may be moved with the exclusion of the armrests of the driver's seat. In the third embodiment described above, the armrest device is applied to a self-driving vehicle having the self-driving function, but the armrest device of the third embodiment may also be applied to a vehicle not having the self-driving function.

The armrest device according to the third embodiment described above may also be applied to the occupant protection device according to the first embodiment. In this case, in the seat 100-3, the pressure-receiving portion (the seat back pad 20, the pressure-receiving plate 5, and the like as illustrated in FIGS. 2 and 3) that receives the load from the seated occupant supported by the frame member of the seat 100-3 and the posture changing mechanism (the posture changing mechanism 6 as illustrated in FIG. 4) that movably supports the pressure-receiving portion are provided as in the first embodiment. Also, the side wall (door 110-3) or the seat 100-3 is provided with a side airbag device including a side airbag that is inflated and deployed between the side wall and the seat 100-3. Then, at the time of activating the side airbag when the side airbag device is activated by the impact acting on the door 110-3 from the outside to inflate and deploy the side airbag, the controller 51-3 controls the posture changing mechanism (actuator 61 in FIG. 4 or the like) so as to move the pressure-receiving portion so that the occupant is pushed in the direction away from the door 110-3 before the occupant contacts the side airbag. As a result, it is also possible to obtain the same effects as those of the first embodiment.

Fourth Embodiment

Hereinafter, a fourth embodiment of the present invention will be described with reference to the drawings. An armrest device according to the fourth embodiment is applied to a vehicle seat arranged in a vehicle interior. In the fourth embodiment, the vehicle including the vehicle seat is configured as a self-driving vehicle having a self-driving function. Note that the self-driving vehicle may travel not only in the self-driving mode that does not require a driving operation by a driver but also in the manual driving mode by the driving operation of the driver.

The traveling operation of the self-driving vehicle is controlled by a vehicle control system. In the self-driving mode, the vehicle control system determines a traveling route including a target vehicle speed and a target acceleration to reach the destination input in advance based on the current position of the own vehicle measured by a GPS receiver and the like and the surrounding situation of the own vehicle detected by a camera, radar, lidar, and the like. Then, the traveling actuator is automatically controlled so that the vehicle travels according to the traveling route without the operation of the driver. On the other hand, in the manual driving mode, the vehicle control system controls the traveling actuators according to the operation of the accelerator pedal, the brake pedal, the steering wheel, and the like by the driver. The traveling actuator includes, for example, a throttle actuator that changes the opening degree of the throttle valve, a transmission actuator that changes the gear ratio of the transmission, a brake actuator that operates the braking device, a steering actuator that operates the steering device, and the like are included.

Similar to the third embodiment described above, the vehicle control system includes a driving level command switch that commands a self-driving level in the self-driving mode. An armrest device suitable for use in a self-driving vehicle whose driving level is changeable will be described below.

Figure 45:
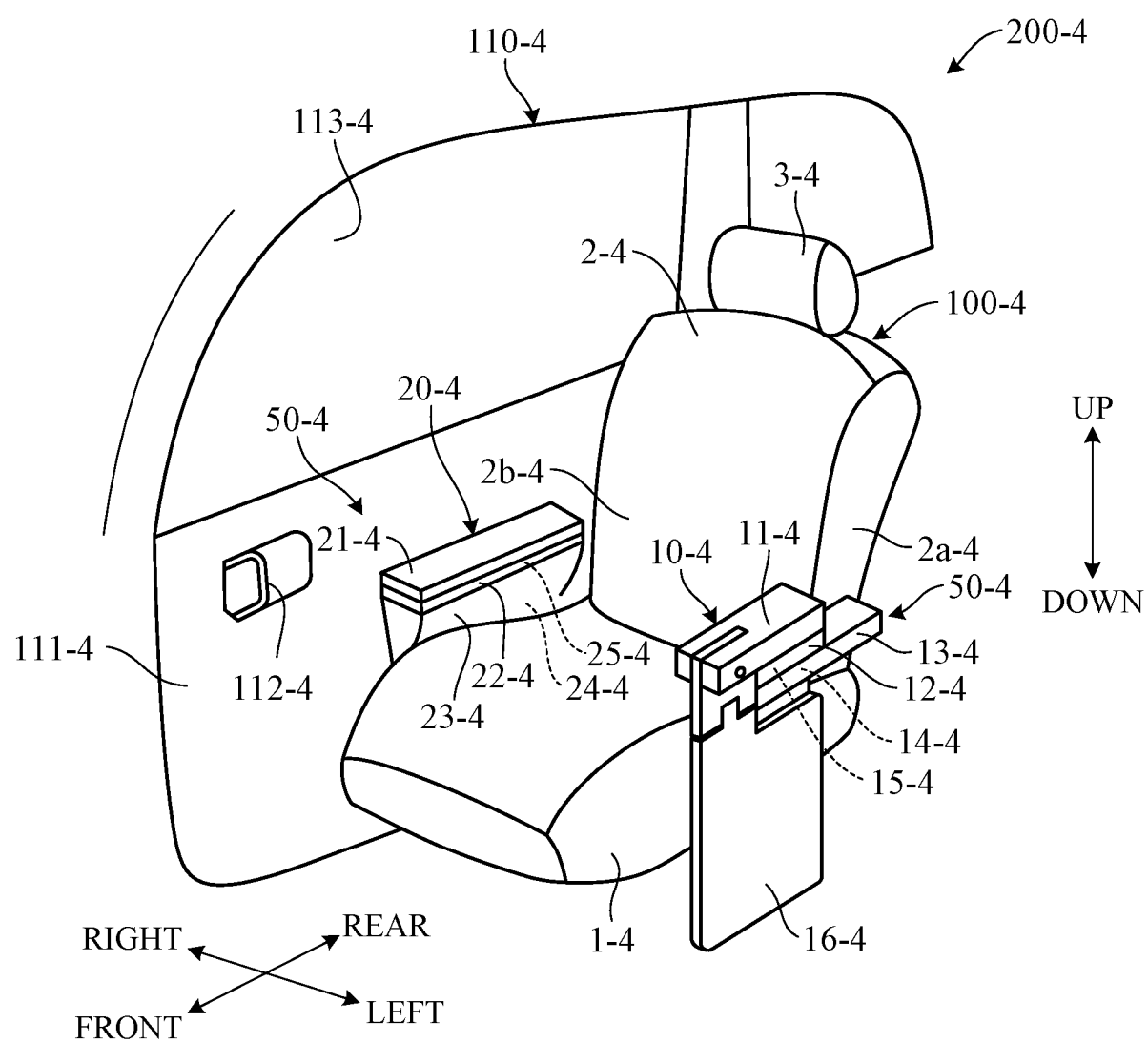
FIG. 45 is a perspective view illustrating an arrangement of a vehicle seat to which an armrest device according to the fourth embodiment of the present invention is applied in a car interior.

FIG. 45 is a perspective view illustrating a configuration of a vehicle seat 100-4 (hereinafter, simply referred to as a seat) to which an armrest device 50-4 according to the fourth embodiment of the present invention is applied, and particularly illustrating a configuration of the seat 100-4 in the manual driving mode. In the following, for convenience, the front-rear direction, the lateral direction, and the up-down direction are defined with reference to the occupant seated on the seat 100-4 as illustrated in the drawing, and the configuration of each part will be described according to this definition. The front-rear direction, lateral direction, and up-down direction of the seat 100-4 correspond with the front-rear direction (length direction), lateral direction (vehicle width direction), and up-down direction (height direction) of the car 200-4. FIG. 45 illustrates the driver's seat 100-4 on the right side of the car, and the configuration of the armrest device applied to the driver's seat 100-4 is mainly described.

As illustrated in FIG. 45, the seat 100-4 includes a seat cushion 1-4 that supports the hip of the occupant, a seat back 2-4 that supports the back of the occupant, and a headrest 3-4 that is provided on the upper part of the seat back 2-4 and supports the head of the occupant. The seat cushion 1-4 extends in the front-rear direction and the lateral direction and has a substantially rectangular shape in the plan view as a whole. The seat back 2-4 extends in the up-down direction and the lateral direction and has a substantially rectangular shape in the front view as a whole. The seat back 2-4 is supported by the rear end portion of the seat cushion 1-4 so as to be tiltable in the front-rear direction.

On the left side of the seat back 2-4, a seat armrest 10-4 which has a substantially rectangular shape in the plan view and is formed elongated in the front-rear direction is provided. The seat armrest 10-4 includes a pair of upper and lower upper plate 11-4 and lower plate 12-4 supported on the base member 13-4. The base member 13-4 has a substantially rectangular parallelepiped shape extending in the front-rear direction, and the rear end portion is fixed to the left side surface 2a-4 of the seat back 2-4. The seat armrest 10-4 constitutes a part of the armrest device 50-4 according to the fourth embodiment.

The lower plate 12-4 is placed on the front side upper surface of the base member 13-4 so that the rear end surface is located in front of the seat surface 2b-4 of the seat back 2-4. The lower plate 12-4 is supported so as to be movable from the initial position in FIG. 45 to the right and upward via the support mechanism 14-4 provided on the base member 13-4. Since the rear end surface of the lower plate 12-4 is located in front of the seat surface 2b-4, the lower plate 12-4 can move to the right without interfering with the seat back 2-4. Note that the lower plate 12-4 may be provided so as to be movable forward along the upper surface of the base member 13-4, and the lower plate 12-4 may be moved forward and then moved to the right and upward. In this case, the rear end surface of the lower plate 12-4 may be located behind the seat surface 2b-4 at the initial position before moving the lower plate 12-4 forward.

The upper plate 11-4 has the same width in the lateral direction as the lower plate 12-4 and is placed on the lower plate 12-4. When the seat armrest 10-4 is located at the initial position illustrated in FIG. 45, the rear end surface of the upper plate 11-4 is located on the same vertical plane as the rear end surface of the lower plate 12-4. Therefore, the upper plate 11-4 may move to the right and upward with respect to the base member 13-4 integrally with the lower plate 12-4 without interfering with the seat back 2-4. The upper plate 11-4 is supported so as to be movable forward with respect to the lower plate 12-4 via the slide mechanism 15-4, and when the upper plate 11-4 moves forward, the rear end portion of the upper plate 11-4 Is located in front of the rear end portion of the lower plate 12-4. The seat armrest 10-4 is further provided with a substantially rectangular table 16-4 rotatably supported at the front end portion of the upper plate 11-4. The table 16-4 is stored on the left side of the seat 100-4 in the initial position illustrated in FIG. 45.

A door 110-4 that is openable and closable is provided on the right side of the seat 100-4, and an occupant gets on and off the car 200-4 through the door 110-4. The inner wall 111-4 of the door 110-4 is provided with a door handle 112-4 for opening and closing the door operated by an occupant and a door armrest 20-4. Although not illustrated in the drawings, on the inner wall 111-4, an operation switch for inputting an opening and closing command for the window 113-4, an operation command for the locking device for the door 100-4, and the like, a door gripping portion for gripping the door 110-4, a drink holder, and the like are also provided.

The door armrest 20-4 is substantially rectangular in the plan view and elongated in the front-rear direction. The door armrest 20-4 includes a pair of upper and lower upper plate 21-4 and lower plate 22-4 supported on the base member 23-4. The base member 23-4 is provided so as to protrude from the inner wall 111-4 toward the vehicle interior side, and a cavity is formed inside. The door armrest 20-4 constitutes a part of the armrest device 50-4 according to the fourth embodiment.

The lower plate 22-4 is placed on the upper surface of the base member 23-4 so that the rear end surface is located in front of the seat surface 2b-4 of the seat back 2-4. The lower plate 22-4 is supported so as to be movable from the initial position in FIG. 45 to the left and upward via the support mechanism 24-4 provided on the base member 23-4. Since the rear end surface of the lower plate 22-4 is located in front of the seat surface 2b-4, the lower plate 22-4 can move to the left without interfering with the seat back 2-4. Note that, when the lower plate 22-4 may move to the left without interfering with the seat back 2-4, the rear end surface of the lower plate 22-4 may be located behind the seat surface 2b-4.

The upper plate 21-4 has the same width in the lateral direction as the lower plate 22-4 and is placed on the lower plate 22-4. When the door armrest 20-4 is located at the initial position illustrated in FIG. 45, the rear end surface of the upper plate 21-4 is located on the same vertical plane as the rear end surface of the lower plate 22-4. Therefore, the upper plate 21-4 may move to the left and upward with respect to the base member 23-4 integrally with the lower plate 22-4 without interfering with the seat back 2-4. The upper plate 21-4 is supported so as to be movable forward with respect to the lower plate 22-4 via the slide mechanism 25-4, and when the upper plate 21-4 moves forward, the rear end portion of the upper plate 21-4 is located in front of the rear end portion of the lower plate 22-4.

Figure 46:
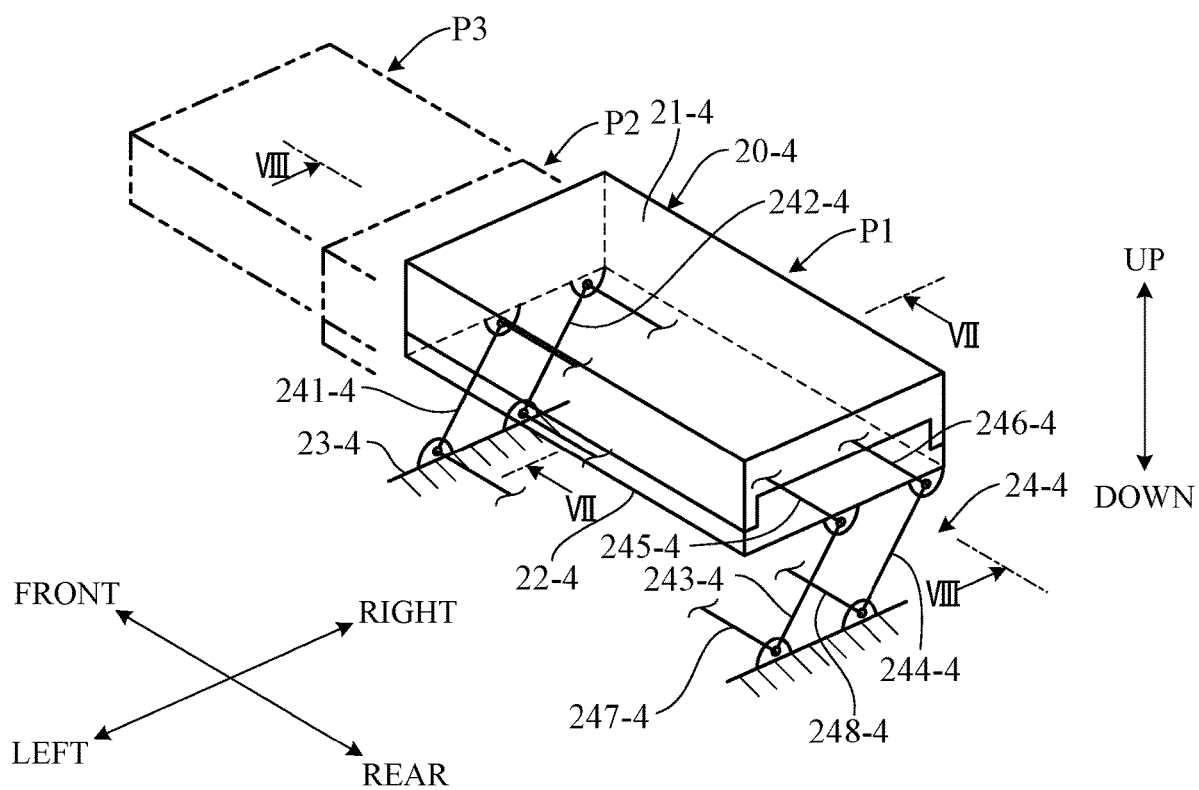
FIG. 46 is a perspective view illustrating a configuration of a support mechanism of an armrest according to the fourth embodiment of the present invention.
Figure 47:
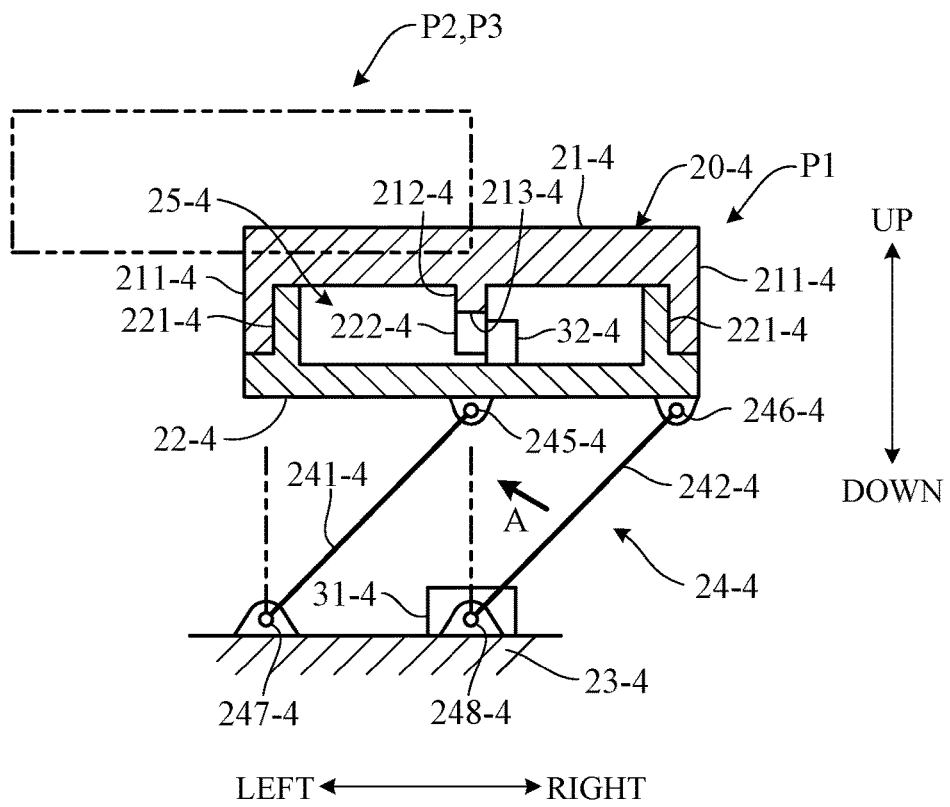
FIG. 47 is a cross-sectional view taken along line VII-VII of FIG. 46.
Figure 48:
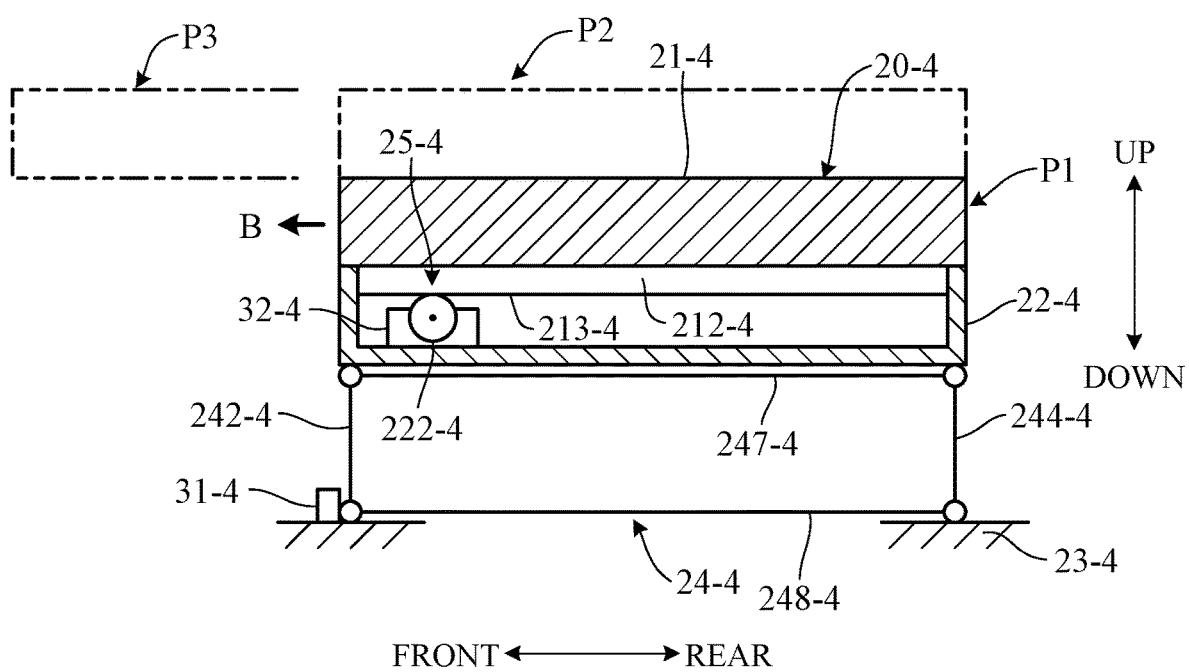
FIG. 48 is a cross-sectional view taken along line VIII-VIII of FIG. 46.

FIG. 46 is a perspective view schematically illustrating a support structure of the door armrest 20-4, FIG. 47 is a cross-sectional view (horizontal cross-sectional view) in which the armrest 20-4 of FIG. 46 is taken along a vertical plane extending in the lateral direction (line VII-VII of FIG. 46), and FIG. 48 is a cross-sectional view (longitudinal cross-sectional view) taken along a vertical plane extending in the front-rear direction (line VIII-VIII of FIG. 46). Note that the base members 23-4 are not illustrated in FIGS. 46 to 48.

As illustrated in FIGS. 46 to 48, the support mechanism 24-4 includes a link mechanism arranged in the inner space of the base member 23-4. The link mechanism includes a pair of left and right rod-shaped front rods 241-4 and 242-4 and a pair of left and right rod-shaped rear rods 243-4 and 244-4. The lengths of these rods 241-4 to 244-4 are equal to each other, and these rods 241-4 to 244-4 are provided parallel to each other. The front rods 241-4 and 242-4 are positioned so as to overlap each other in the side view, and the rear rods 243-4 and 244-4 are also positioned so as to overlap each other in the side view.

A pair of left and right rotating shafts 245-4 and 246-4 extending in the front-rear direction are rotatably supported on the bottom portion of the lower plate 22-4. A pair of left and right rotating shafts 247-4 and 248-4 extending in the front-rear direction are rotatably supported on the bottom portion of the base member 23-4. The rotating shafts 245-4 to 248-4 are arranged parallel to each other. The upper end portions of the front rod 241-4 and the rear rod 243-4 on the left side are rotatably supported by the rotating shaft 245-4, respectively. The lower end portions of the front rod 241-4 and the rear rod 243-4 on the left are rotatably supported by the rotating shaft 247-4, respectively. The upper end portions of the front rod 242-4 and the rear rod 244-4 on the right side are rotatably supported by the rotating shaft 246-4, respectively.

The lower end portions of the front rod 242-4 and the rear rod 244-4 on the right side are fixed to the rotating shaft 248-4, respectively. An actuator 31-4 such as an electric motor or the like is provided at the end portion of the rotating shaft 248-4, the rotating shaft 248-4 is rotated by driving the actuator 31-4, and the front rod 242-4 and the rear rod 244-4 on the right side rotate in the lateral direction with the rotating shaft 248-4 as a fulcrum as the rotating shaft 248-4 rotates.

The distance from the rotating shaft 245-4 to the rotating shaft 246-4 and the distance from the rotating shaft 247-4 to the rotating shaft 248-4 are equal to each other. Therefore, the support mechanism 24-4 constitutes a front view parallelogram link having a pair of left and right front rods 241-4 and 242-4 as two sides and constitutes a front view parallelogram link having a pair of left and right rear rods 243-4 and 244-4 as two sides. Note that, the rods 241-4 and 243-4 are supported by the common rotating shafts 245-4 and 247-4, and the rods 242-4 and 244-4 are supported by the common rotating shafts 246-4 and 248-4. Instead, the rods 241-4 and 243-4 may be supported by separate rotating shafts, and the rods 242-4 and 244-4 may be supported by separate rotating shafts. As a result, it is possible to shorten the length of the rotating shafts in the front-rear direction.

When the door armrest 20-4 is located at the initial position P1 (solid line in FIG. 47), the rotating shaft 245-4 is located to the right than the rotating shaft 247-4, and the rotating shaft 246-4 is located to the right than the rotating shaft 248-4. Therefore, the front rods 241-4 and 242-4 and the rear rods 243-4 and 244-4 are inclined to the right and extend upward, respectively. From this state, when the actuator 31-4 is driven and the front rod 242-4 and the rear rod 244-4 on the right side are rotated to the left as represented by arrow A until, for example, they are in the vertical state (chain double-dashed line in FIG. 47), the front rod 241-4 and the rear rod 243-4 on the left side also rotate to the left at the same time. As a result, the door armrest 20-4 (upper plate 21-4 and lower plate 22-4) moves to the inner position P2 (chain double-dashed line in FIG. 47) to the left and above the initial position P1.

As illustrated in FIG. 46, the upper plate 21-4 of the door armrest 20-4 is configured to be movable from the inner position P2 to the advanced position P3 protruding forward with respect to the lower plate 22-4 via the slide mechanism 25-4. As illustrated in FIG. 47, the lower surface of the upper plate 21-4 and the upper surface of the lower plate 22-4 are each formed to have a concave cross-section. The upper plate 21-4 includes a pair of left and right side plates 211-4 and 211-4 extending in the front-rear direction, and the lower plate 22-4 includes a pair of left and right side plates 221-4 and 221-4 extending in the front-rear direction. The side plates 211-4 and 211-4 are fitted to the outside of the side plates 221-4 and 221-4 so as to be slidable in the front-rear direction along the side plates 221-4 and 221-4. A protruding portion 212-4 is provided at the central portion of the recess on the bottom surface of the upper plate 21-4 facing downward. The protruding portion 212-4 extends in the front-rear direction, and a gear portion 213-4 being concavo-convex is formed on the lower end surface thereof.

Below the gear portion 213-4, a pinion 222-4 is arranged so as to engage with the gear portion 213-4. An actuator 32-4 such as an electric motor or the like is fixedly mounted on the upper surface of the recess of the lower plate 22-4, and the rotating shaft of the pinion 222-4 is rotatably supported by the actuator 32-4. The gear portion 213-4, the pinion 222-4, and the actuator 32-4 constitute the slide mechanism 25-4.

As illustrated in FIG. 48, when the actuator 32-4 is rotationally driven after the door armrest 20-4 has moved from the initial position P1 (solid line) to the inner position P2-4 (chain double-dashed line), the upper plate 21-4 is moved to the advanced position P3 (chain double-dashed line) forward as represented by arrow B while the left and right side plates 211-4 are guided by the left and right side plates 221-4. In this state, the total length of the door armrest 20-4 in the front-rear direction, that is, the length from the rear end surface of the lower plate 22-4 to the front end surface of the upper plate 21-4 becomes longer, and the door armrest 20-4 extends.

Although not illustrated in the drawings, the support mechanism 14-4 and the slide mechanism 15-4 of the seat armrest 10-4 on the left side of the seat 100 are configured in the manner similar to the support mechanism 24-4 and the slide mechanism 25-4 of the door armrest 20-4. That is, the seat armrest 10-4 (upper plate 11-4 and lower plate 12-4) is moved to the inner position to the right and above from the initial position with respect to the base member 13-4 by driving an actuator such as an electric motor or the like via the support mechanism 14-4. Further, the upper plate 11-4 moves from the inner position to the advanced position forward with respect to the lower plate 12-4 by driving an actuator such as an electric motor or the like via the slide mechanism 15-4.

Figure 49:
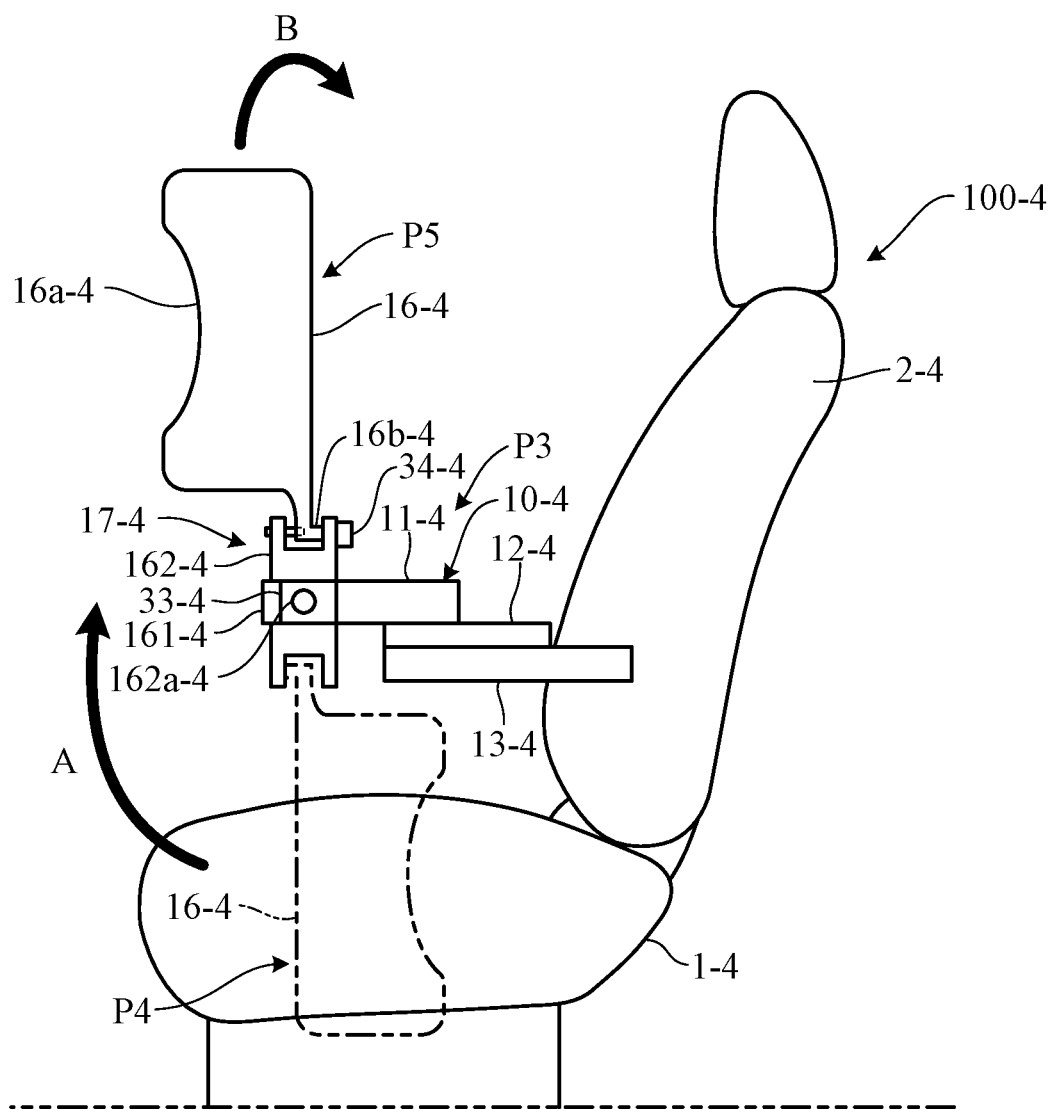
FIG. 49 is a side view illustrating an example of an operation of a table at a tip end portion of the armrest according to the fourth embodiment of the present invention.
Figure 50:
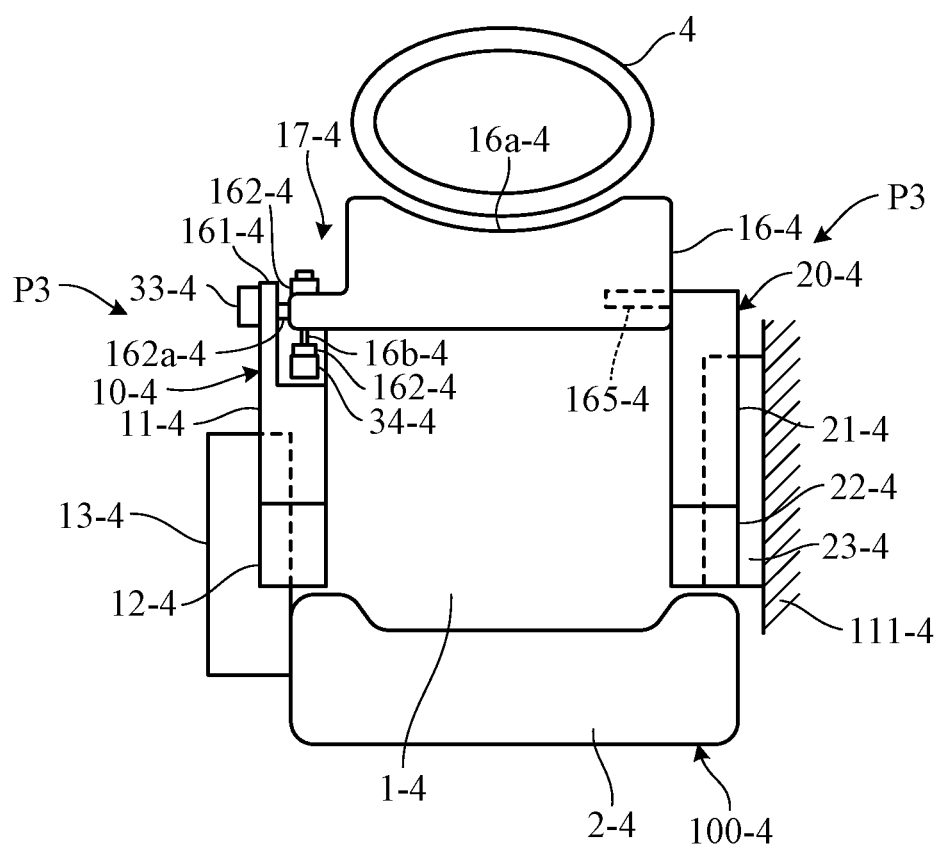
FIG. 50 is a plan view illustrating an example of the operation of the table at the tip end portion of the armrest according to the fourth embodiment of the present invention.
Figure 50:
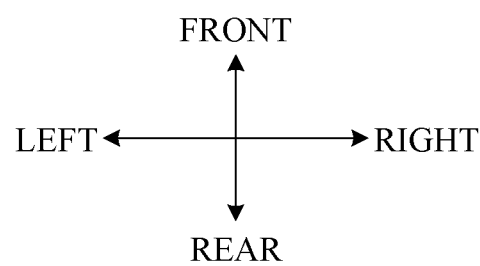

FIG. 49 is a side view of the seat 100 illustrating a configuration of a substantially rectangular plate-shaped table 16-4 provided at the front end portion of the seat armrest 10-4, and FIG. 50 is a plan view. In FIGS. 49 and 50, the seat armrest 10-4 and the door armrest 20-4 are located at the advanced position P3 protruding forward of the seat 100-4. The table 16-4 is rotatable via the rotation mechanism 17-4 at the front end portion of the upper plate 11-4.

As illustrated in FIGS. 49 and 50, a retaining plate portion 161-4 is provided at the front end portion of the upper plate 11-4 of the seat armrest 10-4. A rotating member 162-4 is arranged on the right side of the retaining plate portion 161-4, and the rotating member 162-4 is provided with a pin 162a-4 integrated with the rotating member 162-4 protruding to the left. A through-hole is provided in the retaining plate portion 161-4, and a pin 162a-4 is inserted in the through-hole. An actuator 33-4 such as an electric motor or the like is connected to the end portion of the pin 162a-4, and by driving the actuator 33-4, the table 16-4 is rotatable with the pin 162a-4 as a fulcrum between a position where the tip end portion is located below the seat armrest 10-4 (stored position P4) represented by the chain double-dashed line in FIG. 49 and a position where the tip end portion is located above the seat armrest 10-4 (vertical position P5) represented by the solid line in FIG. 49.

At the base end portion of the table 16-4, a pin 16b-4 integrated with the table 16-4 protruding rearward is provided. The pin 16b-4 penetrates the rotating member 162-4, and an actuator 34-4 such as an electric motor or the like is connected to the end portion thereof. By driving the actuator 34-4, the table 16-4 is rotatable with the pin 16b-4 as a fulcrum between the vertical position P5 of the solid line in FIG. 49 and the horizontal position P6 in FIG. 50. The door armrest 20-4 on the right side is provided with a mounting portion 165-4 on which the right end portion of the table 16-4 is mounted. The mounting portion 165-4 may be stored inside the upper plate 21-4 of the door armrest 20-4.

The table 16-4 has a curved portion 16a-4 that curves along the steering wheel 4-4. The curved portion 16a-4 is a relief portion formed so as not to interfere with the steering wheel 4-4 when the table 16-4 is rotated to the horizontal position P6 in FIG. 50. When using the table 16-4, after rotating the table 16-4 stored in the stored position P4 in FIG. 49 to the vertical position P5 centering around the pin 162a-4 as represented by arrow A, it is rotated to the horizontal position P6 centering around the pin 16b-4 as represented by arrow B, and the tip end portion of the table 16-4 is mounted on the mounting portion 165-4 of the door armrest 20-4. Note that a locking mechanism for fixing the table 16-4 at the mounting portion may be provided.

The mounting portion 165-4 for fixing the right end portion of the table 16-4 may be configured in the shape of a plan view plate, and the mounting portion 165-4 may be configured to be rotatable at a predetermined rotation angle. For example, the mounting portion 165-4 is connected to the door armrest 20-4 via a rotation shaft extending in the lateral direction and is rotatably provided in a predetermined rotation range centering around the rotation shaft. As a result, it is possible to tilt the table 16-4 to a predetermined angle, so that in a state that the seat 100-4 is reclining, it is possible to adjust the angle of the table 16-4 and set an information terminal such as a book, a smartphone, or the like is set to a position where the occupant may see it easily. Therefore, it is possible to improve the comfort of the occupant in the self-driving state.

Figure 51:
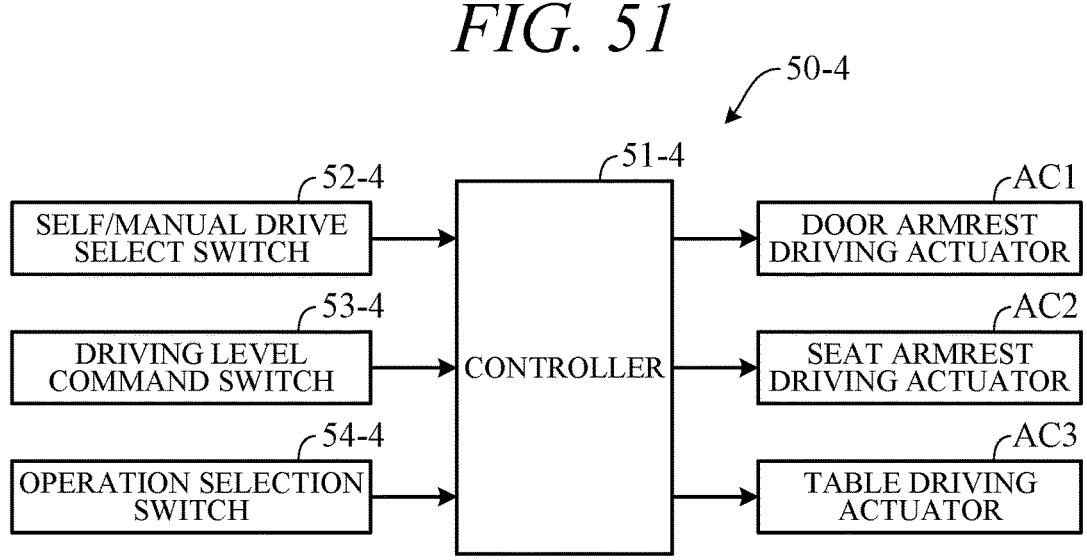
FIG. 51 is a block diagram illustrating a control configuration of the armrest device according to the fourth embodiment of the present invention.

The armrest device 50-4 according to the fourth embodiment includes armrests (seat armrest 10-4 and door armrest 20-4) configured as described above, and the armrests are configured to be automatically movable. FIG. 51 is a block diagram illustrating a control configuration of the armrest device 50-4 according to the fourth embodiment of the present invention. As illustrated in FIG. 51, the armrest device 50-4 includes a controller 51-4 related to the control of the armrests 10-4 and 20-4, and a manual/automation changeover switch 52-4, a driving level command switch 53-4, an operation selection switch 54-4, a door armrest driving actuator AC1, a seat armrest driving actuator AC2, and a table driving actuator AC3 that are connected to the controller 51-4 respectively via an in-vehicle network such as a CAN or the like.

The manual/automation changeover switch 52-4 is configured as a switch that may be manually operated by the driver, for example, and outputs a command to switch to the self-driving mode in which the self-driving function is enabled or to the manual driving mode in which the self-driving function is disabled, according to the switch operation. Regardless of the operation of the manual/automation changeover switch 52-4, when a predetermined traveling condition is satisfied, a changeover from the manual driving mode to the self-driving mode or a changeover from the self-driving mode to the manual driving mode may be commanded. That is, the manual/automation changeover switch 52-4 may be automatically switched so that the mode changeover is performed automatically instead of manually.

The driving level command switch 53-4 is configured as a switch that may be manually operated by the driver, for example, and a self-driving level of any of levels 0 to 5 is commanded according to the operation of the switch. It is also possible to configure that the vehicle control system determines whether or not conditions for self-driving are satisfied depending on the surrounding situations and the like and automatically switches the driving level command switch 53-4 according to the determination result to command any of levels 0 to 5.

The operation selection switch 54-4 is configured as a switch that may be manually operated by the driver, for example, and it is commanded to allow or prohibit displacement of the armrests 10-4 and 20-4 to a predetermined position according to the operation of the operation selection switch 54-4. For example, it is commanded to allow or prohibit displacement of the seat armrest 10-4 and the door armrest 20-4 from the initial position P1. In the state that the seat armrest 10-4 is displaced to the advanced position P3, it is also possible to allow or prohibit the table 16-4, which is a part of the seat armrest 10-4, to displace from the stored position P4 to the horizontal position P6.

The door armrest driving actuator AC1 is an actuator for driving the door armrest 20-4 from the initial position P1 to the advanced position P3. Specifically, the door armrest driving actuator AC1 includes an actuator 31-4 (for example, an electric motor) that is provided in the support mechanism 24-4 and moves the door armrest 20-4 to the left and upward of the base member 23-4 and an actuator 32-4 (for example, an electric motor) that is provided in the slide mechanism 25-4 and advances the upper plate 21-4 of the door armrest 20-4 with respect to the lower plate 22-4.

The seat armrest driving actuator AC2 is an actuator for driving the seat armrest 10-4 from the initial position P1 to the advanced position P3. Specifically, the seat armrest driving actuator AC2 includes an actuator (for example, an electric motor) that is provided in the support mechanism 14-4 and moves the seat armrest 10-4 to the right and upward of the base member 13-4 and an actuator (for example, an electric motor) that is provided in the slide mechanism 15-4 and advances the upper plate 11-4 of the seat armrest 10-4 with respect to the lower plate 12-4.

The table driving actuator AC3 is an actuator for driving the table 16-4 from the stored position P4 to the horizontal position P6. Specifically, the table driving actuator AC3 includes an actuator 33-4 (for example, electric motor) that is provided in the rotation mechanism 17-4 and rotates the table 16-4 from the stored position P4 to the vertical position P5 by rotationally driving the pin 162a-4 integrated with the rotating member 162-4 and an actuator 34-4 (for example, electric motor) that rotates the table 16-4 from vertical position P5 to horizontal position P6 by rotationally driving the pin 16b-4 integrated with the table 16-4.

The controller 51-4 is an electronic control circuit (ECU) and is composed of a microcomputer including a CPU as an operating circuit, storage units such as a ROM, a RAM, and the like, and other peripheral circuits such as an input/output interface (I/O interface) and the like. The controller 51-4 executes a predetermined process based on input signals from the manual/automation changeover switch 52-4, the driving level command switch 53-4, and the operation selection switch 54-4 and outputs control signals to each of the actuators AC1 to AC3.

Figure 52:
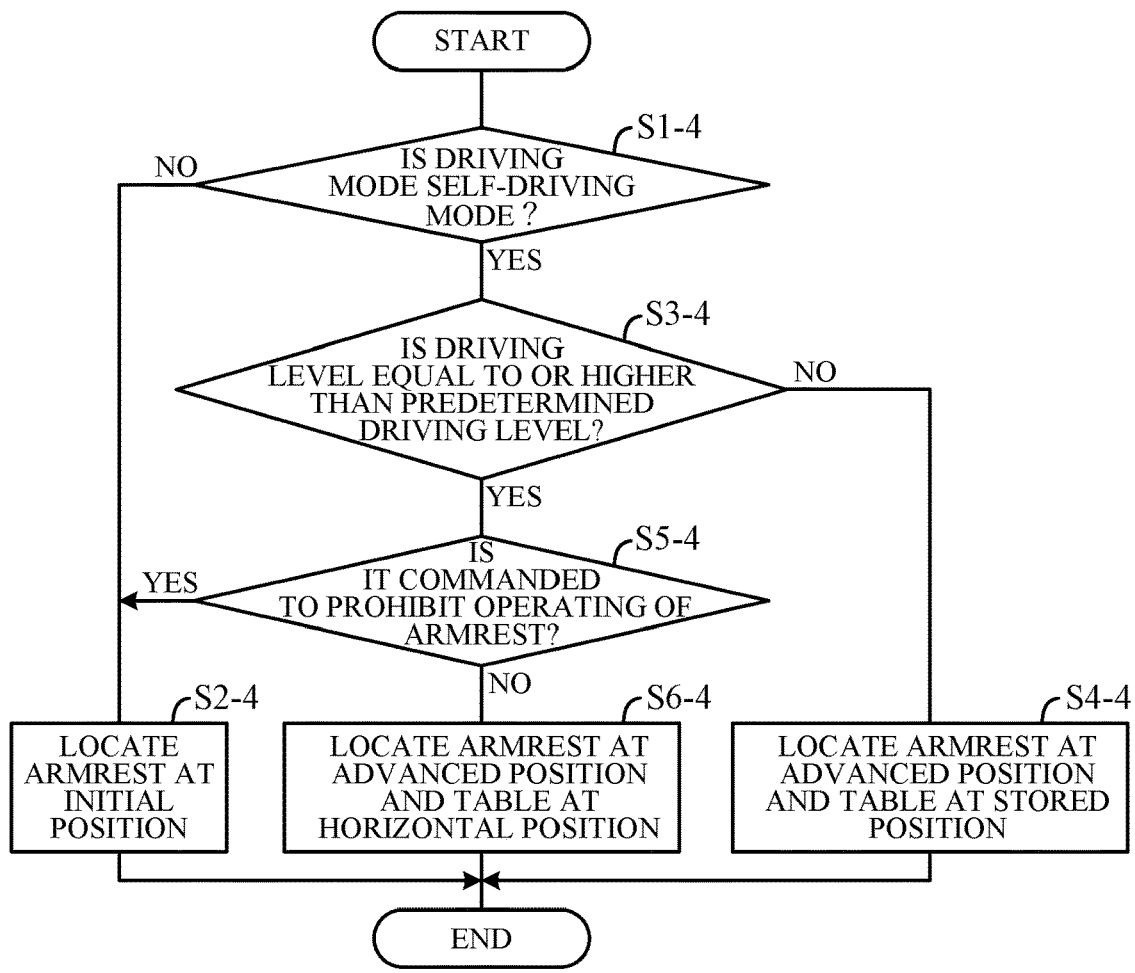
FIG. 52 is a flowchart illustrating an example of processing executed by the controller of FIG. 51.

FIG. 52 is a flowchart illustrating an example of processing executed by the controller 51-4 according to a program stored in advance. The processing illustrated in this flowchart is started, for example, by turning on the power key switch of the car.

First, in step S1-4, it is determined whether or not the driving mode is the self-driving mode based on the signal from the manual/automation changeover switch 52-4. If it is denied in step S1-4, that is, if it is determined to be in the manual driving mode, the process proceeds to step S2-4, and the actuators AC1 to AC3 are controlled so that the armrests 10-4 and 20-4 are located at the initial position P1. If affirmed in step S1-4, the process proceeds to step S3-4, and it is determined whether or not the driving level is equal to or higher than the predetermined driving level based on the signal from the driving level command switch 53-4. For example, level 4 is set as the predetermined driving level.

If affirmed in step S3-4, the process proceeds to step S5-4, and if denied, the process proceeds to step S4-4. In step S4-4, the actuators AC1 to AC3 are controlled so that the armrests 10-4 and 20-4 are located at the advanced position P3 and the table 16-4 is located at the stored position P4. In step S5-4, it is determined whether or not it is commanded to prohibit operating of the armrests 10-4 and 20-4 and the table 16-4 based on the signal from the operation selection switch 54-4. If affirmed in step S5-4, the process proceeds to step S2-4, and if denied, the process proceeds to step S6-4. In step S6-4, the actuators AC1 to AC3 are controlled so that the armrests 10-4 and 20-4 are located at the advanced position P3 and the table 16-4 is located at the horizontal position P6.

Figure 53A:
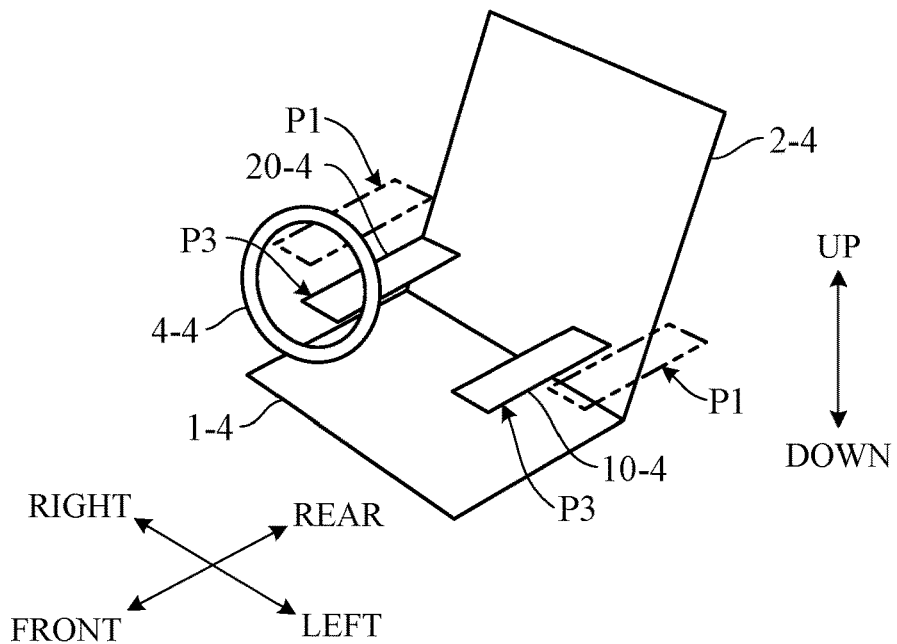
FIG. 53A is a perspective view of a seat illustrating an example of the operation of the armrest device according to the fourth embodiment of the present invention.
Figure 53B:
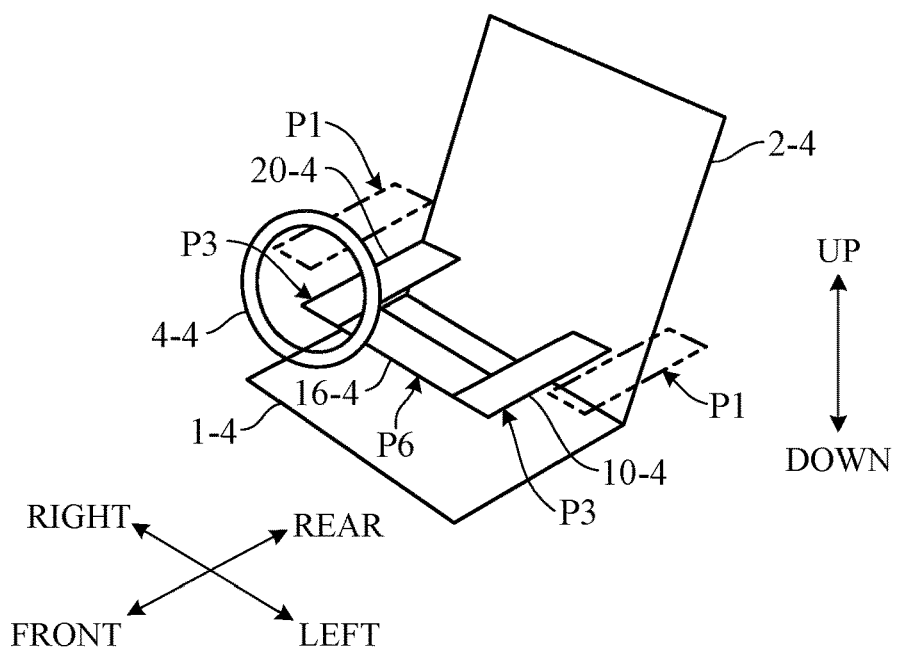
FIG. 53B is a perspective view of a seat illustrating another example of the operation of the armrest device according to the fourth embodiment of the present invention.

The operation of the armrest device 50-4 according to the fourth embodiment will be described more specifically. FIGS. 53A and 53B are perspective views illustrating an example of the operation of the armrest device 50-4, respectively. While traveling in the manual driving mode, the seat armrest 10-4 and the door armrest 20-4 are at the initial positions P1 represented by the chain double-dashed lines in FIGS. 53A and 53B, respectively (step S2-4).

When the driving mode is switched to the self-driving mode, forms of the armrests 10-4 and 20-4 change according to the driving level. For example, when the driving level is level 3, the door armrest 20-4 is displaced to the left, upward, and forward advanced position P3, and the seat armrest 10-4 is displaced to the right, upward, and forward advanced position P3 as illustrated in FIG. 53A (step S4-4). As a result, the driver may place the hand (fingers and the like) in the vicinity of the steering wheel 4-4 by placing the arm portion on the armrests 10-4 and 20-4. As a result, it is possible to easily and quickly deal with an emergency or the like.

That is, in self-driving of level 3, while the driver has taken the hand off the steering wheel 4-4, it is required to keep putting the hand near the steering wheel 4-4 so as to be able to operate the steering wheel 4-4 immediately in an emergency or the like, and it tends to be a burden on the driver. In this regard, by displacing the tip end portions of the armrests 10-4 and 20-4 to the inside of the seat 100-4, forward, and upward, it is easy for the driver to place his hand near the steering wheel 4-4, and it is possible to relieve the driver's fatigue at the time of the self-driving mode.

When the driving level is level 4 or higher, the door armrest 20-4 is displaced to the left, upward, and forward advanced position P3, and the seat armrest 10-4 is displaced to the right, upward, and forward advanced position P3 as illustrated in FIG. 53B (step S4-4). Further, the table 16-4 at the tip end portion of the door armrest 20 is displaced to the horizontal position P6 (step S6-4). This allows the driver to perform various tasks by placing the hands or objects on the table 16-4 while placing the arms on the armrests 10-4 or 20-4.

That is, in the self-driving of level 4, the vehicle control system responds in an emergency, so the driver does not need to place the hand in the vicinity of the steering wheel 4-4 to prepare for an emergency. Therefore, even if the table 16-4 is placed at a position that interferes with the driving operation, there is no problem, and it is possible for the driver to suitably use the table 16-4 as a workbench, an auxiliary table, or the like. The placement of the table 16-4 improves driver comfort during self-driving. The table 16-4 has high rigidity because both left and right end portions are supported by left and right armrests 10-4 and 20-4.

Even while traveling in the self-driving mode of level 4, the armrests 10-4 and 20-4 are held in the initial position P1 when the driver selects to prohibit operation by operating the operation selection switch 54-4 (from step S5-4 to step S2-4). Therefore, the armrests 10-4, 20-4 are not displaced to the inside of the seat 100-4, and it is possible for the driver to ride in a relaxed posture with the arm portions placed on the armrests 10-4 and 20-4. That is, unlike the self-driving of level 3, the desired posture differs for each driver in the self-driving of level 4, but it is possible for the driver to take the desired posture easily by changing the operation of the seat armrest 10-4 according to the operation of the operation selection switch 54-4.

According to the fourth embodiment, the following effects can be obtained.

(1) The armrest device 50-4 according to the fourth embodiment includes armrests 10-4 and 20-4 that support the arm portion of an occupant seated on the seat 100-4 of a self-driving vehicle having a self-driving function. The armrest (for example, the seat armrest 10-4) is configured to be changeable, during the self-driving, between a form (referred to as the first form) in which the tip end portion thereof is in the advanced position P3 in front of and inside in the seat width direction of the initial position P1 before the self-driving, and a form (referred to as the second form) in which the table 16-4, which is the tip end portion of the armrest 10-4 is located at the horizontal position P6 (FIGS. 53A and 53B). Since the armrests 10-4 can take a plurality of forms during the self-driving in this way, it is possible to operate the armrest 10-4 appropriately according to the driving level.

(2) The armrest (for example, the seat armrest 10-4) is configured to be changeable to the first form when the self-driving level is less than a predetermined level (for example, level 4), and is configured to be changeable to the second form when the self-driving level is equal to or higher than the predetermined level (FIGS. 53A and 53B). The self-driving vehicle may have different requirements for the driver depending on the driving level during the self-driving, but in the fourth embodiment, the form of the armrest is changed according to the driving level, so that the driver may easily meet the requirements according to the driving level, for example, as placing the hand in the vicinity of the steering wheel 4-4 to prepare for an emergency and the like.

(3) The armrest device 50-4 further includes a support portion that movably supports the armrest (for example, the armrest 10-4) so that the tip end portion (the upper plate 11-4 or the tip end portion of the table 16-4) of the seat armrest 10-4 is displaced to the advanced position P3 corresponding to the first form or the horizontal position P6 corresponding to the second form, that is, a support mechanism 14-4, a slide mechanism 15-4, and a rotation mechanism 17-4 (FIGS. 45 and 49). As a result, it is possible to displace the position of the tip end portion of the armrest 10-4 to different positions with each other easily.

(4) The armrest (for example, the seat armrest 10-4) is provided so that the tip end portion thereof is extendable so as to be displaced to the advanced position P3 corresponding to the first form or the horizontal position P6 corresponding to the second form (FIGS. 53A and 53B). As a result, in the first form and the second form, the area of the armrest 10-4 on which the arm portion and hand may be placed is expanded, and the comfort of the occupant is improved.

(5) The actuators AC1 to AC3 that displace the tip end portion of the armrest (for example, the seat armrest 10-4) to the advanced position P3 or the horizontal position P6 are further provided (FIG. 51). As a result, the armrests 10-4 may be automatically operated according to the driving level and the like.

(6) The advanced positions P3 of the armrests 10-4 and 20-4 are positions further above the initial position P1 (FIG. 53A). Therefore, it is possible to bring the driver's hand close to the steering wheel 4-4 easily in the self-driving mode.

(7) The armrests 10-4 and 20-4 are provided on both the left and right sides of the seat 100-4 and configured so that the left and right armrests 10-4 and 20-4 are connected to each other when the table 16-4, which is the tip end portion of the seat armrest 10-4 on the left side, is located at the horizontal position P6 and the tip end portion of the door armrest 20-4 on the right side is located at the advanced position P3 (FIG. 53B). This makes it possible to increase the rigidity of the entire armrest.

(8) The armrest 10-4 is provided with a table 16-4 formed in front of the seat 100-4 (seat back 2) at the tip end portion thereof, and the left and right armrests 10-4 and 20-4 are connected to each other via the table 16-4 (FIG. 50). As a result, it is possible to increase the rigidity of the table 16-4, and it is possible to place a heavy object on the table 16-4 stably.

(9) An operation selection switch 54-4 for commanding to allow or prohibit to displace the armrests 10-4 and 20-4 to the advanced position P3 is further provided (FIG. 51). As a result, the armrests 10-4 and 20-4 are displaced according to the selection of the occupant, it is possible to satisfy the requirements of each occupant easily, and the comfort of the occupant is improved.

Modification

The fourth embodiment can be modified into various forms. Hereinafter, modifications will be described. In the fourth embodiment described above, the tip end portion of the seat armrest 10-4 is displaced from the initial position P1 to the advanced position P3 (first position) corresponding to the first form (also referred to as the first aspect) and the horizontal position P6 (second position) corresponding to the second form (also referred to as the second aspect), but, at the time of the self-driving, as long as it is configured that it is changeable to the first form in which the tip end portion thereof is located in front of the initial position before the self-driving and inside in the seat width direction and the second form in which the position of the tip end portion of the armrest is different from that of the first form, the operation form of the armrest is not limited to the above.

Figure 54A:
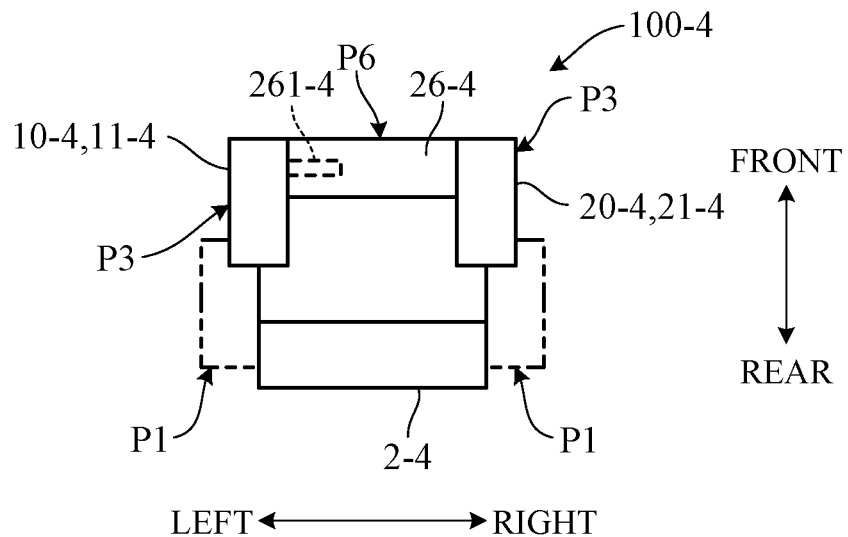
FIG. 54A is a plan view illustrating a first modification of the armrest device according to the fourth embodiment.

FIG. 54A is a plan view illustrating a first modification of the armrest device according to the fourth embodiment. In FIG. 54A, instead of the seat armrest 10-4, the tip end portion of the door armrest 20-4 is provided with a table 26-4 that is rotatable from the stored position to the vertical position and the horizontal position via a rotation mechanism similar to the rotation mechanism 17-4. FIG. 54A illustrates an example of a form of the armrest at level 4 or higher (the second form), and at level 3 or lower, the armrest has, for example, a similar form as illustrated in FIG. 53A (the first form). As illustrated in FIG. 54A, the tip end portion of the seat armrest 10-4 is located at the advanced position P3, and the table 26-4 at the tip end portion of the door armrest 20-4 is located at the horizontal position P6. At this time, the table 26-4 is supported on the plate-shaped mounting portion 261-4 protruding to the right from the tip end portion of the seat armrest 10-4.

Figure 54B:
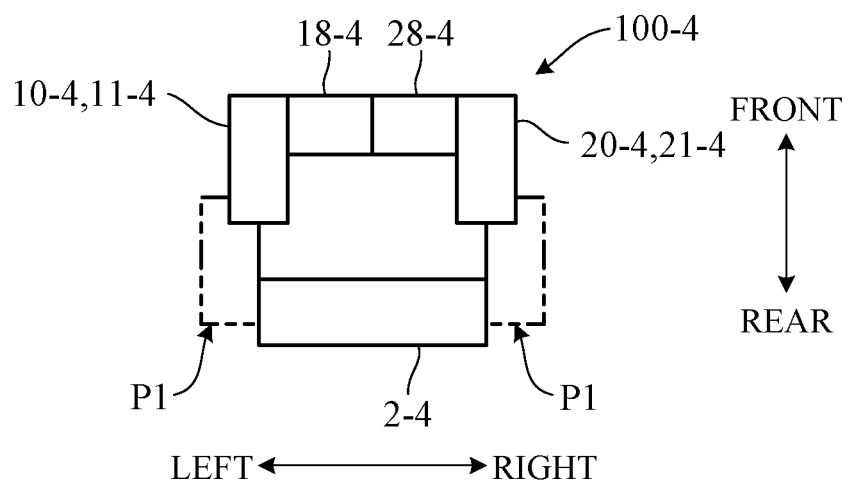
FIG. 54B is a plan view illustrating a second modification of the armrest device according to the fourth embodiment.

FIG. 54B is a plan view illustrating a second modification of the armrest device according to the fourth embodiment. In FIG. 54B, at the tip end portion of the seat armrest 10-4 and the tip end portion of the door armrest 20-4, tables 18-4 and 28-4 that is rotatable from the stored position to the vertical position and the horizontal position via a rotation mechanism are provided, respectively. FIG. 54B illustrates an example of a form of the armrest at level 4 or higher (the second form), and at level 3 or lower, the armrest has, for example, a similar form as illustrated in FIG. 53A (the first form). As illustrated in FIG. 54B, the table 18-4 at the tip end portion of the seat armrest 10-4 and the table 28-4 at the tip end portion of the door armrest 20-4 are located at the horizontal positions P6, respectively. At this time, the tables 18-4 and 28-4 are connected to each other.

Figure 54C:
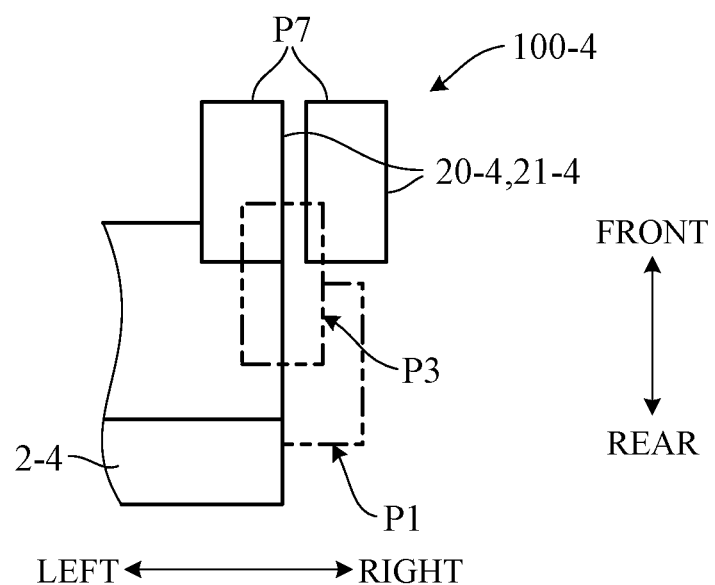
FIG. 54C is a plan view illustrating a third modification of the armrest device according to the fourth embodiment.

FIG. 54C is a plan view illustrating a third modification of the armrest device according to the fourth embodiment. Note that FIG. 54C illustrates the position of the upper plate 21-4 of the door armrest 20-4, and the illustration of the seat armrest 10-4 is omitted. The seat armrest 10-4 is provided symmetrically with respect to, for example, the door armrest 20-4. In FIG. 54C, the first position of the door armrest 20-4 is the advanced position P3 (chain double-dashed line) in front of and to the left of the initial position P1, similar to FIG. 53B. On the other hand, the second position P7 is either forward and left (solid line) or forward and right (solid line) of the first position. In this case, the first position (advanced position P3) and the second position P7 may have the same height or different heights.

Note that the first position and the second position may be the same position in the front-rear direction but different in at least one of the lateral direction and the up-down direction. The first position and the second position may be the same position in the lateral direction but different in at least one of the front-rear direction and the up-down direction. That is, the second position may be any position as long as it is a position different from the first position. For example, the second position may be behind or below the first position. The second position may be the same as the initial position P1. In the fourth embodiment described above, the table 16-4 at the tip end portion of the seat armrest 10-4 is rotated to the horizontal position P6 to be the horizontal position P6 (second position) different from the advanced position P3 (first position), but, as illustrated in FIG. 54C, the table may be omitted so that the first position and the second position are different.

In the fourth embodiment described above, when the self-driving level is less than level 4, the armrest (for example, the seat armrest 10-4) is changed to the first mode (advanced position P3), and when the level is 4 or higher, it is changed to the second mode (horizontal position P6), but the armrest may be changed to the first form and the second form based on an aspect other than the driving level. In the fourth embodiment described above, regarding the movement of the seat armrest 10-4, the seat armrest 10-4 is supported by the support mechanism 14-4, the slide mechanism 15-4, and the rotation mechanism 17-4 so as to be movable to the first position or the second position, but the configuration of the support portion is not limited to this. For example, regarding the movement of the door armrest 20-4, a rail may be extended in the front-rear direction on the inner wall 111-4 of the door 110-4, and the door armrest 20-4 may be moved in the front-rear direction along the rail. At the advanced position P3, the support portion may be configured so that the armrests 10-4 and 20-4 are displaced only forward and inside the vehicle and are not displaced upward. In the fourth embodiment described above, the armrest is displaced by using the parallelogram link, but the displacement may be regulated so that the upper surface of the armrest becomes horizontal by using another link mechanism or a regulating member.

In the fourth embodiment described above, the armrests 10-4 and 20-4 are configured by a pair of upper and lower plate members, but the configuration of the armrests is not limited to this. In the fourth embodiment described above, the armrests 10-4 and 20-4 are configured so as to be extendable by sliding the upper plates 11-4 and 21-4 forward with respect to the lower plates 12-4 and 22-4, but the entire armrest may be displaced without changing the length of the armrest. When the part on which the arm portion is placed is only the upper plates 11-4 and 21-4, only the upper plates 11-4 and 21-4 may be treated as the armrest. In the fourth embodiment described above, the actuators AC1 to AC3 such as an electric motor or the like are used to operate the armrests 10-4 and 20-4, but the configuration of the actuator is not limited to that described above. The armrest may be operated manually without using the actuator. In this case, a locking mechanism is provided on the support portion of the armrest, the locking mechanism is operated according to the driving level and the like, and it is possible to allow or prohibit to change the armrest from the initial position to the first form and from the first form to the second form.

In the fourth embodiment described above, the left and right armrests 10-4 and 20-4 each are provided so as to be movable from the initial positions, but only one of the left and right armrests may be movable. For example, only the door armrest 20-4 may be provided so as to be movable to the first position and the second position, and the seat armrest 10-4 may be provided on the side surface 2a-4 of the seat back so as to be rotatable with a rotating shaft in the lateral direction as a fulcrum. In the fourth embodiment described above, the left and right armrests 10-4 and 20-4 are connected via the table 16-4, but the left and right armrests may be connected without the table. In the fourth embodiment described above, it is allowed or prohibited to change the form of the armrest 10-4 to the second form according to the operation of the operation selection switch 54-4, but the configuration of a movement command unit is not limited to this. The change to the first form may be permitted or prohibited according to the operation of the movement command unit.

In the fourth embodiment described above, the seat armrest 10-4 is provided on the left side surface 2a-4 of the seat 100-4, but a seat armrest that is rotatable between a stored position being a vertical posture and a use position being a horizontal posture on the right side surface (door side) may be provided. In this case, when the self-driving mode of level 4 or higher is set and an operation of reclining the seat 100-4 rearward by the occupant, an electric motor that rotates the seat armrest on the door side from the stored position to the use position may be provided. A sub-armrest may be provided inside the armrests 10-4 and 20-4 so as to slidably move forward so that the area of the portion on which the occupant's arm portion can be placed is expanded.

Similar to the modification of the second embodiment described above, when a predetermined self-driving mode is set, an auxiliary armrest that supports the upper arm (the portion between the shoulder joint and the elbow joint) of the occupant seated on the seat 100-4 from below may be provided on the seat 100-4.

Similar to the modification of the second embodiment described above, the armrest (for example, the seat armrest 10-4)) is configured so as to be rotatable with a rotating shaft in the lateral direction as a fulcrum by an electric motor or the like, and an auxiliary armrest that is rotatably attached to the tip end portion of the armrest by an electric motor or the like may be provided.

Similar to the modification of the second embodiment described above, an input/output device that becomes operable when the self-driving mode is set may be provided on the armrests 10-4 and 20-4.

Similar to the modification of the second embodiment described above, the armrests 10-4 and 20-4 may be provided with a light unit.

Similar to the modification of the second embodiment described above, the armrests 10-4 and 20-4 may also be configured to be able to change the width of the part on which the occupant's arm portion is placed according to the driving level during the self-driving.

Similar to the modification of the second embodiment described above, the armrests 10-4 and 20-4 may be provided with a display device such as a liquid crystal panel or the like. Further, the angle of the display screen of the display device may be changed according to the reclining angle of the seat 100-4.

Similar to the modification of the second embodiment described above, the in-vehicle camera may be attached to the armrests 10-4 and 20-4.

Similar to the modification of the second embodiment described above, a device capable of adjusting the movable range may be provided so that the movable range of the armrests 10-4 and 20-4 when the self-driving mode is set becomes larger compared to the movable range of the armrests when the manual driving mode is set. Alternatively, a device capable of adjusting the movable range may be provided so that, compared to the movable range of the armrest when the driving level in the self-driving mode is less than a predetermined level, the movable range of the armrest in case of the predetermined level or higher becomes larger.

Similar to the modification of the second embodiment described above, it is also possible to secure the route for getting on and off for the occupant by rotating the seat armrest so that the tip end portion of the seat armrest 10-4 on the door side is located outside the vehicle in conjunction with an operation of an opening and closing switch of the door 110-4.

In the fourth embodiment described above, the armrest device is applied to a self-driving vehicle having the self-driving function, but the armrest device of the fourth embodiment may also be applied to a vehicle not having the self-driving function.

The armrest device according to the fourth embodiment described above may also be applied to the occupant protection device according to the first embodiment. In this case, in the seat 100-4, the pressure-receiving portion (the seat back pad 20, the pressure-receiving plate 5, and the like as illustrated in FIGS. 2 and 3) that receives the load from the seated occupant supported by the frame member of the seat 100-4 and the posture changing mechanism (the posture changing mechanism 6 as illustrated in FIG. 4) that movably supports the pressure-receiving portion are provided as in the first embodiment. Also, the side wall (door 110-4) or the seat 100-4 is provided with a side airbag device including a side airbag that is inflated and deployed between the side wall and the seat 100-4. Then, at the time of activating the side airbag when the side airbag device is activated by the impact acting on the door 110-4 from the outside to inflate and deploy the side airbag, the controller 51-4 controls the posture changing mechanism (actuator 61 in FIG. 4 or the like) so as to move the pressure-receiving portion so that the occupant is pushed in the direction away from the door 110-4 before the occupant contacts the side airbag. As a result, it is also possible to obtain the same effects as those of the first embodiment.

In the first to fourth embodiments described above, the vehicle seat has been described as an example of the vehicle seat, but it is also possible to similarly apply the present invention to other vehicle seats such as an airplane seat, a ship seat, and the like for which it is effective to provide a side airbag.

The invention can be also configured as an occupant protection method for an occupant protection apparatus, the occupant protection apparatus including: a vehicle seat arranged in an inner space of a side wall of a vehicle; and a side airbag device provided in the side wall or the vehicle seat and including a side airbag to be inflated and deployed between the side wall and the vehicle seat, the vehicle seat includes: a pressure-receiving portion configured to receive a load from an occupant seated on the vehicle seat; and a frame configured to support the pressure-receiving portion, that is, the occupant protection method including: moving the pressure-receiving portion so that the occupant is pushed away from the side wall before the occupant comes into contact with the side airbag at an activation time when the side airbag device is activated by an impact acting on the side wall from an outside of the vehicle and the side airbag is inflated and deployed.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 5 pressure-receiving plate, 6 posture changing mechanism, 7 side airbag module, 10 seat cushion pad, 20 seat back pad, 27 bank portion, 27a inner bank portion, 61 actuator, 72 side airbag, 78,79 protruding portion, 90 controller, 100 vehicle seat, 220 seat back frame, C car, DR door

The invention claimed is:
1. An occupant protection apparatus, comprising:
a vehicle seat arranged in an inner space of a side wall of a vehicle; and
a side airbag device provided in the side wall or the vehicle seat and including a side airbag to be inflated and deployed between the side wall and the vehicle seat, wherein the vehicle seat includes:
a pressure-receiving portion configured to receive a load from an occupant seated on the vehicle seat;
a frame configured to support the pressure-receiving portion; and
a seat back, wherein:
the occupant protection apparatus further comprises:

an electronic control circuit configured to perform moving the pressure-receiving portion so that the occupant is pushed away from the side wall before the occupant comes into contact with the side airbag at an activation time when the side airbag device is activated by an impact acting from an outside of the vehicle with respect to the side wall and the side airbag is inflated and deployed, and the pressure-receiving portion is a pressure-receiving plate to support a back of the occupant through a pad of the seat back.

2. The occupant protection apparatus according to claim 1, wherein:

the pressure-receiving portion is provided so as to extend in a seat width direction of the vehicle seat, and at least one of end portions of the pressure-receiving portion in the seat width direction is provided so as to be movable in at least one direction of a front-rear direction, a left-right direction, and an up-down direction of the vehicle.

3. The occupant protection apparatus according to claim 1, further comprising a power source attached to an end portion in the seat width direction of the frame, wherein:

the electronic control circuit configured to perform:

the moving including moving the pressure-receiving portion by a driving power of the power source at the activation time.

4. The occupant protection apparatus according to claim 3, wherein:

the electronic control circuit configured to perform:

the moving including moving only one end portion in the seat width direction of the pressure-receiving portion by the driving power of the power source at the activation time.

5. The occupant protection apparatus according to claim 3, wherein:

the electronic control circuit configured to perform:

the moving including moving a plurality of locations on at least one end portion in the seat width direction of the pressure-receiving portion by the driving power of the power source at the activation time.

6. The occupant protection apparatus according to claim 1, wherein:

the frame includes a side frame vertically arranged on an end portion in the seat width direction, the side airbag stored inside the side frame, and the electronic control circuit configured to perform:

the moving including moving the pressure-receiving portion by a pushing pressure of the side airbag inflated and deployed, at the activation time.

7. The occupant protection apparatus according to claim 1, wherein:

the pressure-receiving portion is provided so as to be movable in the seat width direction with respect to the frame, and the electronic control circuit configured to perform:

the moving including moving the pressure-receiving portion in the seat width direction, at the activation time.

8. The occupant protection apparatus according to claim 7, wherein:

the frame includes a side frame vertically arranged on an end portion in the seat width direction, the pressure-receiving portion includes a protruding portion protruding outward in the seat width direction farther than the side frame, and the electronic control circuit configured to perform:

the moving including moving the pressure-receiving portion in the seat width direction by a pushing pressure acting to the protruding portion from the side wall at a time when the side wall is modified inward due to an impact acting from an outside of the vehicle to the side wall.

9. The occupant protection apparatus according to claim 1, wherein the vehicle seat includes:

a seat cushion configured to support a hip of the occupant;

a seat back vertically arranged from a rear end portion of the seat cushion and configured to support a back of the occupant;

an arm rest configured to support an arm portion of the occupant; and a housing portion configured to house the side airbag device, wherein:

the side airbag device is provided behind the armrest and at an end portion in the seat width direction of the seat back, the seat back includes bank portions protruding forward on both sides in the seat width direction, the housing portion includes a fracture portion fracturing when the side airbag is inflated from the housing portion, the fracture portion is formed in the up-down direction at a side end portion and a front end portion in the seat width direction, and the side airbag is configured to be deployable to more forward than the protruding portion when being developed.

10. The occupant protection apparatus according to claim 1, further comprising:

an armrest device, wherein:

the armrest device includes:

an armrest configured to support an arm portion of the occupant seated on the vehicle seat, a support mechanism configured to support the armrest to be able to move the armrest from a first position to a second position forward and upward the first position for the occupant; and an actuator provided in the support mechanism and configured to move the armrest from the first position to the second position when it is predicted to act an impact to the vehicle.

11. The occupant protection apparatus according to claim 1, wherein:

the vehicle seat is a vehicle seat of a self-driving vehicle having a self-driving function, and the occupant protection apparatus further comprises an armrest configured to support an arm portion of the occupant seated on the vehicle seat, wherein:

the armrest is configured to be changeable, during the self-driving, between a first form in which a tip end portion of the armrest is in a more forward and more inside position in the seat width direction than an initial position before the self-driving and a second form in which the tip end portion of the armrest is located at a different position from the first form.

12. An occupant protection apparatus, comprising:

a vehicle seat arranged in an inner space of a side wall of a vehicle; and a side airbag device provided in the side wall or the vehicle seat and including a side airbag to be inflated and deployed between the side wall and the vehicle seat, wherein the vehicle seat includes:

a pressure-receiving portion configured to receive a load from an occupant seated on the vehicle seat;
a frame configured to support the pressure-receiving portion; and
a seat back, wherein:
the occupant protection apparatus further comprises:
an electronic control circuit configured to perform moving the pressure-receiving portion so that the occupant is pushed away from the side wall before the occupant comes into contact with the side airbag at an activation time when the side airbag device is activated by an impact acting from an outside of the vehicle with respect to the side wall and the side airbag is inflated and deployed, and
the pressure-receiving portion is bank portions protruding on both sides of the seat back in a seat width direction.

13. The occupant protection apparatus according to claim 12, wherein:
the pressure-receiving portion is provided so as to extend in a seat width direction of the vehicle seat, and
at least one of end portions of the pressure-receiving portion in the seat width direction is provided so as to be movable in at least one direction of a front-rear direction, a left-right direction, and an up-down direction of the vehicle.

14. The occupant protection apparatus according to claim 12, further comprising a power source attached to an end portion in the seat width direction of the frame, wherein:
the electronic control circuit configured to perform:
the moving including moving the pressure-receiving portion by a driving power of the power source at the activation time.

15. An occupant protection apparatus, comprising:
a vehicle seat arranged in an inner space of a side wall of a vehicle; and
a side airbag device provided in the side wall or the vehicle seat and including a side airbag to be inflated and deployed between the side wall and the vehicle seat, wherein
the vehicle seat includes:
a pressure-receiving portion configured to receive a load from an occupant seated on the vehicle seat; and
a frame configured to support the pressure-receiving portion, wherein:
the occupant protection apparatus further comprises:
an electronic control circuit configured to perform moving the pressure-receiving portion so that the occupant is pushed away from the side wall before the occupant comes into contact with the side airbag at an activation time when the side airbag device is activated by an impact acting from an outside of the vehicle with respect to the side wall and the side airbag is inflated and deployed, wherein:
the electronic control circuit configured to further perform:
detecting an object around the vehicle and predicting a probability of collision between the object and the vehicle;
estimating, when the vehicle is predicted to collide with the object, a speed of a collision; and
changing a movement amount of the pressure-receiving portion in accordance with the collision speed estimated in the estimating.

16. The occupant protection apparatus according to claim 15, wherein:
the pressure-receiving portion is provided so as to extend in a seat width direction of the vehicle seat, and
at least one of end portions of the pressure-receiving portion in the seat width direction is provided so as to be movable in at least one direction of a front-rear direction, a left-right direction, and an up-down direction of the vehicle.

17. The occupant protection apparatus according to claim 15, further comprising a power source attached to an end portion in the seat width direction of the frame, wherein:
the electronic control circuit configured to perform:
the moving including moving the pressure-receiving portion by a driving power of the power source at the activation time.

18. The occupant protection apparatus according to claim 15, wherein
the electronic control circuit configured to perform:
the changing including increasing the amount of movement of the pressure-receiving portion as the collision speed estimated in the estimating is larger.

19. The occupant protection apparatus according to claim 15, further comprising a sensor configured to detect an acceleration of the vehicle generated by the impact acting from the outside with respect to the side wall, wherein:
the electronic control circuit configured to further perform outputting a control signal for inflating and deploying the side airbag to the side airbag device when the acceleration is equal to or greater than a threshold value set in accordance with the probability of collision predicted in the predicting.

* * * * *